(12) United States Patent
Okabe et al.

(10) Patent No.: US 8,815,430 B2
(45) Date of Patent: Aug. 26, 2014

(54) SEALED BATTERY AND BATTERY STACK COMPRISING A PLURALITY OF SEALED BATTERIES

(75) Inventors: Kazuya Okabe, Kyoto (JP); Takahiro Itagaki, Kyoto (JP); Satoshi Yokota, Kyoto (JP); Tomonori Kishimoto, Kyoto (JP); Shuichi Izuchi, Kyoto (JP); Masahiko Oshitani, Kyoto (JP)

(73) Assignee: GS Yuasa International Ltd., Kyoto-shi (JP)

( * ) Notice: Subject to any disclaimer, the term of this patent is extended or adjusted under 35 U.S.C. 154(b) by 1060 days.

(21) Appl. No.: 11/663,917

(22) PCT Filed: Sep. 27, 2005

(86) PCT No.: PCT/JP2005/018250
§ 371 (c)(1),
(2), (4) Date: Mar. 27, 2007

(87) PCT Pub. No.: WO2006/035980
PCT Pub. Date: Apr. 6, 2006

(65) Prior Publication Data
US 2008/0038629 A1  Feb. 14, 2008

(30) Foreign Application Priority Data

Sep. 29, 2004  (JP) .................................. 2004-283150
Jan. 28, 2005  (JP) .................................. 2005-022307

(51) Int. Cl.
| H01M 2/26 | (2006.01) |
| H01M 2/12 | (2006.01) |
| H01M 10/052 | (2010.01) |
| H01M 2/20 | (2006.01) |
| H01M 10/0587 | (2010.01) |

(52) U.S. Cl.
CPC .............. *H01M 2/263* (2013.01); *H01M 2/26* (2013.01); *Y02T 10/7011* (2013.01); *H01M 10/052* (2013.01); *Y02E 60/122* (2013.01); *H01M 2/202* (2013.01); *H01M 10/0587* (2013.01)
USPC ......................................... 429/121; 429/141

(58) Field of Classification Search
CPC ........................................................ H01M 2/26
USPC .................................................... 429/121, 141
See application file for complete search history.

(56) References Cited

U.S. PATENT DOCUMENTS

| 5,849,431 | A | * | 12/1998 | Kita et al. ..................... 429/164 |
| 5,900,332 | A | * | 5/1999 | Marukawa et al. ............ 429/158 |
| 7,858,221 | B2 | * | 12/2010 | Sato ............................... 429/121 |
| 2005/0079408 | A1 | * | 4/2005 | Hirano ............................. 429/82 |

FOREIGN PATENT DOCUMENTS

| JP | 2001-155710 | 6/2001 |
| JP | 2002-231216 | 8/2002 |

(Continued)

*Primary Examiner* — Milton I Cano
*Assistant Examiner* — Brent Thomas
(74) *Attorney, Agent, or Firm* — Manabu Kanesaka

(57) ABSTRACT

A sealed battery includes a lid closing a container of a sealed battery, an upper current collecting plate, a lead connecting an upper surface to an inner surface of the lid. A welding point of the lead is outside a position corresponding to a periphery of the cap. The lead includes a cylindrical lateral wall part extending vertically, an annular frame portion extending substantially horizontally from a first end of the lateral wall part, and a plurality of supplementary leads that extends substantially horizontally from a second end part of the lateral wall part. The frame portion extends from the first end part in substantially a first direction along a radial direction of the cylindrical lateral wall part, whereas the plurality of supplementary leads extends from the second end part in substantially a second direction opposite to the first direction along the radial direction.

15 Claims, 31 Drawing Sheets

(56) References Cited

FOREIGN PATENT DOCUMENTS

| | | |
|---|---|---|
| JP | 2003-151527 | 5/2003 |
| JP | 2003-297335 | 10/2003 |
| JP | 2003297335 A * | 10/2003 |
| JP | 2004-63231 | 2/2004 |
| JP | 2004-063272 | 2/2004 |
| JP | 2004-273288 | 9/2004 |
| JP | 2004-296388 | 10/2004 |

* cited by examiner

Main lead plate

F I G. 1 3
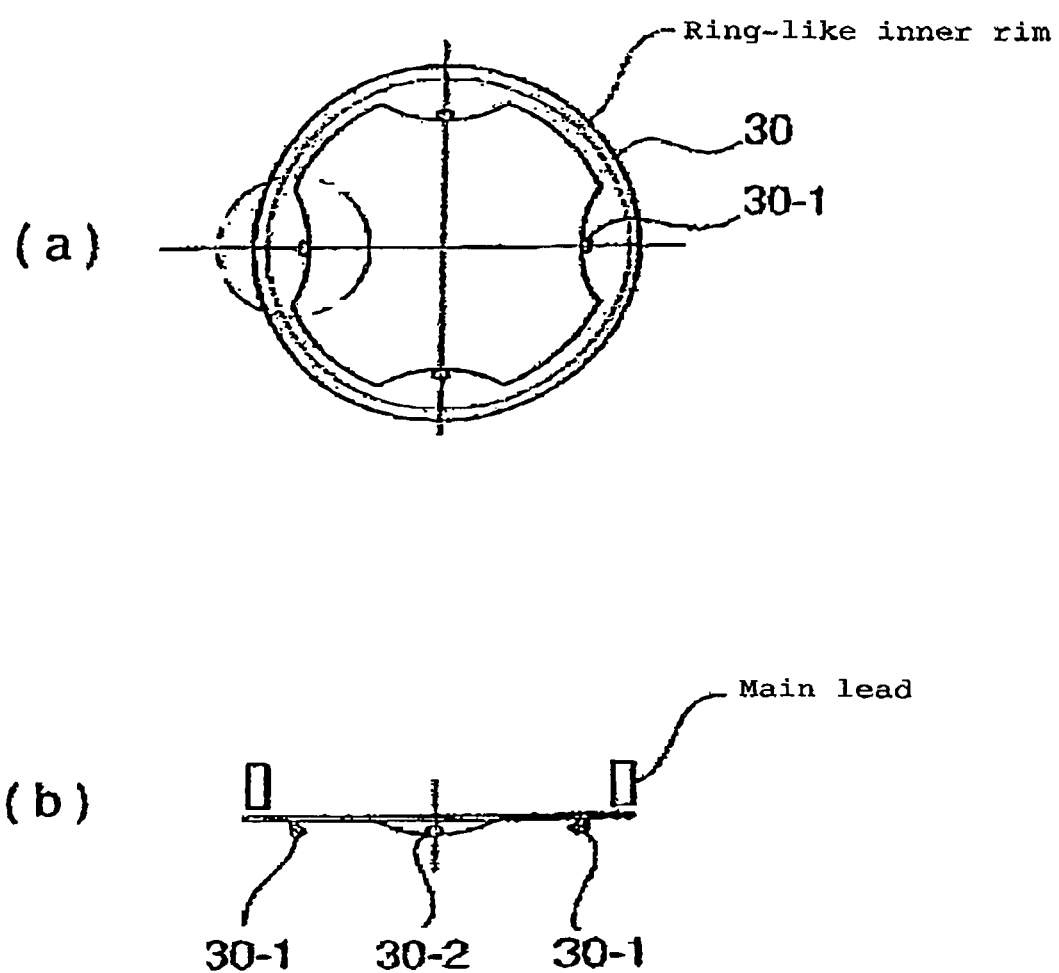

FIG. 14
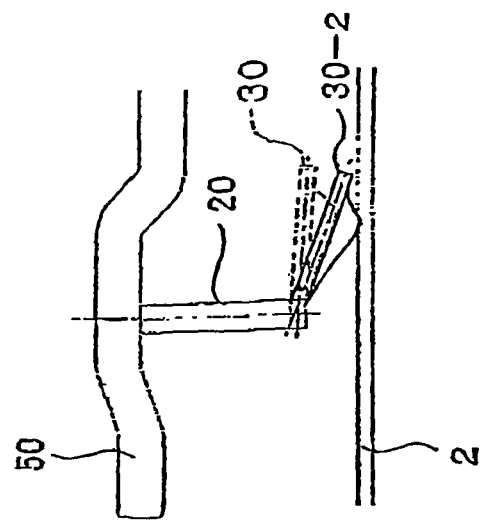
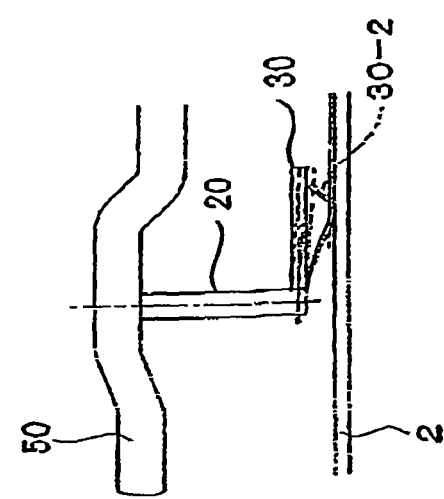
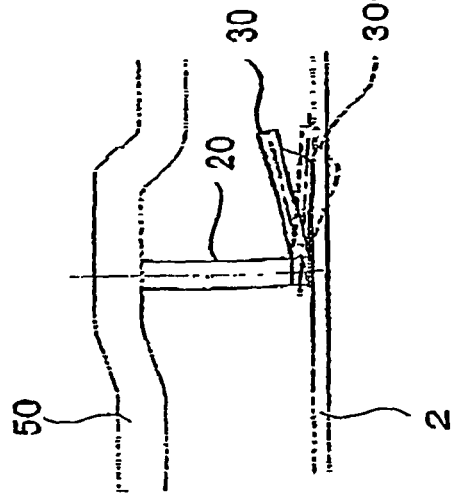

F I G. 2 7
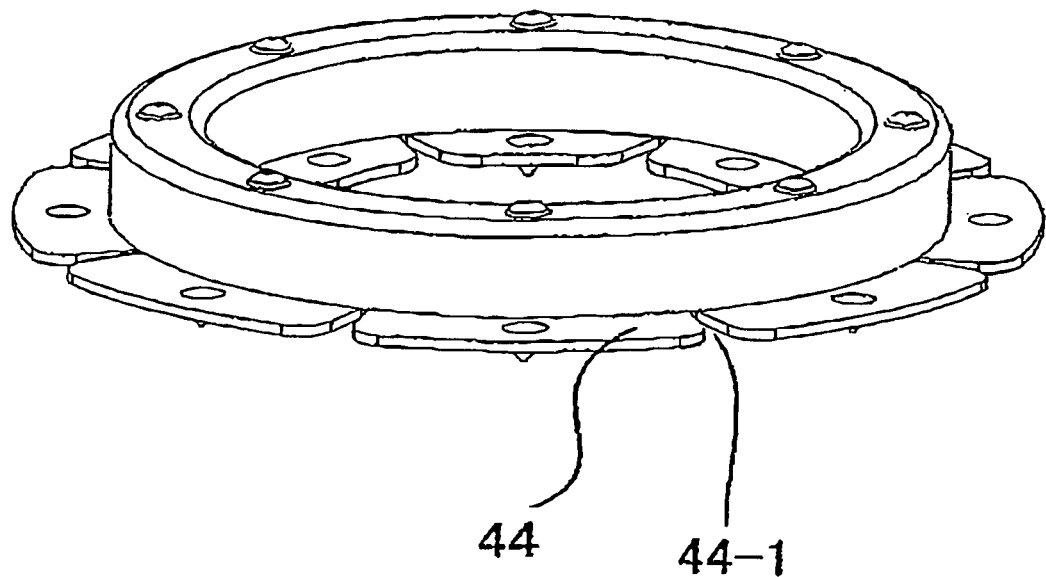
F I G. 2 8
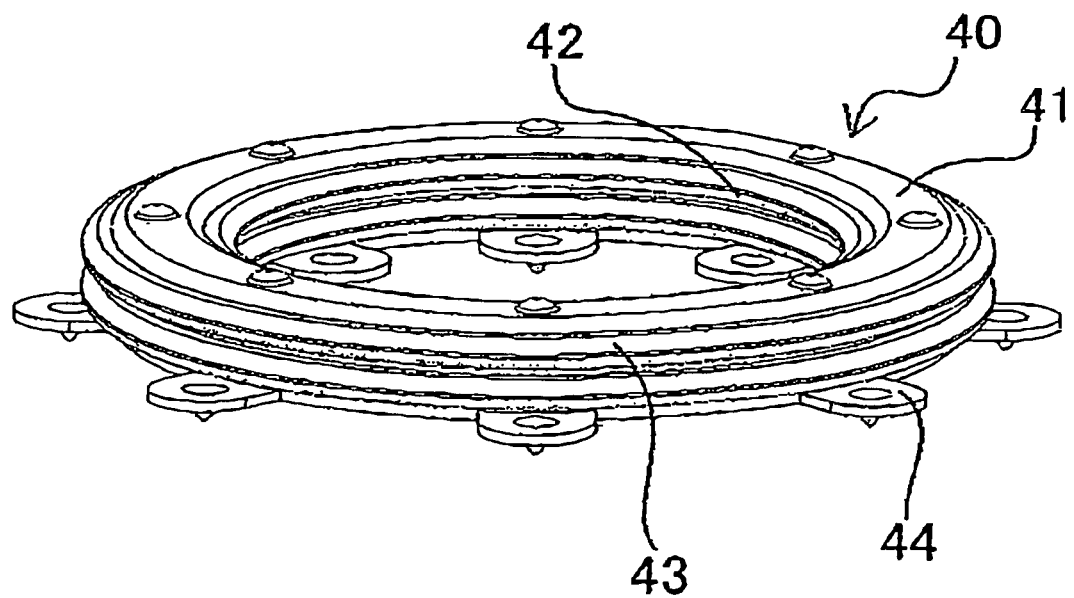

FIG. 5 6 Prior Art
(a)
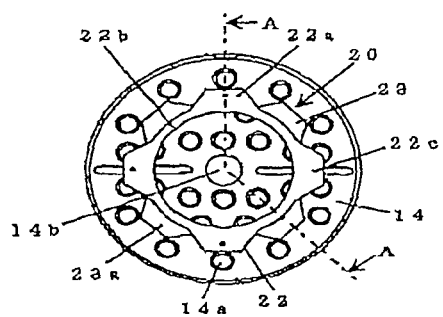
(b)
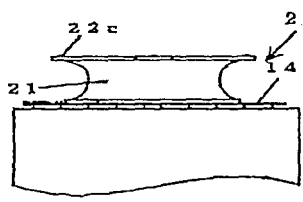
(c)
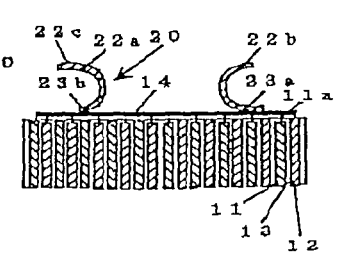
FIG. 5 7 Prior Art
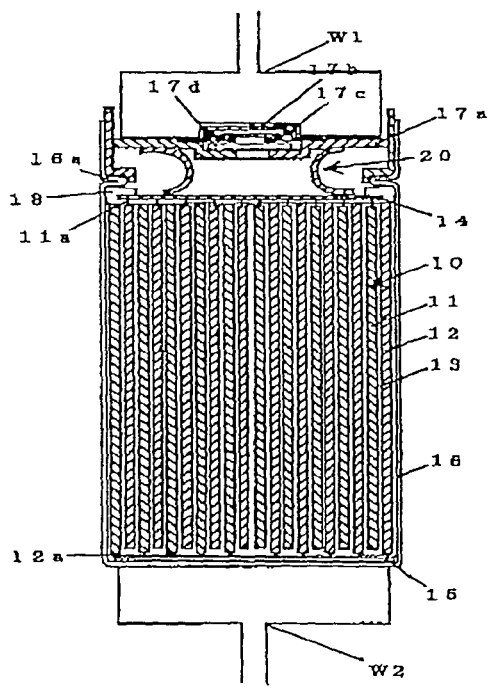

US 8,815,430 B2

SEALED BATTERY AND BATTERY STACK COMPRISING A PLURALITY OF SEALED BATTERIES

TECHNICAL FIELD

The present invention relates to a sealed battery, and battery stack comprising a plurality of sealed batteries, particularly to the improvement of a structure connecting a current collecting plate and a lid of a sealed battery, and of a structure responsible for connecting sealed batteries to each other.

BACKGROUND ART

Generally, an alkali battery such as a nickel metal-hydride battery, nickel-cadmium battery, etc., has a power generating element placed within a battery case which serves as a terminal of one electrode. For example, an exemplary battery shown in FIG. 50 has been proposed where an current collecting plate comprises a current collecting plate 101 and a current collecting lead 103 which has the same thickness with the former and an elongated body are integrally fabricated.

In a battery as described above, as shown in FIG. 51, a power generating element containing three sheets one acting as a positive electrode plate 8, the other as a negative electrode plate 9 with a third sheet acting as a separator 10 being interposed between the foregoing two sheets which are winded into a roll is placed in a metal battery case 6 which serves as a packaging container, a current collecting lead 103 is connected by welding to a sealing body via a single welding point, after that the sealing body 11 is joined to the battery case 6 with an insulating gasket to seal.

When such an alkali battery is applied to drive electric motor-driven tools and electric vehicles which require a high rate charge/discharge cycle, the electric resistance of a current collecting plate and lead connecting between a power generating element and a sealing body is a particularly important factor which greatly affects the performance of the battery. In those applications, the battery is often required to repeat charge/discharge cycles by high current, and to meet the requirement it is necessary to minimize the internal resistance in those use.

The battery in which the internal resistance is minimized includes, for examples the one disclosed in Japanese Unexamined Patent Application Publication No. 2004-63272 (FIGS. 1 to 4, 10, and 11, and paragraphs [0022] to [0038]).

The structure disclosed in the above patent document which enables the minimization of internal resistance will be described below by referring to a nickel-cadmium battery as an example.

FIG. 52 is a perspective view of a nickel-cadmium battery with some parts of interest emphasized in which a current collecting plate has been integrally made by punching. FIGS. 53(a) and 53(b) are the flat and sectional views of the current collecting plate 1. The current collecting plate is made of a nickel-plated iron plate having a thickness of 0.3 mm, and comprises a flat portion 2 and a protruded portion 3 which has been made by punching to have a height of about 2.0 mm.

The current collecting plate has an approximately disc-like shape, and comprises the protruded portion 3 which has a thinned top 4 to serve as a welding point.

The flat portion has holes 5 formed there through. Each hole has fins 52 directing downward along its peripheral margin. Those fins serve as welding points in contact with a positive electrode plate. FIG. 41 is a sectional view of a electrode assembly which will be connected via the current collecting plate 1 above to a sealing body after the electrode assembly is placed in a battery case 6 serving a packaging container.

This nickel-cadmium battery is obtained, as shown in FIG. 54, by placing a battery element comprising a nickel positive electrode plate 8 and a cadmium negative electrode plate 9 with a separator 10 interposed between the two electrode plates all winded into a roll, in a battery case 6 in the form of a cylindrical body with a bottom, putting a current collecting plate 1 as described above on top of the assembly, and connecting a sealing body 11 to the current collecting plat 1 by direct welding via a protruded portion 3.

The sealing body 11 comprises a lid body 12 having a downward directed protrusion circular in contour on its bottom surface, a positive electrode cap 13, and a valve body interposed between lid body 12 and positive electrode cap 13 which consists of a spring 15 and a valve plate 14. The lid body has a vent hole 16 formed at its center.

Before being welded to the sealing body, the current collecting plate 1 is welded to the nickel positive electrode: during this operation, fins 5B protruding backward from the peripheral margin of each hole 5 formed through the flat portion 2 of current collecting plate 1 serve as a welding point. On the other hand, a negative electrode current collecting plate 7 in the form of a disc is placed on the bottom of battery case 6, and connected by welding to the negative electrode plate 9. The open-end portion 11 of battery case 6 is sealed by caulking.

Since the current collecting plate 1 is configured as described above, it is readily possible to provide secure welding points on the disc-shaped metal plate simply by punching the plate, which allows the establishment of secure, reliable connection points.

Since the flat portion 2 connects to an current collecting body which in turn connects to an electrode, and protruded portion 3 serves as a current collecting lead connected to a positive electrode terminal represented by a sealing body, it is possible to integrally fabricate the two portions which permits the reduction of resistances at connection joints.

As shown in FIG. 53(b), each protruded portion 3 has a thinned top surface 4 where electric current can concentrate during welding. In addition, since the thinned top surface is elastic, pressure imposed during welding is securely transmitted to the welded area which will ensure secure connection.

According to the battery configured as above, it is certainly possible to reduce the length of lead. However, lead connections are possessed of a number of problems. Since the welded area is beneath the positive electrode cap 13, and the lead must be welded to the thick lid, heat generated during welding will escape to the lid, which will degrade the assuredness y of welding, and cause variation in welding. It is necessary for the same reason to flow a big current through a single welding point, which will disable the formation of multiple welding points, and thus the establishment of a sufficiently low internal resistance.

Other batteries in which the internal resistance is minimized are cited, for example, in Japanese Examined Patent Application Publication No. 2001-345088 (FIG. 2, and FIG. 55 of its Application), and Japanese Unexamined Patent Application Publication No. 2001-155710 (FIGS. 3 and 4, and FIGS. 56 and 57 of its Application).

The battery described in the former patent document in which the internal resistance is minimized is a battery stack. The battery stack comprises, as shown in FIG. 55, one unit cell B connected to a second unit cell A with a sealing plate 7 of the former being contacted with the bottom of a packaging can 6 of the latter. The unit cell B has an annular joint member 10 which has an aperture at a position corresponding to the cap 8 provided on the sealing plate 7. The annular joint member 10 comprises an annular base portion 11 which has an internal radius smaller than the internal radius of packaging can 6, and a convex portion 12 which has, in profile, a peak and trough, and a projection portion 12 which projects from the trough like a cone. Thus, the current collecting passage between the unit cell A and unit cell B has a length equal to the distance between According to the battery described in the former patent document, a welding point on top of a knob 13 of a ring-like connecting member 10 is outside the periphery of cap 8, but the ring-like connecting member 10 is for connecting a sealing plate of one battery to the bottom of a packaging can of another battery. Thus, its position does not necessarily suggest the preferred positional relations between two welding points formed one at a lead and the other at a sealing plate, one at a current collecting plate and the other at a lead, and one at a current collecting plate and the other at the bottom of container within a battery.

The battery described in the latter patent document in which the internal resistance is minimized comprises, as shown in FIGS. 56 and 57, a battery case 16 comprising an open end which serves also as one electrode, and a sealing body 17 (lid body 17a, positive electrode cap 17b, spring 17c, and valve body 17d) which hermetically seals the open end and serves as the other electrode, and an electrode assembly 10 in which a positive electrode plate 11 and one terminal of negative electrode plate 12 which is connected to an current collecting plate 14, are housed in the battery case 16, wherein the sealing body 17 and current collecting plate 14 are connected by bonding via a lead portion in the form of a thin-bellied drum body 20. Along both the upper and lower flange portions of drum body 20, there are formed alternately broad edge portions 22a, 23a and narrow edge portions 22b, 23b. The two kinds of edge portions of the upper and lower flanges of drum body 20 are arranged as follows. When view from up downward, the broad edge portion 22a overlaps with narrow edge portion 23b below with a space in between. Similarly, the narrow edge portion 22b overlaps with broad edge portion 23a below with a space in between.

The nickel-hydrogen storage battery having a lead portion comprising a drum body 20 as described above is assembled by welding in a manner as described below.

For assembling a nickel-hydrogen storage battery, first, a drum-like cylinder 20 as described above is placed on top of a current collecting plate of positive electrode 14, a welder electrode (not shown) is placed on the narrow edge portions 22b of upper flange portion, and the broad edge portions 23a of lower flange portion axe connected by spot welding to the current collecting plate 14. Then, an electrode assembly 10 in which the broad edge portions 23a has been connected by welding to the current collecting plate of positive electrode 14 is placed in a battery case with a bottom made of nickel-plated iron 16 (the outer surface of the base serves as an external terminal of a negative electrode) (paragraph [0025] of the last-mentioned patent document).

After a sealing body 17 is put into place as described above, one welder electrode 1 is applied to the upper surface of positive electrode cap (external terminal of positive electrode) 17a, while the other welder electrode 2 is applied to the lower surface of the base of battery case 16 (external terminal of negative electrode). While a pressure of $2 \times 10^6$ N/m$^2$ is applied between the pair of welder electrodes W1, W2, a voltage of 24 V is applied across the welder electrodes W1, W2 in a discharging direction to allow an electric current of 3 kA to pass for about 15 msec. During this operation, current is concentrated to contact points between the base of sealing body 17 and knobs 22c formed on the broad edges 22a of upper flange portion 22, and thus the knobs 22c and the base of sealing body 17 are joined by welding to form welding joints. At the same time, contact points between the lower surface of negative electrode current collecting plate 15 and the upper surface of bottom (external terminal of negative electrode) of battery case 16 are joined by welding to form welding joints (supra, paragraph [0027]).

Next, an insulating gasket 19 is applied to the margin of sealing body 17, and a pressure is applied to the sealing body 17 with a presser to push the insulating gasket 19 into the interior of battery case 16 until the lower end of insulating gasket 19 reaches as far as an annular constriction 16a. Then, the open end of battery case 16 is caulked inward to seal the open end, to produce a cylindrical nickel-hydrogen storage battery having a claimed capacity of 6.5 Ah. Incidentally, as a result of pressure applied during this operation, the cylindrical drum body 20 becomes flat with its thin belly portion 21 being totally collapsed (supra, paragraph [0028]).

An alternative method to produce a cylindrical nickel-hydrogen storage battery having a claimed capacity of 6.5 Ah is disclosed which comprises welding before and after the closure of the open end of battery case. The method is as described below.

A drum-like cylindrical body 20 as described above is placed on top of a current collecting plate of positive electrode 14; a welder electrode (not shown) is applied to the peripheral margin of narrow edge portions 22b of upper flange portion 22; and the broad edge portions 23a of lower flange portion 23 and the current collecting plate 14 are joined by spot welding. Then, an electrode assembly 10 in which the drum-like cylindrical body 20 has been connected by welding to the current collecting plate of positive electrode 14 is put into a battery case 16 (its outer surface serves as an external terminal of negative electrode) with a bottom which is made of nickel plated iron (supra, paragraph [0029]).

Next, an insulating gasket 19 is applied to the margin of sealing body 17, and a pressure is applied to the sealing body 17 with a presser to push the insulating gasket 19 into the interior of battery case 16 until the lower end of insulating gasket 19 reaches as far as an annular constriction 16a. Then, the open end of battery case 16 is caulked inward to seal the open end. Incidentally, as a result of pressure applied during this operation, the cylindrical drum body 20 becomes flat with its thin belly portion 21 being totally collapsed. Then, one welder electrode W1 is applied to the upper surface of positive electrode cap (external terminal of positive electrode) 17a, while the other welder electrode W2 is applied to the lower surface of the base of battery case 16 (external terminal of negative electrode). (supra, paragraph [0031]).

Then, while a pressure of $2 \times 10^6$ N/m$^2$ is applied between the pair of welder electrodes W1, W2, a voltage of 24V is applied across the welder electrodes W1, W2 in a discharging direction to allow an electric current of 3 kA to pass for about 15 msec. During this operation, current is concentrated to contact points between the base of sealing body 17 and knobs 22c formed on the broad edges 22a of upper flange portion 22, and thus the knobs 22c and the base of sealing body 17 are joined by welding to form welding joints. At the same time, contact points between the lower surface of negative electrode current collecting plate 15 and the upper surface of bottom (external terminal of negative electrode) of battery case 16 are joined by welding to form welding joints (supra, paragraph [0032]).

The battery disclosed in the last-mentioned patent document is fabricated as described above. In the battery, since the welding points formed between the bottom surface of sealing body 17 and knobs 22c on the broad edge portions 22a of upper flange portion 22 of drum-like cylindrical body 20 are, in a flat view, outside the periphery of positive electrode cap 17a, it will be safely concluded that the resistance of sealing body is reduced.

However, with this battery, the drum-like cylindrical body 20 is made flat with its thinned belly 21 collapsed in the presence of pressure applied during closure of the open end of battery case, and the welding points between the base of lid body 17 and the knobs 22c on broad edge portions 22a of upper flange portion 22 of the drum-like cylinder 20 are displaced, in a flat view, so much from the welding points between the broad edge portion 23a of lower flange portion and the current collecting plate 14 that lead extending from the welding points formed between the inner surface of sealing body (lid) and drum-like cylindrical body 20 (lead) to the most adjacent points among the welding points formed on the current collecting plate has a considerable length. Thus, arrangement of those welding points is not sufficient for producing a significantly lowered electric resistance.

Usually, the welding point between the lower surface of negative electrode current collecting plate 15 and the upper surface of the bottom of battery case 16 (external terminal of negative electrode) is at the center or, in a flat view, beneath the positive electrode cap 17a. However, according to the configuration of this battery, the upper welding points are considerably displaced, in a flat view, from the lower welding points, arrangement of those welding points is not sufficient for producing a significantly lowered electric resistance.

DISCLOSURE OF THE INVENTION

Problems to be Solved by the Invention

As described above, the conventional battery is problematic in having a considerable internal electric resistance because with it a welding point between a sealing body (lid) and lead is located at a position beneath a cap.

Specifically, when an electrical connection point through which current is extracted outside from the battery is provided on a cap, a welding point formed between the cap and a lid adds a resistance, and cap which is constituted of a thinned plate has a high electric resistance, and current must pass through these resistance incremented elements. Furthermore, when another connection point through which current is extracted outside from the battery is provided at a position on the upper surface of lid which is outside, in a flat view, from the periphery of cap, and a welding point between lid and lead is located, in a flat view, beneath the cap as described above, current must pass through the body of lid, which will lead to the elongated current passage and the increase of internal resistance.

Among conventional sealed batteries there are some in which a welding point between a sealing body (lid) and lead is not located beneath a cap. With such a battery, however, the lid is closed after welding and, because of this, lead must have a redundant length which leads to the increased internal resistance.

The object of the present invention is to provide a sealed battery in which, when a lid is connected via lead to a current collecting plate (upper current collecting plate), welding points of lead are selected to occur at specified positions of the lid and upper current collecting plate, so that the battery can have a low electric resistance and exhibit excellent output power performance. The invention also relates to the configuration of lead used in such a sealed battery, and to a battery stack comprising a plurality of such sealed batteries.

Means for Solving the Problems

To attain the above object, the present inventors had studied hard, and found that it is possible to attain the above object and minimize the voltage loss by identifying the relationship of the location of a welding point of lead on the lid with the length of lead that gives a satisfactory result. This finding led to the present invention.

To attain the above object, the present invention has following features.

(1) A sealed battery comprising a lid for closing the open end of a container which has, at the center of its upper surface, a valve body covered with a cap to form a safety valve, and an upper current collecting plate connected via lead to the inner surface of lid, wherein a welding point of lead to the inner surface of lid is, in a flat view, outside the periphery of cap, and the length of lead from the welding point on the inner surface of lid to the nearest welding point on the upper current collecting plate (the length will be called "L1" hereinafter) is 1 to 2.1 times as large as the shortest distance ("X1" hereinafter) between the welding point of lead on the inner surface of lid and the upper surface of upper current collecting plate.

(2) A sealed battery as described in paragraph (1) wherein connection of the lead by welding to the upper surface of upper current collecting plate is performed by passing current in the form of alternate pulses.

(3) A sealed battery as described in paragraph (1) or (2) wherein the lead is shaped like a ring, and one end surface of the ring-shaped lead is welded to the inner surface of lid while the other end surface of the ring-shaped lead is welded to the upper current collecting plate.

(4) A sealed battery as described in paragraph (3) wherein the lead comprises a ring-shaped main lead and a ring-shaped supplementary lead, and wherein one end surface of main lead is welded to the inner surface of lid and the other end of main lead is welded to the upper current collecting plate via the supplementary lead.

(5) A sealed battery as described in paragraph (1) or (2) wherein the lead is shaped like a double-wall structure comprising a frame portion and lateral wall portions (a lateral wall portion with the double structure) constituting the double-wall extending downward from the inner and outer edges of the frame portion, and wherein the frame portion of lead is welded to the inner surface of lid and the lowermost ends of two lateral wall portions constituting the double-wall of lead are welded to the upper current collecting plate.

(6) A sealed battery as described in paragraph (5) wherein the lead comprises a main lead portion shaped like a double-wall structure comprising a frame portion and lateral wall portions constituting the double-wall, and supplementary lead portions, the lateral wall portion constituting the double-wall of main lead portion has respectively, at its lowermost end, the supplementary lead portion in the form of a plurality of tabs or a continuous plate, and wherein the frame portion of main lead portion is welded to the inner surface of lid and the supplementary lead portions are welded to the upper current collecting plate.

(7) A sealed battery as described in paragraph (1) or (2) wherein the lead is shaped like a single-wall structure comprising a frame portion and a lateral wall portion extending downward from the inner or outer edge of the frame portion, and wherein the frame portion of lead is welded to the inner surface of lid and the lowermost end of the lateral wall portion of lead is welded to the upper current collecting plate.

(8) A sealed battery as described in paragraph (7) wherein the lead comprises a main lead portion shaped like a single-wall structure comprising a frame portion and a lateral wall portion, and a supplementary lead portion, the lateral wall portion of main lead portion has, at its lowermost end, the supplementary lead portion in the form of a plurality of tabs or a continuous plate, and wherein the frame portion of main lead portion is welded to the inner surface of lid and the supplementary lead portion is welded to the upper current collecting plate.

(9) A sealed battery as described in paragraph (1) or (2) wherein the lead is shaped like a double-wall structure comprising a frame portion and lateral wall portions (a lateral wall portion with the double structure) constituting the double wall extending upward from the inner and outer edges of the frame portion, and wherein the uppermost ends of two lateral wall portions constituting the double wall of lead are welded to the inner surface of lid and the frame portion of lead is welded to the upper current collecting plate.

(10) A sealed battery as described in paragraph (9) wherein the lead comprises a main lead portion shaped like a double-wall structure comprising a frame portion and lateral wall portions constituting the double-wall, and supplementary lead portions, the lateral wall portion constituting the double-wall of main lead portion has respectively, at its lowermost end, the supplementary lead portion in the form of a plurality of tabs or a continuous plate, and wherein the supplementary lead potions are welded to the inner surface of lid and the frame portion of main lead portion is welded to the upper current collecting plate.

(11) A sealed battery as described in paragraph (1) or (2) wherein the lead is shaped like a single-wall structure comprising a frame portion and a lateral wall portion extending upward from the inner or outer edge of the frame portion, and wherein the uppermost end of the lateral wall portion of lead is welded to the inner surface of lid and the frame portion of lead is welded to the upper current collecting plate.

(12) A sealed battery as described in paragraph (11) wherein the lead comprises a main lead portion shaped like a single-wall structure comprising a frame portion and a lateral wall portion, and a supplementary lead portion, the lateral wall portion of main lead portion has, at its uppermost end, the supplementary lead portion in the form of a plurality of tabs or a continuous plate, and wherein the supplementary lead portion is welded to the inner surface of lid and the frame portion of main lead is welded to the upper current collecting plate.

(13) A sealed battery as described in any one of paragraphs (1) to (12) wherein the welding point on the upper surface of upper current collecting plate is disposed to correspond, in a flat view, to a position outside the periphery of cap.

(14) A sealed battery comprising a lid for closing the open end of a container which has, at the center of its upper surface, a valve body covered with a cap to form a safety valve, and an upper current collecting plate connected via lead to the inner surface of lid, wherein a welding point of lead to the inner surface of lid is, in a flat view, outside the periphery of cap, and a welding point formed by the lead on the upper current collecting plate falls in a circular band enclosed between a concentric circle around the center of upper current collecting plate and having a radius 41% of the radius of said plate, and another concentric circle having a 69% radius.

(15) A sealed battery as described in paragraph (14) wherein the lead is shaped like a ring, and one end surface of the ring-shaped lead is welded to the inner surface of lid while the other end surface of the ring-shaped lead is welded to the upper current collecting plate.

(16) A sealed battery as described in paragraph (15) wherein the lead comprises a ring-shaped main lead and a ring-shaped supplementary lead, and wherein one end surface of main lead is welded to the inner surface of lid and the other end of main lead is welded to the upper current collecting plate via the supplementary lead.

(17) A sealed battery as described in any one of paragraph (1) to (16) wherein the welding point on the upper surface of upper current collecting plate is 4 to 16 in number.

(18) A sealed battery comprising a lid for closing the open end of a container which has, at the center of its upper surface, a valve body covered with a cap to form a safety valve, an upper current collecting plate connected via lead to the inner surface of lid, and a lower current collecting plate welded to the inner surface of bottom of the container, wherein a welding point of lead to the inner surface of lid is, in a flat view, outside the periphery of cap, and a welding point formed between the lower current collecting plate and inner surface of bottom of the container is disposed to correspond, in a flat view, to a position laterally from the center at least outside the periphery of cap.

(19) A sealed battery as described in paragraph (18) wherein the welding point formed between the lower current collecting plate and inner surface of bottom of the container includes one at the center and 4 to 16 points located, in a flat view, outside the periphery of cap.

(20) A sealed battery as described in any one of paragraphs (1) to (19) wherein a electrical connection point through which current is extracted outside from battery is disposed, in a flat view, outside the periphery of cap placed on the upper surface of lid.

(21) A lead for a sealed battery which is welded on one end to the inner surface of a lid and on the other end to the upper surface of an upper current collecting plate within a sealed battery, wherein the lead has a ring-like shape comprising a lateral wall whose upper end serves as a welding surface and lower end serves as another welding surface.

(22) A lead as described in paragraph (21) for a sealed battery comprising a main lead having a ring-like lateral wall portion and a supplementary lead, wherein the lateral wall portion has, on its upper or lower end, a supplementary lead in the form of a plurality of tabs or a circular plate, and the supplementary lead has a welding surface.

(23) A lead as described in paragraph (21) or (22) for a sealed battery wherein the lead is shaped like a circle, ellipse, or polygon.

(24) A lead for a sealed battery which is welded on one end to the inner surface of a lid and on the other end to the upper surface of an upper current collecting plate within a sealed battery, wherein the lead is shaped like a double-wall structure comprising a frame portion and lateral wall portions (a lateral wall portion with the double structure) constituting the double-wall extending downward or upward from the inner and outer edges of the frame portion, and wherein the frame portion has one welding surface, and the lowermost ends or uppermost ends of lateral wall portions constituting the double-wall have the other welding surface.

(25) A lead as described in paragraph (24) for a sealed battery in the form of a double-wall structure comprising a frame portion and lateral wall portions, wherein the profile of the lead is like an inverted-V, inverted-U, V, or U.

(26) A lead as described in paragraph (24) or (25) for a sealed battery wherein the lead comprises a main lead portion shaped like a double-wall structure comprising a frame portion and lateral wall portions constituting the double-wall, and supplementary lead portions, the lateral wall portion constituting the double-wall of main lead portion has respectively, at its lowermost or uppermost end, the supplementary lead portion in the form of a plurality of tabs or a continuous plate, and wherein the supplementary lead portions have another welding surface.

(27) A lead for a sealed battery which is welded on one end to the inner surface of a lid and on the other end to the upper surface of an upper current collecting plate within a sealed battery, wherein the lead is shaped like a single-wall structure comprising a frame portion and a lateral wall portion extending downward or upward from the inner or outer edge of the frame portion, and wherein the frame portion has one welding surface, and the lowermost end or uppermost end of the lateral wall portion has the other welding surface.

(28) A lead as described in paragraph (27) for a sealed battery wherein the lead comprises a main lead portion shaped like a single-wall structure comprising a frame portion and a lateral wall portion, and a supplementary lead portion, the lateral wall portion has, at its lowermost or uppermost end, the supplementary lead portion in the form of a plurality of tabs or a continuous plate, and wherein the supplementary lead portion has another welding surface.

(29). A lead as described in any one of paragraph (24) to (28) for a sealed battery wherein the inner and outer edges of the frame portion are circular.

(30) A lead as described in any one of paragraphs (24) to (29) for a sealed battery wherein the lateral wall portion is processed to be shaped like a bellow.

(31) A lead as described in any one of paragraphs (24) to (30) for a sealed battery wherein the frame portion and lateral wall portion are divided along the circumference at certain intervals to provide a plurality of parts.

(32) A lead as described in any one of paragraph (24) to (30) for a sealed battery wherein the lateral wall portion is slitted to the vertical direction from the top or the bottom along the circumference at certain intervals to be provided at least partially or completely cut.

(33) A lead as described in any one of paragraph (21) to (32) for a sealed battery wherein each of the welding surfaces of the lead has a knob.

(34) A battery stack comprising a plurality of batteries each of which comprises a lid for closing the open end of a container which has, at the center of its upper surface, a valve body covered with a cap to form a safety valve, and an upper current collecting plate connected via lead to the inner surface of lid, the battery stack being obtained by connecting the upper surface of lid of one sealed battery via a cell-to-cell connector to the outer surface of container of another sealed battery and repeating the connection as needed, wherein a welding point of lead to the inner surface of lid is, in a flat view, outside the periphery of cap, and a welding point formed between the cell-to-cell connector and the upper surface of lid is disposed to correspond, in a flat view, to a position laterally outside the periphery of cap.

(35) A battery stack as described in paragraph (34) wherein a welding point formed between the cell-to-cell connector and the external surface of container is disposed to correspond, in a flat view, to a position laterally outside the periphery of cap.

"One end surface (welding surface)" and "the other end surface (welding surface)" of a lead used herein refers to a surface of lead which has an area sufficiently wide to permit welding, including a surface which ray be welded to another element by a supplementary lead.

The "inner surface of lid," and "upper surface of upper current collecting plate" used herein include not only the flat surfaces of lid and upper current collecting plate, but also their downward or upward curved or flexed surfaces.

Incidentally, the term "ring-like main lead" refers to a ring-shaped lead and has a function to electrically connect via a supplementary lead between a lid and an upper current collecting plate. The term "supplementary lead" refers to a plurality of tabs or continuous plate provided at the end of a ring-like lead, has a spring property (spring activity) to absorb the variation in vertical position of upper current collecting plates one after another, is provided for electrically connecting a main lead with upper current collecting plate or lid. The supplementary lead may be welded to a ring-like main lead or prepared integrally with a ring-like main lead.

The term "main lead portion" refers to main portion of a lead in the form of a double-wall structure (or a single-wall structure) having a frame portion and two lateral wall portions (or a lateral wall portion) extending downward or upward from the inner and outer edges (or the inner or outer edge) of a frame portion, and has a function to electrically connect a lid and an upper current collecting plate via supplementary lead portion. The term "supplementary lead portion" refers to a plurality of tabs or a continuous plate provided on the ends (or one end) of lateral wall portions (or a lateral wall portion), and has a spring property (spring activity) to absorb the variation in vertical position of upper current collecting plates one after another, and is provided for electrically connecting a main lead with upper current collecting plate or lid.

The term "frame portion" refers to a portion bounded by two contour lines such as inner and outer edges which has an area sufficiently wide to permit welding, and serves as a basement from which lateral wall portions constituting the double-wall of lead extend downward or upward.

Effects of the Invention

The present invention provides a battery capable of providing high output by disposing a electrical connection point through which current is extracted outside from battery, in a flat view, outside the periphery of cap placed on the upper surface of lid, which is achieved by locating welding points of lead between lid and upper current collecting plate, and welding points between lower current collecting plate and bottom of container at specified positions.

As long as L1/X1 is in the range of 1 to 2.1, the lead preferably has a length as short as possible. When welding points are arranged to satisfy the above requirement, the resulting battery, even if it is a cylindrical battery, can provide output as high as 1400 W/kg or more, a level that has been attained heretofore only by a square type nickel metal-hydride battery which has a special structure and is expensive.

It is possible to make L1/X1 fall within 1 to 2.1 while minimizing the resistance of lead by employing a lead in the form of a ring, or a double walled ring comprising a frame portion and two (or one) lateral wall portions. It is also possible to arrange the welding points on lid and upper current collecting plate at specified positions by employing a lead having the above structure.

It is also possible to reduce the internal resistance of a battery stack by selectively arranging the welding points on lid and upper current collecting plate at specified positions.

BRIEF DESCRIPTION OF THE DRAWINGS

FIG. 13 is a flat view and lateral view of a ring-shaped lead comprising a main lead and supplementary lead representing an example (Examples 2 to 11) of the invention.

FIG. 14 shows how a ring-shaped lead comprising a main and supplementary lead which has been welded to a lid should be welded to a current collecting plate.

FIG. 27 is a perspective view of a ring-shaped lead comprising a main lead and supplementary lead, the main lead being in the form of a double-walled ring having an inverted U-shaped profile and supplementary lead in the form of skirts having slits at regular intervals.

FIG. 28 is a perspective view (fontal view) of a ring-shaped lead representing an example (Example 16) of the invention, the lead being basically similar to the one consisting of a double-walled ring having an inverted U-shaped profile, excepting that the lateral walls acting as a bellow.

FIG. 56 gives flat, lateral and sectional views of a conventional lead in the form of a drum-like cylinder.

FIG. 57 is a sectional view of a battery for showing how an electrode assembly is inserted into a battery case, to be welded to a sealing body via a current collecting plate as shown in FIG. 56.

REFERENCE NUMERALS

Figure 1:
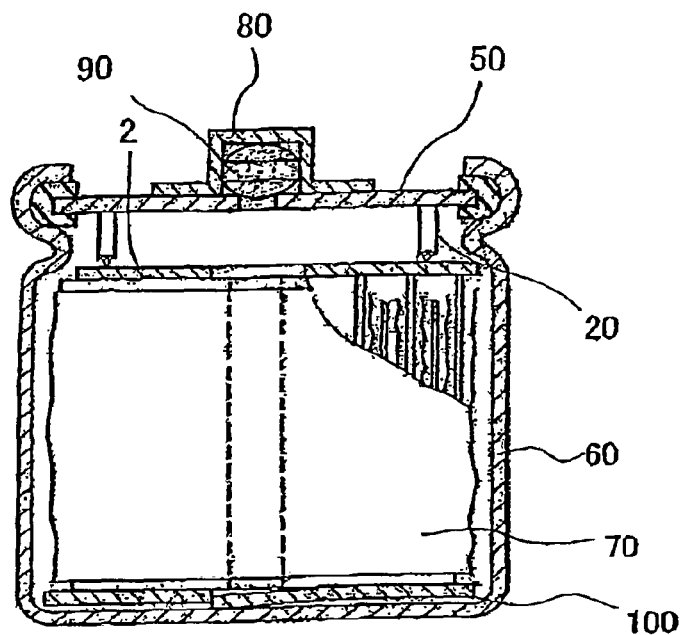
FIG. 1 is a sealed battery representing an example (Example 1) of the invention which incorporates a ring-shaped lead.

2. Upper current collecting plate (current collecting plate of positive electrode).
2-1. Welding points of lead on upper current collecting plate.
2-2. Slits inscribed on upper current collecting plate.
2-3. Ridges formed on upper current collecting plate (portions to indent with electrode)
12. Ribbon-like lead plate
13. Welding point between ribbon-like lead plate and lid
20. Ring-shaped lead (main lead)
20a, 20b. Spikes on ring-shaped lead
30. Supplementary lead of ring-shaped lead 20
30-1. knobs on supplementary lead of ring-shaped lead 20
30-2. Jutted chip from supplementary lead of ring-shaped lead 20
40. Lead in the form of a double-walled ring having an inverted (or upright) V-shaped or (or upright) U-shaped profile
41. Frame portion of lead 40 in the form of a double-walled ring
41-1. Inner edge of ring portion 41 of lead in the form of a double-walled ring 41-2. Outer edge of ring portion 41 of lead in the form of a double-walled ring
41a. Knob on ring portion 41 of lead in the form of a double-walled ring
42, 43. Lateral wall portion of lead 40 in the form of a double-walled ring
42-1, 43-1. Slits formed on lateral wall portion of lead 40 in the form of a double-walled ring
44. Supplementary lead portion of lead 40 consisting of a series of double-walled braces arranged in a ring
44a. Knob on supplementary lead portion 44 of lead consisting of a series of double-walled braces arranged in a ring
45. Eight pieces of braces obtained by dividing lead in the form of a double-walled ring having an inverted U-shaped profile
46. Flat top portions of eight pieces 45 of braces obtained by dividing lead in the form of a double-walled ring
46a. Knobs on the flat top portions 46 of eight pieces of braces obtained by dividing lead in the form of a double-walled ring
47, 48. Lateral wall portion of each of eight pieces 45 of braces obtained by dividing lead in the form of a double-walled ring
50. Lid
51. Inflection on lid corresponding to the peripheral edge of cap
60. Container
70. Electrode assembly
80. Cap
90. Valve body
100. Lower current collecting plate (negative electrode current collecting plate)
100-1. Welding points between the outer surface of lower current collecting plate and the inner surface of bottom of container
100-2. Welding point at the center of lower current collecting plate (single point)
110. Cell-to-cell connector (similar in structure to ring-shaped lead)
111. Welding point between cell-to-cell connector and external surface of lid of 1st cell
112. Welding point between cell-to-cell connector and external surface of lid of 2nd cell
110'. Alternative cell-to-cell connector (similar in structure to lead in the form of a double-walled ring having an inverted V-shaped profile)

BEST MODE FOR CARRYING OUT THE INVENTION

The present inventors analyzed the contributions of individual elements involved in the internal resistance of a sealed battery, and found that the lead resistance accounts for the majority of the internal resistance of a sealed battery. Based on the finding, they had sought a method for reducing the length of lead extending between a lid and a current collecting plate of positive electrode in order to minimize the resistance of lead, and found that it is possible to minimize the resistance of lead extending between the lid and current collecting plate of positive electrode by making the ratio L1/X1 of lead fall in the range of 1 to 2.1, preferably 1 to 1.7, more preferably 1 to 1.4. Moreover, they found that it is possible to further reduce the resistance of lead by displacing a welding point between lid and lead outside a circumference of lid corresponding to the peripheral margin of a cap.

According to the invention, as shown in FIGS. 1 to 4, and 7 to 10, the length (L1) of lead (main lead (20), main lead portion (40), supplementary lead portion (44)) from a (distal) welding point on the inner surface of a lid (50) to a (proximal) welding point of lead (supplementary lead (30), supplementary lead portion (44), main lead portion (40)) on the upper surface of an upper current collecting plate (2) nearest to the distal welding point, is chosen, when the shortest distance between the distal welding point of lead (20), (40), or (44) and the upper surface of upper current collecting plate (2) is termed (X1), to make L1 to 2.1 times as large as X1. It is possible to minimize the internal resistance and maximize the output power density by constructing involved elements so as to minimize the ratio L1/X1. It is more preferred to make the ratio L1/X1 not more than 1.7.

Figure 34:
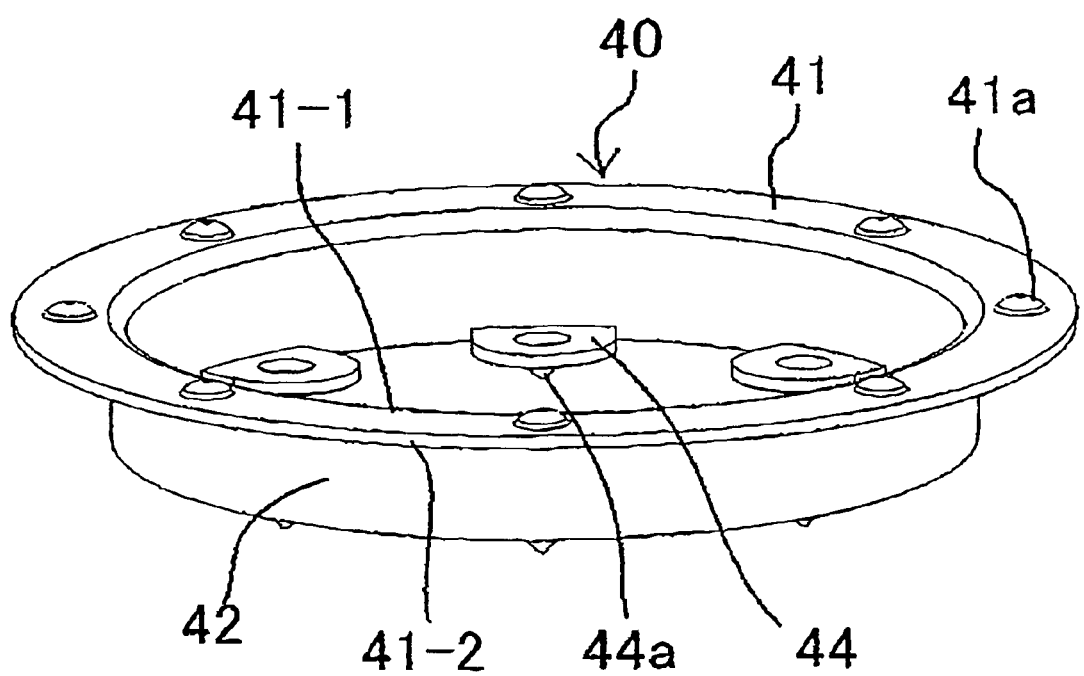
FIG. 34 is a perspective view of a ring-shaped lead representing an example (Example 14) of the invention, the lead being basically similar to the one consisting of a double-walled ring having an inverted U-shaped profile, except that the outer lateral wall is removed.
Figure 35:
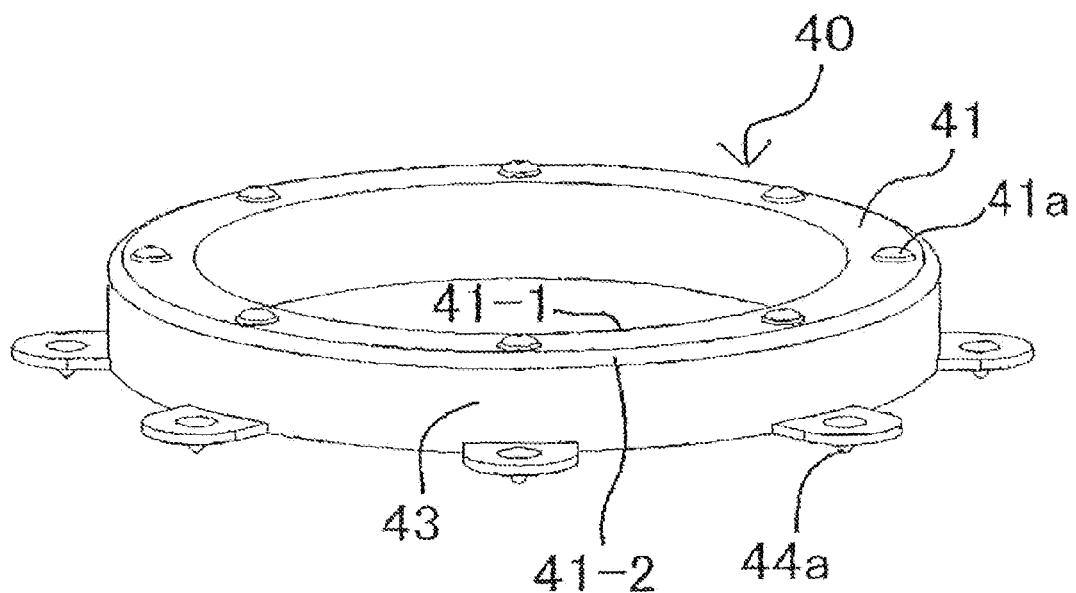
FIG. 35 is a perspective view of a ring-shaped lead representing an example (Example 15) of the invention, the lead being basically similar to the one consisting of a double-walled ring having an inverted U-shaped profile, except that the inner lateral wall is removed.

It is possible to make the ratio L1/X1 fall in the range of 1 to 2.1 by choosing a lead having an appropriate form. Suitable leads having an appropriate form may include a ring-shaped lead (20) as shown in FIGS. 11 to 14, lead (40) in the form of a double-walled ring comprising a frame portion and inner and outer lateral wall portions as shown in FIGS. 15 to 33, and lead (40) in the form of a single-walled ring comprising a frame portion and inner or outer lateral wall portion as shown in FIGS. 34 and 35.

Figure 2:
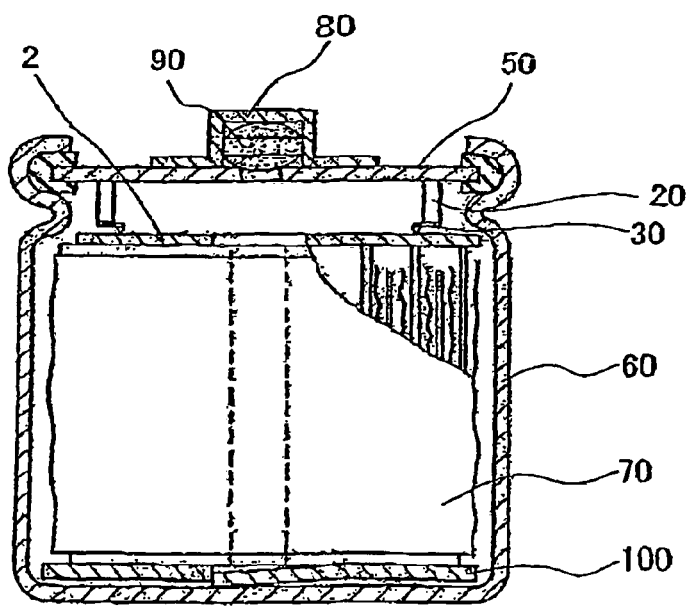
FIG. 2 is a sealed battery representing an example (Examples 2, 3, etc.) of the invention which incorporates a ring-shaped main lead and a ring-shaped supplementary lead (welding points located inward).
Figure 3:
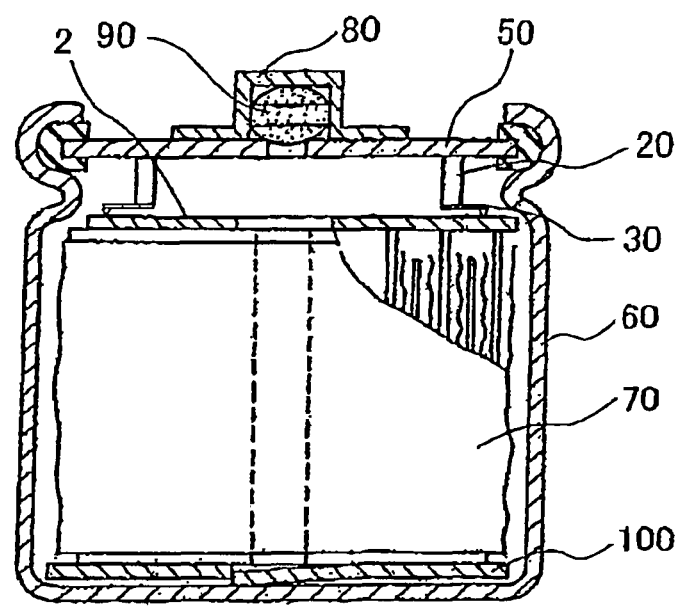
FIG. 3 is a sealed battery representing an example (Examples 7, 8, etc.) of the invention which incorporates a ring-shaped main lead and a ring-shaped supplementary lead (welding points located outward).
Figure 4:
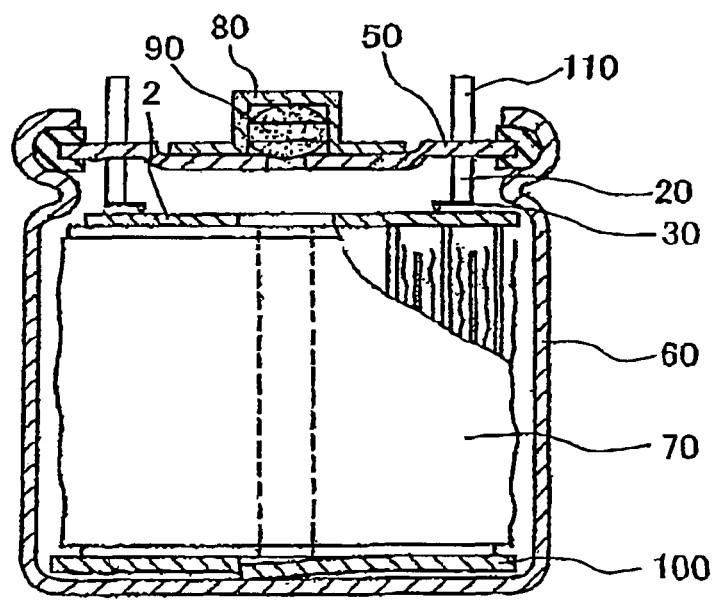
FIG. 4 is a sealed battery representing an example (Examples 9, 10, etc.) of the invention which incorporates a ring-shaped main lead and a ring-shaped supplementary lead (welding points located outward) and which has an indented lid.

According to the invention, as shown in FIGS. 1 to 4, 7 to 10, and 37 and 38, a (distal) welding point between the inner surface of a lid (50) and the distal end of lead (main lead (20), main lead portion (40), supplementary lead portion (44)) is displaced outside a circumference (51) of lid corresponding to the peripheral margin of a cap (80). Displacing the connection point from which current is withdrawn externally outside a circumference corresponding to the peripheral margin of cap as shown in FIG. 4 makes it possible to reduce the length of current passage, and thus decrease the internal resistance and increase the output power density.

Figure 11:
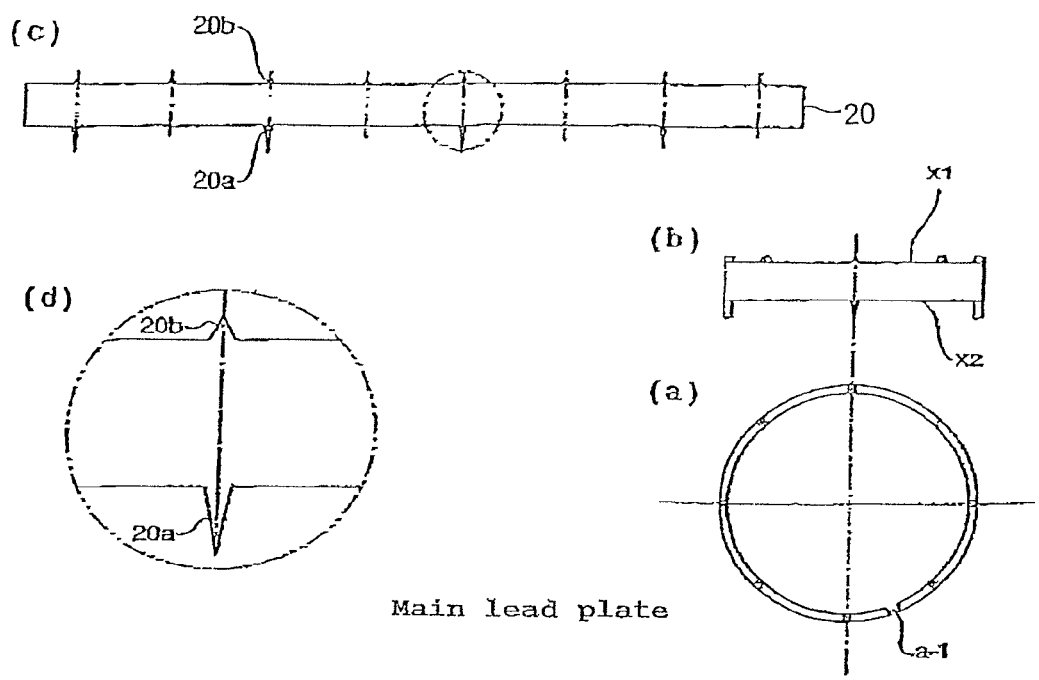
FIG. 11 is a ring-shaped lead (main lead) representing an example (Examples 1 to 11) of the invention.
Figure 12:
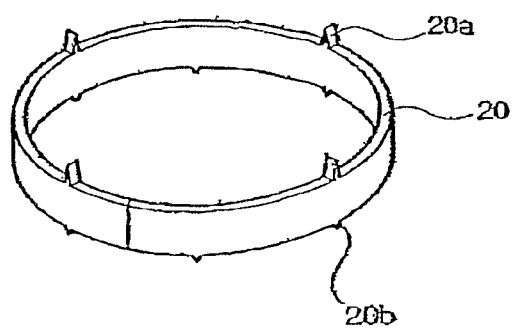
FIG. 12 is a perspective view of a ring-shaped lead representing an example (Example 1) of the invention.

Employment of a ring-shaped lead (20) as shown in FIGS. 1, 11 and 12 can reduce the length of lead (20) from its distal welding point against lid (50) to its proximal welding point against the upper current collecting plate (2) as described above, and make it readily possible to displace the distal welding point of lead (20) against lid (50) outside a circumference (51) corresponding to the peripheral margin of a cap (80), which makes it possible not only to reduce the resistance of the lead but also to provide multiple welding points between lid and lead and between lead and upper current collecting plate, thus reducing the resistance of welding joints against lid and upper current collecting plate, and improving thereby the high-rate discharging ability of a battery.

The present inventors also found that it is possible to obtain a lead ensuring the highly stable reproducibility by attaching a supplementary lead (30) thereto as shown in FIGS. 2, and 13 and 14. Specifically, a ring-shaped lead comprising a main lead (20) and a supplementary lead (30) is used as a lead, and, after the distal end of main lead (20) is welded to the inner surface of a lid (50), the proximal end of main lead (20) is welded to an upper current collecting plate (2) via supplementary lead (30). The interval between lid and upper current collecting plate varies considerably from one battery to another. The variation of the interval can be absorbed by supplementary lead which acts as a buffer.

The supplementary lead (30) and main lead (20) may be prepared separately to be united by welding later, or the two lead portions may be prepared integrally.

The lead may take the form of a double-walled ring (40) comprising a frame portion (41) with inner and outer edges (41-1, 41-2) and inner and outer lateral wall portions (42, 43) as shown in FIGS. 15 to 18, or of a single-walled ring (40)

comprising a frame portion (41) with inner and outer edges (41-1, 41-2) and inner or outer lateral wall portion (42 or 43) as shown in FIGS. 34 and 35. According to the lead configured as above, it is possible to easily prepare a lead from a material plate at low cost, and reduce the length of lead (40) (including supplementary lead (44)) from the distal welding point against lid (50) to the proximal welding point against upper current collecting plate (2) as described above. In addition, it is readily possible to displace the distal welding point of lead (40) against lid (50) outside a circumference (51) corresponding to the peripheral margin of a cap (80), thus enabling the production of a battery with a low internal resistance.

Figure 15:
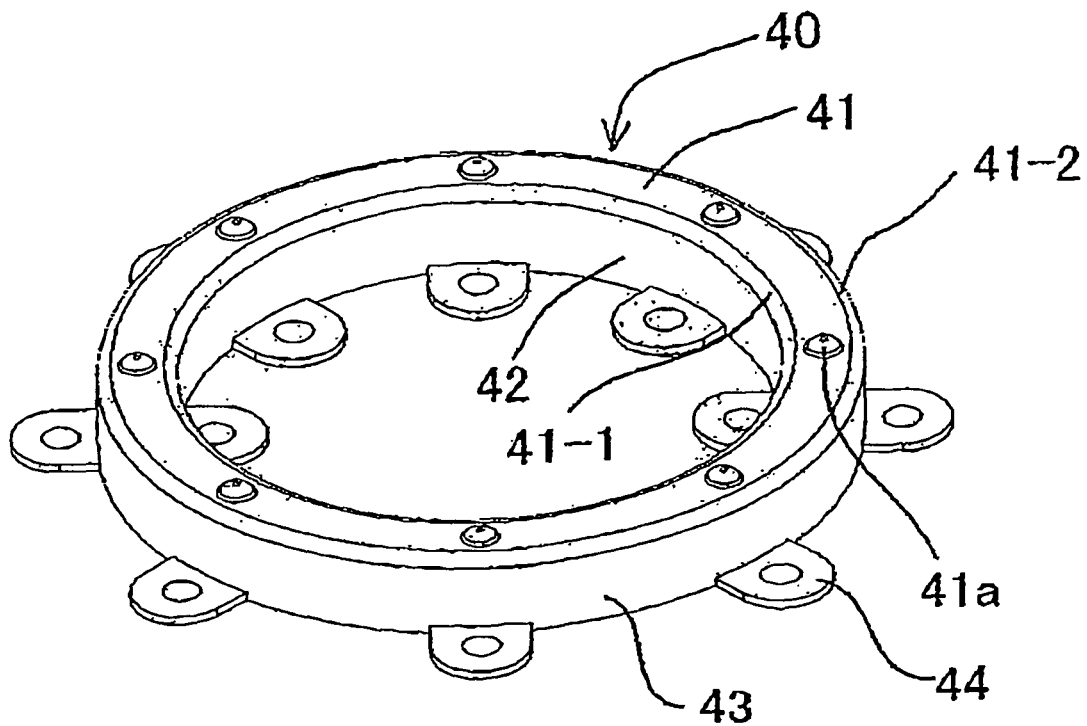
FIG. 15 is a perspective view (frontal view) of a ring-shaped lead comprising a main lead and supplementary lead representing an example (Examples 12 and 17) of the invention, the lead being in the form of a double-walled ring having an inverted U-shaped profile.
Figure 16:
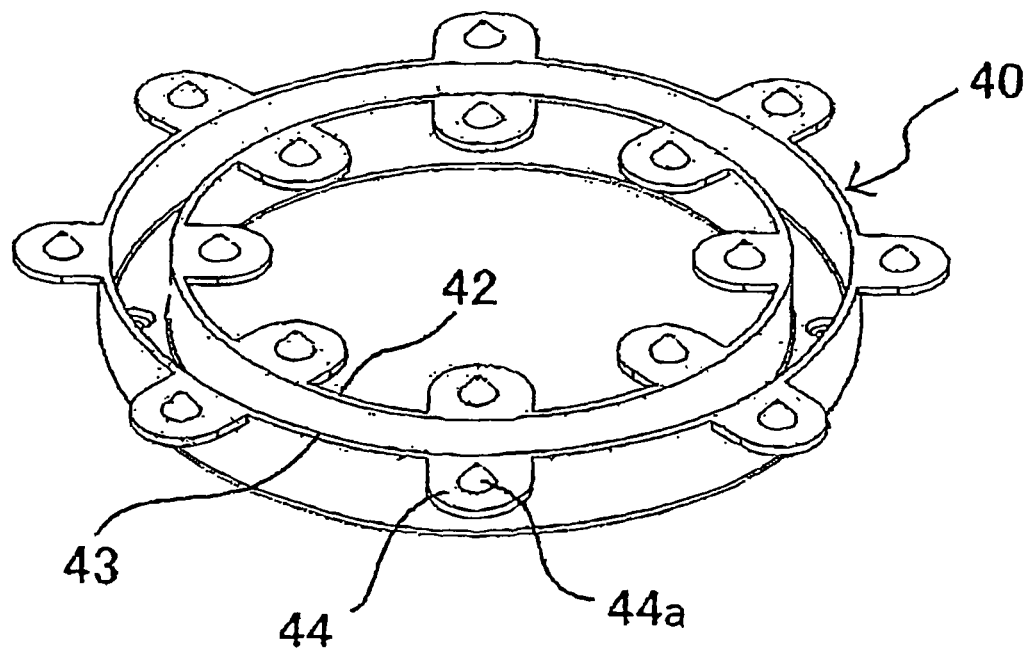
FIG. 16 is a perspective view (rear view) of the ring-shaped lead comprising a main lead and supplementary lead representing an example (Examples 12 and 17) of the invention, the lead being in the form of a double-walled ring having an inverted U-shaped profile.
Figure 17:
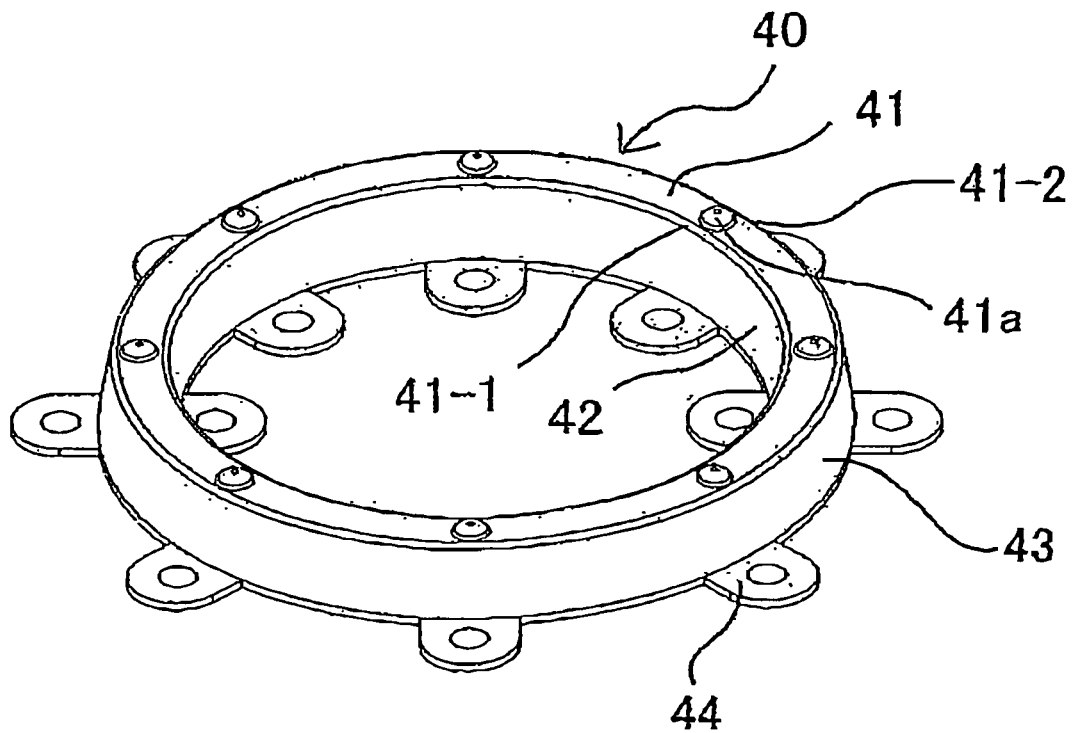
FIG. 17 is a perspective view (frontal view) of a ring-shaped lead comprising a main lead and supplementary lead representing an example (Example 13) of the inventions the lead being in the form of a double-walled ring having an inverted V-shaped profile.
Figure 18:
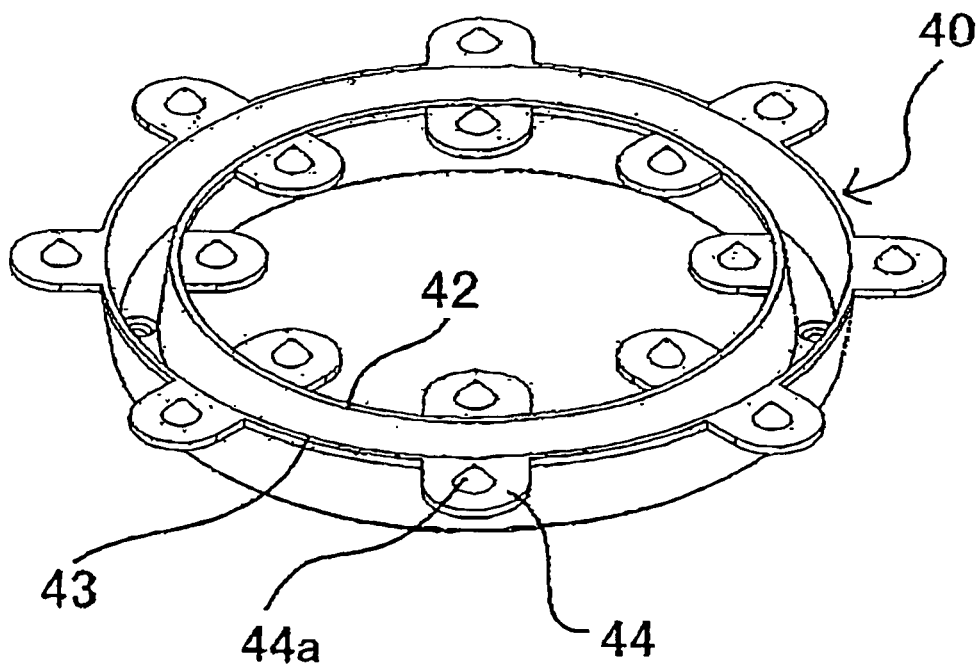
FIG. 18 is a perspective view (rearview) of the ring-shaped lead comprising a main lead and supplementary lead representing an example (Example 13) of the invention, the lead being in the form of a double-walled ring having an inverted V-shaped profile.

The lead shaped like a double-walled ring preferably takes the form of a double-walled ring comprising a frame portion (41) and lateral wall portions having an inverted U-shaped profile as shown in FIGS. 15 and 16, or an inverted V-shaped profile as shown in FIGS. 17 and 18.

Incidentally, with regard to a lead in the form of a double-walled ring having an inverted V- or upright V-shaped profile, its frame portion has a width sufficiently large to permit welding. However, as is obvious from the comparison of the lead shown in FIGS. 17 and 18 with the one shown in FIGS. 15 and 16, a ring-shaped lead having an inverted V- or V-shaped profile has a narrower frame portion (41) than a ring-shaped lead having an inverted U- or U-shaped profile. In addition, the double-walled ring-like lead with a V-shaped profile has lateral wall portions (42, 43) different in length from those of the corresponding lead with a U-shaped profile, because in the former the lateral wall portions extend from inner and outer edges (41-1, 41-2) slanted inward, instead of perpendicularly as in the latter.

A double-walled ring-like lead may comprise lateral wall portions (42, 43) both of which have a series of tabs (44) arranged along their margin which serve as a supplementary lead, as shown in FIGS. 15 to 18, and 34 and 35, or either one of which has a series of tabs (44) arranged along its margin. It is possible to meet the variation in interval between the lid and the outer surface of an upper current collecting plate which will arise when batteries are exchanged one for another during production process, by welding both series of tabs arranged along the margins of lateral wall portions (42, 43), or one series of tabs arranged along the margin either of inner or outer lateral wall portion (42 or 43), to the upper surface of a current collecting plate. This ensures secure and low resistance welding joints. The series of tabs (44) may be substituted for a continuous (ring-shaped) plate to serve as a supplementary lead.

The frame portion (41) of lead with inner and outer edges (41-1, 41-2) may take the form of a circle, eclipse or polygon. However, the frame portion with inner and outer edges (41-1, 41-2) is preferably shaped like a circle as shown in FIGS. 15 to 18, and 34 and 35, because then preparation of the lead becomes comparatively easy and the lead allows the formation of multiple welding points thereon.

The lead may take a form as shown in FIGS. 19 to 22. To obtain the form, a double-walled ring-like lead is divided into sixteen segments, and eight alternate segments are removed to leave eight segments having an inverted U-shaped profile. Each segment or piece comprises a frame portion (46) interposed between lateral portions (47, 48). The lead configured as described above dispenses with the use of lead portions which will require the flow of ineffective current during in-series welding, and ensures the secure welding at each lead segment (46). The number of pieces is not limited to any specific one, but preferably is in the range of 4 to 10.

Figure 23:
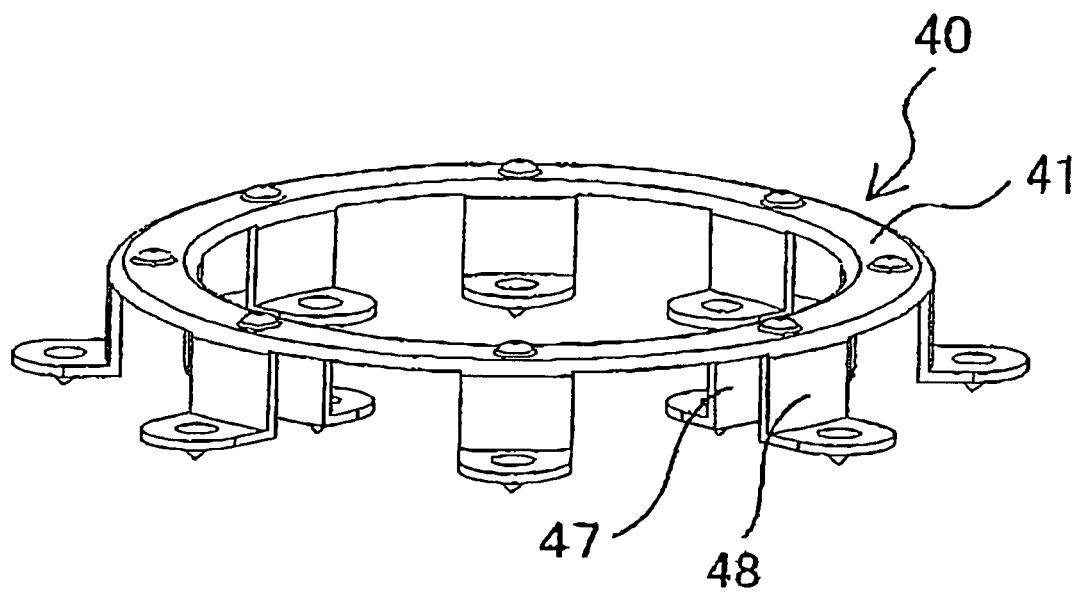
FIG. 23 is a perspective view (frontal view) of a ring-shaped lead representing an example (Example 18) of the invention, the ring-shaped lead having eight sections having an inverted U-shaped profile.
Figure 24:
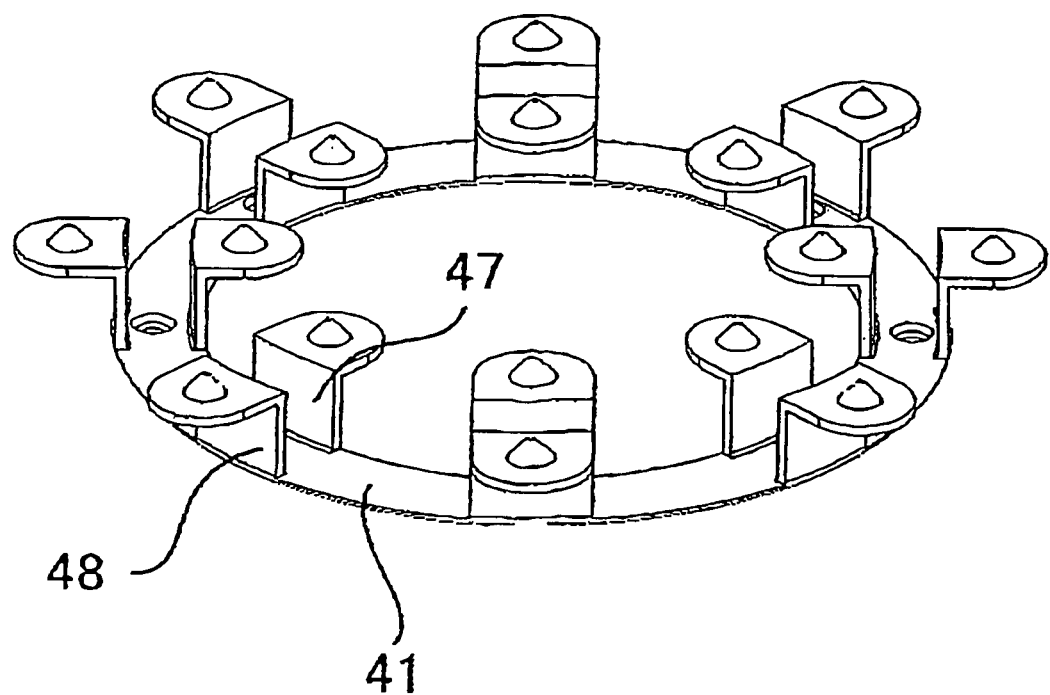
FIG. 24 is a perspective view (rear view) of the ring-shaped lead representing an example (Example 18) of the invention, the ring-shaped lead having eight sections with an inverted U-shaped profile.
Figure 25:
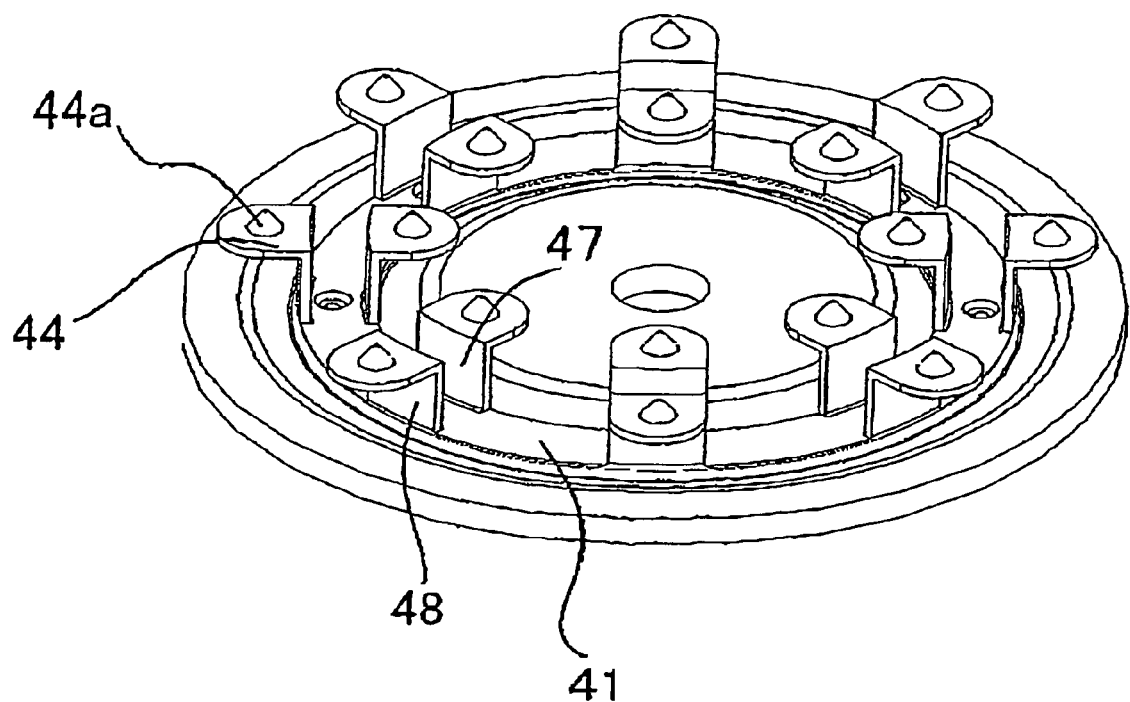
FIG. 25 is a perspective view (rear view) of a lid welded to a ring-shaped lead having eight sections with an inverted U-shaped profile as shown in FIGS. 23 and 24.

In order to further reduce the resistance of lead, it is preferred to use, instead of a lead consisting of eight separate pieces, a lead as shown in FIGS. 23 to 25 which is obtained by dividing a double-walled ring-like lead into sixteen segments, removing eight alternate lateral walls (42, 43) leaving eight segments (in the particular example shown in the figures) consisting of dangling lateral walls (47, 48) connected to each other via a frame portion (41).

Figure 26:
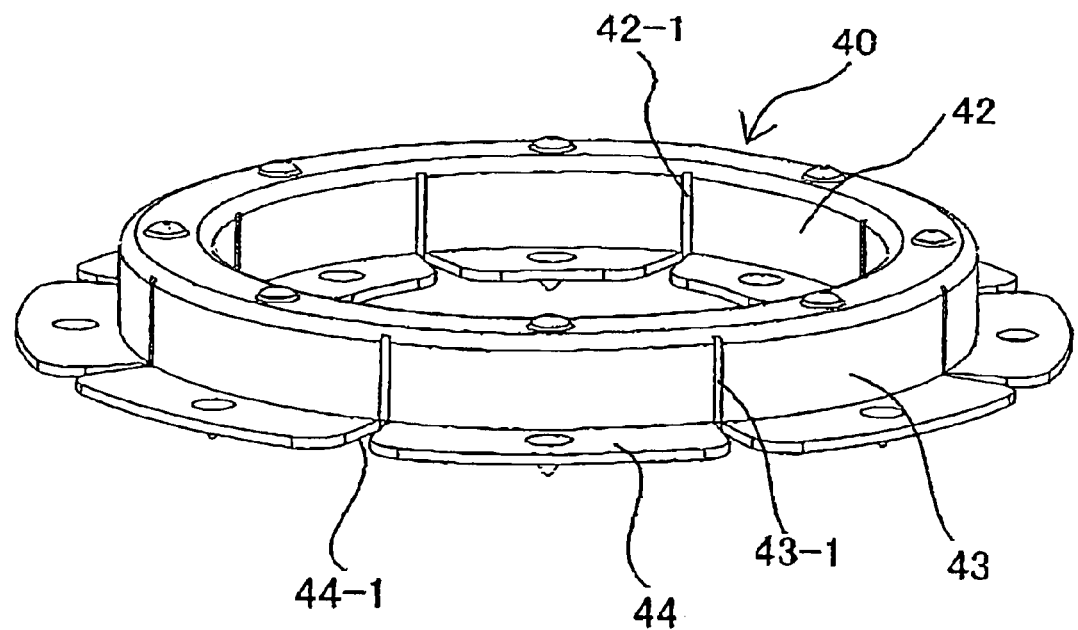
FIG. 26 is a perspective view of a ring-shaped lead representing an example (Example 19) of the invention, the lead in the form of a double-walled ring having an inverted U-shaped profile having slits cut at regular intervals on its side walls.

By producing thin slits (42-1, 43-1) through the lateral walls (42, 43) of a double-walled ring-like lead (40) at regular intervals along its annular aperture as shown in FIG. 26 or by producing thin slits (44-1) through the supplementary lead portion (44) in the form of a continuous plate (ring-shaped) at regular intervals along its annular aperture as shown in FIGS. 26 and 27, in the case of that intervals between the inner surface of lid and the outer surface of an upper current collecting plate vary widely because to the variation of the height of electrode assemblies, it is possible, as shown in FIGS. 30 to 33, to absorb the variation of the height and to ensure the secure welding. The slits (42-1) (43-1) may be stopped midway on the lateral walls (42, 43), instead of being cut as far as the frame portion.

Figure 29:
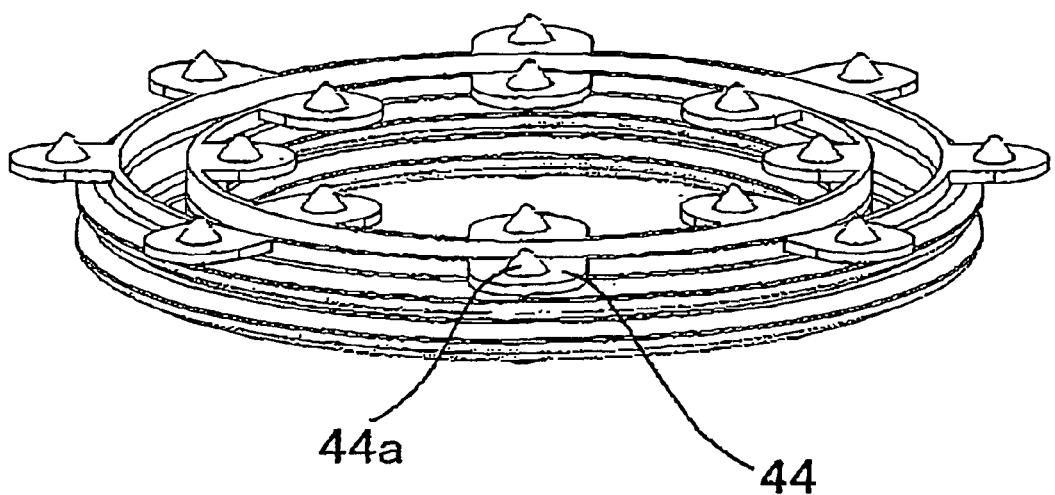
FIG. 29 is a perspective view (rear view) of the ring-shaped lead representing an example (Example 16) of the invention, the lead being basically similar to the one consisting of a double-walled ring having an inverted U-shaped profile, except that the lateral walls act as a bellow.

Another method for absorbing the variation of lid-plate interval is to introduce a lead as shown in FIGS. 28 and 29 whose main lead portion is in the form of a double-walled ring whose lateral walls are shaped like a bellow (having a corrugated profile).

With the lead configured as described above, if the supplementary lead portion (44) has a less strength than the main lead portion (including bellow-shaped portions), the tab (44) may be bent so much as to cause other part than pad (44a) to contact with the upper current collecting plate (2). To avoid this, a lead as shown in FIGS. 23 to 25 which is in the form of a double-walled ring with eight dangling lateral wall portions (47, 48) along the ring-like frame portion is preferably employed, or a lead as shown in FIGS. 23 to 25 which is in the form of a double-walled ring having thin slits (42-1, 43-1) through the lateral walls at regular intervals along its annular aperture as well as radially through the ring-like plate, is preferably employed.

A double-walled ring-like lead preferably has multiple knobs (41a) on the frame portion (41) as shown in FIGS. 15 to 20, 34 and 35. Furthermore, the double-walled ring-like lead preferably has a supplementary lead portion (44) at the margins of lateral wall portions. Alternatively, the lead may comprise a series of U-shaped pieces each of which comprises a knob (46a) on its frame portion and one or multiple pads (44a) on its tabs. Then, it is possible to weld lead and upper current collecting plate via projected pads which will allow the stable joints with a low resistance to be formed securely.

Description will be given below of a ring-shaped lead (main lead) representing an exemplary lead of the invention by referring to FIG. 11.

In FIG. 11, (a) represents a ring-like lead (20) which is obtained by bending an Ni or FeNi (nickel-plated stainless steel) plate of 0.4 to 1.0 mm in thickness into a ring. (The particular example shown in the figure is obtained by punching or wire-cutting a nickel-plated iron plate of 0.7 mm in thickness into a strip, and bending the strip into a ring of about 19 mm in diameter and about 2.7 mm in height.)

An inset diagram (b) is a lateral view of the ring-like lead, and (d) is an enlarged figure of a part enclosed by a two-dots-one-dash line of FIG. 11(c).

The lead shown in (a) is in the form of a ring with a gap a-1 between the two ends. The gap inevitably accompanies the ring-like lead because the lead is obtained by bending a strip of metal plate into a ring. The gap is not necessarily required.

FIG. 12 is a perspective view of the ring-shaped lead shown in FIG. 11.

The ring-like lead shown in FIGS. 11 and 12 has one welding surface on the upper edge of a wall portion, and the other welding surface on the lower edge of the same wall portion, and the upper and lower welding surfaces have a plurality of spikes (20a, 20b) which serve as welding points.

The plurality of spikes (20a, 20b) formed on the upper and lower edges of the ring-like lead may be the same or different in size from each other. (In the particular example shown in FIGS. 11 and 12, the spikes formed on the upper edge of the lead has a height of about 2.0 mm, while the spikes formed on the lower edge of the lead has a height of about 0.5 mm.)

The upper spikes preferably have a height of 0.5 mm or more, while the lower spikes preferably have a height in the range of 1.5 to 2.5 mm.

However, when the lead includes a supplementary lead, the upper and lower spikes do not necessarily have different heights, because then even if there is a variation in the interval between lid and upper current collecting plate, the variation will be absorbed by the supplementary lead.

With the ring-like lead shown in FIGS. 11 and 12, the upper spikes and lower spikes are different in their number (in the lead shown in the figures, the upper spikes are four while the lower spikes are eight).

The upper spikes preferably are eight or more in number, and the lower spikes are preferably fewer than the upper spikes.

In the ring-like lead shown in FIGS. 11 and 12, the upper spikes and lower spikes have different numbers. However, the upper and lower spikes may have the same number with the top surfaces of respective spikes having different areas.

In the lead shown in the figures, the upper and lower spikes have different numbers. This is because, when the ring-like lead is welded to a lid and current collecting plate, first the lead must be welded to the lid via a larger number of welding points.

Since the joint between lid and ring-like lead is established by welding via a larger number of welding points, the joint is so firm and secure that, when the other welding surface (having a smaller number of welding points) of lead is welded to a current collecting plate, current will flow through the joint so smoothly that there will be no risk of the disruption of any connection point at the joint.

The disrupting current of a previously prepared joint may be defined as follows. A current is passed for a certain time through element A and element B to establish a first welding joint between the two. Then, another current is passed under a similar condition (in terms of time and current intensity) through the first welding joint in series with element B and element C to establish a second welding joint between element B and element C. When the current required for establishing the second welding joint is increased by 10% or more over the one required for the first welding joint, the current is called a disrupting current.

Next, the supplementary lead which serves as the second element of a ring-like lead (main lead) of the invention will be described by referring to FIG. 13.

FIG. 13 illustrates a supplementary lead used in the invention: FIG. 13(a) is a flat view thereof and FIG. 13(b) a lateral view thereof.

The supplementary lead (30) is obtained by punching an Ni or FeNi-made plate (nickel-plated iron plate) having a thickness of 0.2 to 0.4 mm into an annulus with a central hollow. (In the particular example shown in FIG. 13, the supplementary lead is made of a nickel plate having a thickness of 0.3 mm, and is in the form of an annulus having an external and internal diameters of about 21 and about 18 mm, respectively.) The supplementary lead in the form of an annulus has a width sufficiently wide to be connected to the lowest end of main lead (20), and has, on its underside, pads (30-2) central to a circumference (figure represented by a dotted line in FIG. 13) corresponding to the innermost edge of the lowest end of main lead (20). Each pad is located at the tip of a jutted chip (30-1) which has a spring property. (The jutted chip enclosed by a two-dot-one-dash line in FIG. 13 is enlarged and its sectional view is shown in FIG. 14.)

Two other embodiments of the inventive lead in the form of a double-walled ring-like lead one having an inverted-U shaped profile, and the other having an inverted-V shaped profile will be described below by referring to FIGS. 15 and 16, and FIGS. 17 and 18, respectively.

In the double-walled ring-like lead with an inverted-U shaped profile shown in FIGS. 15 and 16, and similar lead with an inverted-V shaped profile shown in FIGS. 17 and 18, (41), (42) and (43) represent components constituting a main lead which is obtained by punching an Ni or FeNi-made plate (nickel-plated iron plate) having a thickness of 0.2 to 0.4 mm into a ring which is then pressed. (In the particular example shown in the figures, a nickel plate having a thickness of 0.3 mm is processed by punching or wire cutting into a ring which is then bent downward by drawing or pressing at inner and outer edges (41-1, 41-2) of frame portion (41) into a double-walled ring, and thus a double-walled ring having lateral wall portions (42, 43), with an internal diameter of about 19 mm and height of about 2.7 mm is obtained).

The frame portion (41) used herein refers to, with regard to a main lead portion (42) in the form of a double-walled ring with an inverted-V shaped profile, an inflection between inner and outer lateral wall portions (42, 43), or with regard to a double-walled ring with an inverted-U shaped profile, a flat frame portion enclosed by inner and outer lateral wall portions (42, 43).

In the embodiment shown in the figures, a ring plate is pressed at inner and outer edges (41-1, 41-2) to give an approximately circular ring having a double-walled structure. However, the structure does not necessarily take the form of a circle, but may be shaped like an ellipse, polygon or other figures.

The particular embodiment in the form of a double-walled ring shown in FIGS. 15 to 18 has no slit on its lateral wall portions (42, 43). However, it may have slits (42-1, 43-1) on its lateral wall portions (42, 43) as shown in FIG. 26, in order to minimize the flow of useless current during welding.

Next, the inventive supplementary lead attached to a lead in the form of a double-walled ring with an inverted-V or inverted-U shaped profile will be described below by referring to FIGS. 15 to 18.

Attachment of a supplementary lead portion (44) may be achieved by pressing, when a ring-like plate obtained by punching an Ni or FeNi plate (nickel-plated steel plate) having a thickness of 0.2 to 0.4 mm must be pressed to give a double-walled structure comprising main lead portions (41, 42, 43), such that a supplementary lead portion (44) consisting of a series of tabs as well as a flat, ring-shaped frame portion (41) can be exempt from pressing.

The main lead portion shown in FIGS. 15 to 18 (lead in the form of a double-walled ring) has a plurality of knobs (41a) on its frame portion (41) which will serve as a welding surface.

The knob (41a) is preferably in the form of a hemisphere of 0.5 to 1.0 mm in diameter and 0.5 mm or more in height, because then welding will proceed comparatively easily. The number of knobs is preferably equal to or more than 8 because then the resistance of welding joints is comparatively low.

The supplementary lead portion (44) serves not only as a buffer to absorb the variation in the lid-plate interval as described above, but also as a welding joint. Thus, the supplementary lead portion (44) preferably has, on its welding surface, a plurality of pads (44a) which are preferably in the form of a cone of 0.5 to 1.0 mm in diameter and 0.5 mm or more in height, because then welding joints are more securely established. The number of knobs is preferably equal to or more than 8 because then the resistance of welding joints becomes lower.

Of the particular lead shown in FIGS. 15 to 18, the knobs (41a) on the frame portion (41) of main lead portion and pads (44a) on supplementary lead portion (44) are different in umber (8 knobs on the frame portion and 16 pads on the supplementary lead portion).

The number of knobs (41a) on the frame portion (41) of main lead is preferably equal to or more than eight, because then resulting welding joints will become stronger. More preferably, the number should be eight or more because then the electrical resistance will be more effectively reduced. The supplementary lead portion (44) consisting of tabs formed on the margins of lateral wall portions (42, 43) dangling from frame portion (41) has pads (44a) thereon two times as many as knobs.

In this particular lead, the welding points of frame portion (41) (knobs) and supplementary lead portion (44) (pads) are different in their numbers. When frame portion (41) having fewer welding points must be welded first, the knob preferably has a larger area than the pad (44a) of supplementary lead portion (44), and thus makes its disrupting current larger than that of the pad. Because then it is possible to avoid more reliably the disruption of welding joints formed at frame portion when the pads of supplementary lead portion are welded.

In this particular lead, the knobs on frame portion of main lead portion have a larger area but fewer number than the pads on supplementary lead portion. This is because, when the lead is welded to a lid and an upper current collecting plate, the lead is preferably welded to lid first. In this case, since the knobs of frame portion have a larger area each, the resulting welding joints are so firm that, when pads of supplementary lead portion are welded to upper current collecting plate subsequently, the pads are more reliably prevented from being disrupted during welding.

The procedures undertaken according to the invention to weld a lead comprising a main lead portion and supplementary lead portion to a lid and upper current collecting plate will be described in detail below.

The present invention has a feature not only in adopting a lead comprising a main lead portion and supplementary lead portion in the welding connection to a lid and upper current collecting plate, but also in the procedures of welding. For the welding of an inventive lead, it is preferred to adopt the procedures described below, because then it is possible to ensure secure welding, and reduce the internal resistance of a resulting battery.

(i) One welding surface of lead (the frame portion of a main lead portion) is welded in advance to the inner surface of a lid which will serve as a closing means of the container of a sealed battery (first step of welding).

(ii) Next, a electrode assembly having an upper current collecting plate attached thereon is placed in a container such that the upper current collecting plate faces the open end of container. An electrolyte solution is poured into the container, and a lid having a lead welded thereon is placed on top of the electrode assembly so as to bring a supplementary lead portion into contact with the upper current collecting plate. The container is sealed airtight, and welding current is passed across the terminals of positive and negative electrodes of a now sealed battery, thereby welding the supplementary lead portion of lead which has been welded to lid to the upper surface of upper current collecting plate (second step of welding).

During the second step of welding, subsequent to sealing, current is passed across the terminals of positive and negative electrodes of a sealed battery to perform welding. In this case, even when the height of an electrode assembly varies from one battery to another, which leads to the variation of interval between lid and upper current collecting plate, the variation can be absorbed by the elastic property of pads formed on supplementary lead portion. Thus, the elastic property of supplementary lead portion can absorb the variation in height of an electrode assembly and the main lead portion can be securely welded via supplementary lead portion to the current collecting plate.

If a ring-like lead comprises a main lead portion and supplementary lead portion jointed together, it is preferred to weld the free surface of main lead portion to the inner surface of a lid in the first step of welding, and to weld, to the upper surface of an upper current collecting plate, the supplementary lead jointed to the main lead portion which has been welded to lid, in the second step of welding.

Conventionally, the second step of welding is applied to a battery with the end of container being opened, and the end of container is then closed under pressure (compression for adjusting the height of battery) to produce a sealed battery. This conventional procedure is not preferred, however, because then lead must have a redundant length and width to accept and tolerate closure and pressure.

During the second step of welding in which a supplementary lead portion jointed to a main lead portion welded in advance to a lid is welded to a current collecting plate, the height of an electrode assembly may vary from one battery to another, which leads to the variation of interval between lid and upper current collecting plate. How the variation can be absorbed by the supplementary lead portion will be explained by means of an example shown in FIG. 14.

FIG. 14 gives an enlarged view of a main lead (20) and supplementary lead (30) in the form of a ring welded to a current collecting plate (2) and a lid (50).

FIGS. 14(a), (b) and (c) show the cases where a electrode assembly has a large height, normal height, and small height, respectively. When the electrode assembly has a height larger or smaller than the normal height, a current collecting plate 2 also has a height divergent from the normal.

As shown in the figure, the interval between current collecting plate (2) and lid (50) varies in association, and the variation is absorbed by the spring-like elasticity of a pad (30-2) formed on supplementary lead portion (30).

When a lead comprising a main lead portion (20) and supplementary lead portion (30) is welded to a lid (50) and current collecting plate (2), it is preferred to provide a larger number of raised welding points on the main lead (20) to be welded to the lid (50).

This is because the lid is usually thick since it must maintain the air-tightness of a sealed battery, and welding a thick lid to a lead requires a big current to compensate for the escape of heat to surrounding elements during welding which would occur more readily with a thick conductor than with a thin conductor, and to make the resulting welding joint more resistive to disruption.

Generally, the current collecting plate consists of a thinner plate than the lid. Thus, welding of supplementary lead to current collecting plate may be achieved more easily since the escape of heat to surrounding elements during welding is limited: welding may be achieved via a small current (small in intensity and short in duration). In addition, since the lid-lead connection has been securely established as a result of the first step of welding, the lead-plate connection is safely prevented from disruption.

With regard to a lead in the form of a double-walled ring comprising main and supplementary lead portions, during the second step of welding, supplementary lead portion (44) jointed to main lead portion (40) welded in advance to a lid (50) is welded to a current collecting plate (2). During the operation, the lid-plate interval may vary from one battery to another. How the variation can be absorbed will be explained by means of an example shown in FIGS. 30 to 32.

Figure 30:
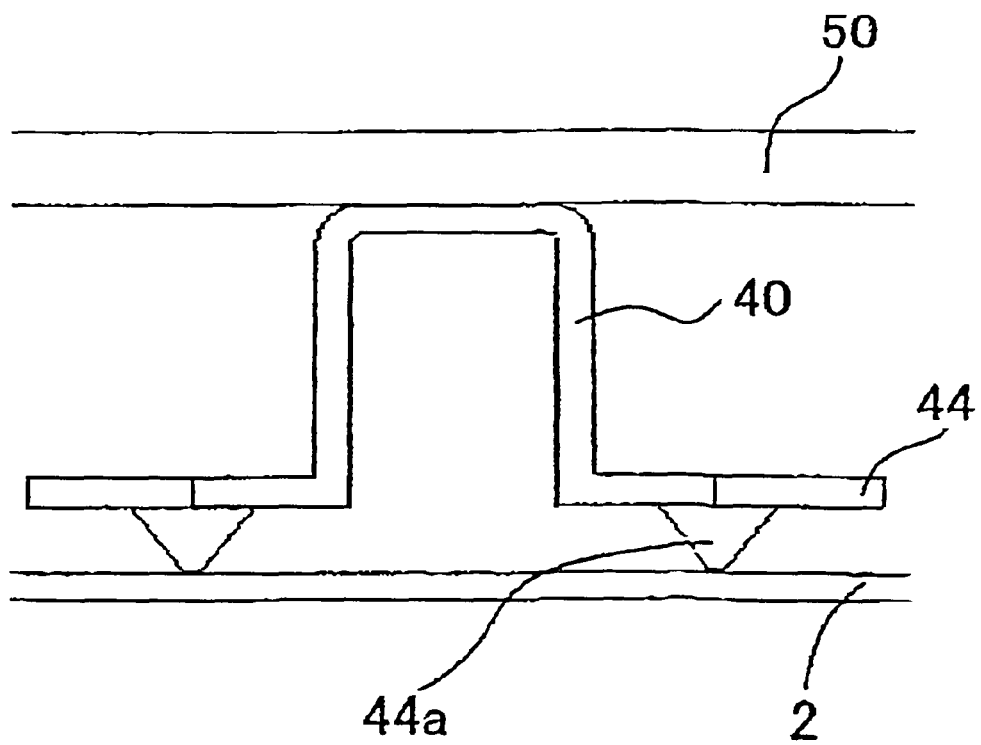
FIG. 30 is a diagram representing an example in which, when a lead comprising a main lead and supplementary lead in the form of a double-walled ring having an inverted U-shaped profile which has been welded to a lid is now welded to an upper current collecting plate, and, when there is variation in the lid-plate interval, the variation is absorbed by pads on the supplementary lead portion. In the particular example shown in the figure, the pads are not required to take any compensatory action (because the electrode assembly has a normal height).
Figure 31:
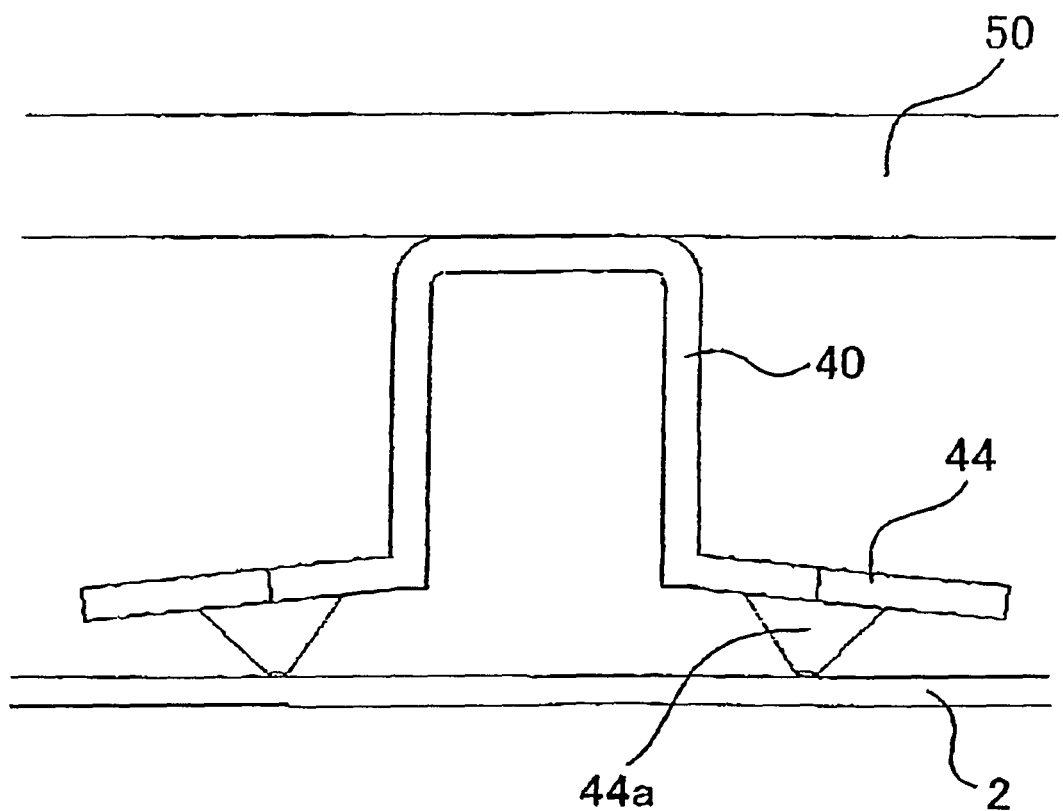
FIG. 31 is a diagram representing an example in which, when a lead comprising a main lead and supplementary lead in the form of a double-walled ring having an inverted U-shaped profile which has been welded to a lid is now welded to an upper current collecting plate, and, when there is variation in the lid-plate interval, the variation is absorbed by pads on the supplementary lead portion. In the particular example shown in the figure, the downward shift (because the electrode assembly has a small height) is absorbed by the spring action of pads.
Figure 32:
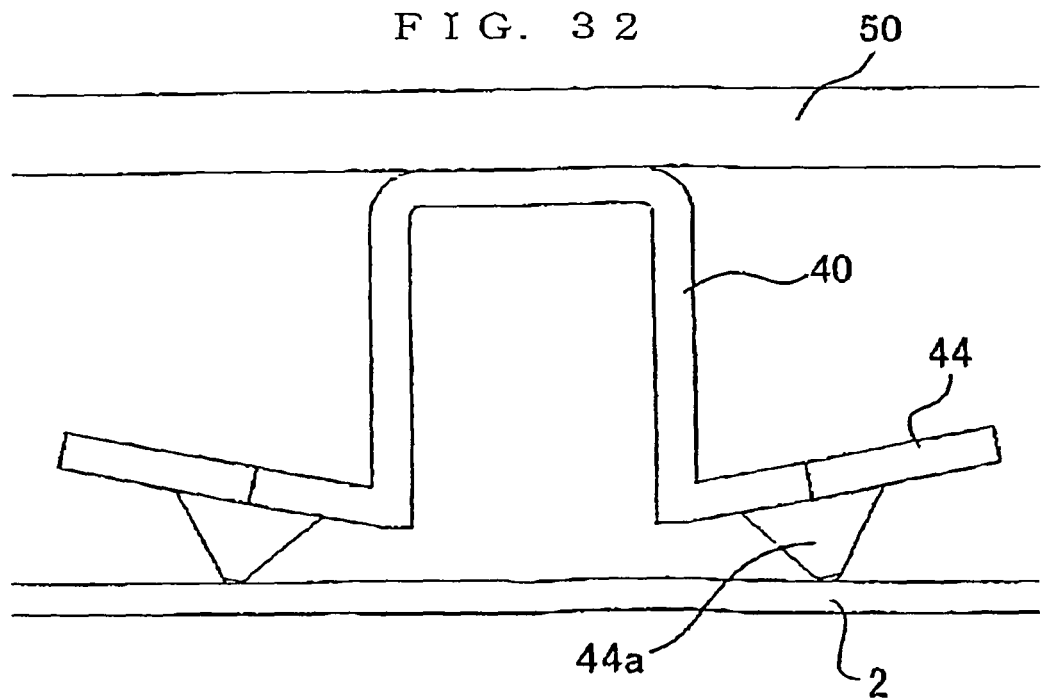
FIG. 32 is a diagram representing an example in which, when a lead comprising a main lead and supplementary lead in the form of a double-walled ring having an inverted U-shaped profile which has been welded to a lid is now welded to an upper current collecting plate, and, when there is variation in the lid-plate interval, the variation is absorbed by pads on the supplementary lead portion. In the particular example shown in the figure, the upward shift (because the electrode assembly has a large height) is absorbed by the spring action of pads.

FIGS. 30, 31 and 32 show the cases where a electrode assembly has a normal height, small height, and large height, respectively (note the height of an electrode assembly is arranged in a different order to that of FIG. 14). When the electrode assembly has a height larger or smaller than the normal, the current collecting plate (2) also has a height divergent from the normal.

As shown in the figure, the variation of lid-plate interval can be absorbed by the spring-like elasticity of a pad (44) formed on supplementary lead portion (44). Incidentally, when a frame portion (41) of main lead portion (40) in the form of a double-walled ring is welded to the inner surface of a lid (50) during the first step of welding, pressure is applied onto knobs (41a) on the frame portion (41) to flatten them to be flush with the surface of the latter, and thus the knobs are absent from the frame portion (41) in the figure.

Figure 33:
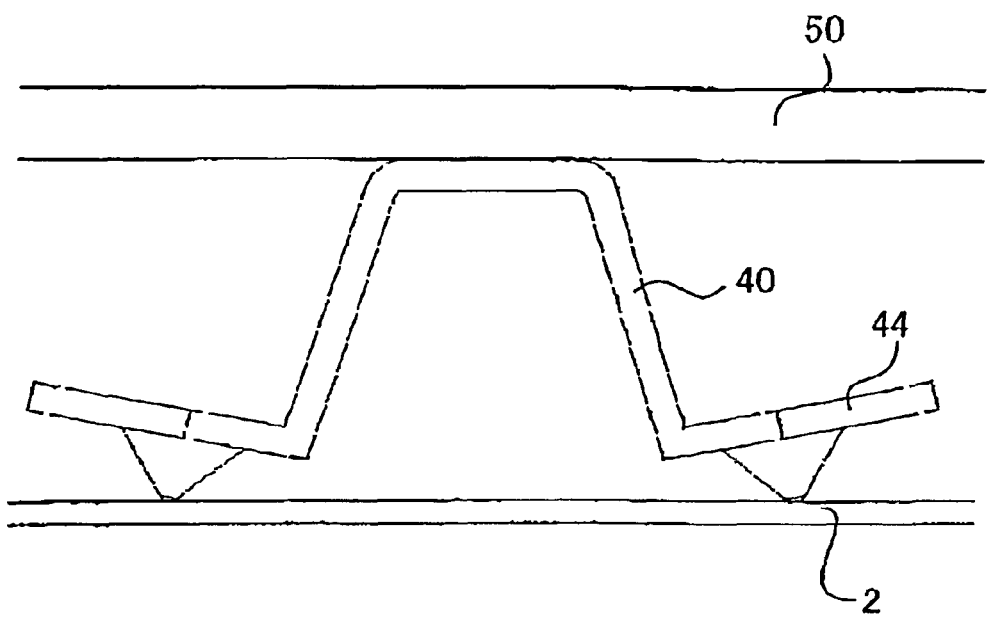
FIG. 33 is a diagram representing yet another example in which, when a lead (the same with the one shown in FIG. 23) comprising a main lead and supplementary lead in the form of a double-walled ring having an inverted U-shaped profile which has been welded to a lid is now welded to an upper current collecting plate, and when there is variation in the lid-plate interval, the variation is absorbed by the expansion of angle between the lateral wall portions as well as the spring action of pads.

FIG. 33 refers to a main lead (40) with a supplementary lead in the form of a series of double-walled brackets having an inverted U-shaped profile like the one shown in FIG. 23, in which the variation in vertical direction is absorbed by the expansion of angle between the lateral wall portions as well as the spring action of pads (44).

As shown in the figure, variation in the interval between current collecting plate (2) and lid (50) is absorbed by the expansion of angle between the lateral wall portions of main lead (40) as well as the spring action of pads (44) of supplementary lead portion.

The above-described embodiment of the invention requires two steps of welding: the first step of welding consists of welding lead to lid in advance, and the second step of pouring solution into container, sealing the container to produce a sealed battery, and passing current across the electrodes of the battery to weld lead to current collecting plate. Thus, in the above method, passing welding current through a sealed battery occurs only during the second step. In addition, with this method, it is possible to use a lead comprising main and supplementary portions as represented in FIGS. 13 to 35, and thus it is possible to obtain a sealed battery incorporating a current collecting structure having a low internal resistance.

Welding points of main lead, if they are covered with oxide films prior to welding, will not be securely welded to current collecting plate within a sealed battery. To avoid this, the welding points are preferably made of a metal resistive to oxidization, or plated by a metal resistive to oxidization, Nickel is preferred because it is resistant to corrosion in alkaline electrolyte solution, and readily facilitates welding. Therefore, connecting points provided along current passages are preferably made of nickel-plated metals.

Welding may be performed after electrolyte solution is poured and battery is sealed, but before initial charging is made which may produce a potential shift of the positive electrode, because if such charging or discharging takes place prior to welding, the surfaces of positive electrode and lead may be oxidized depending on the condition of charging or discharging which may cause instable welding.

Figure 37:
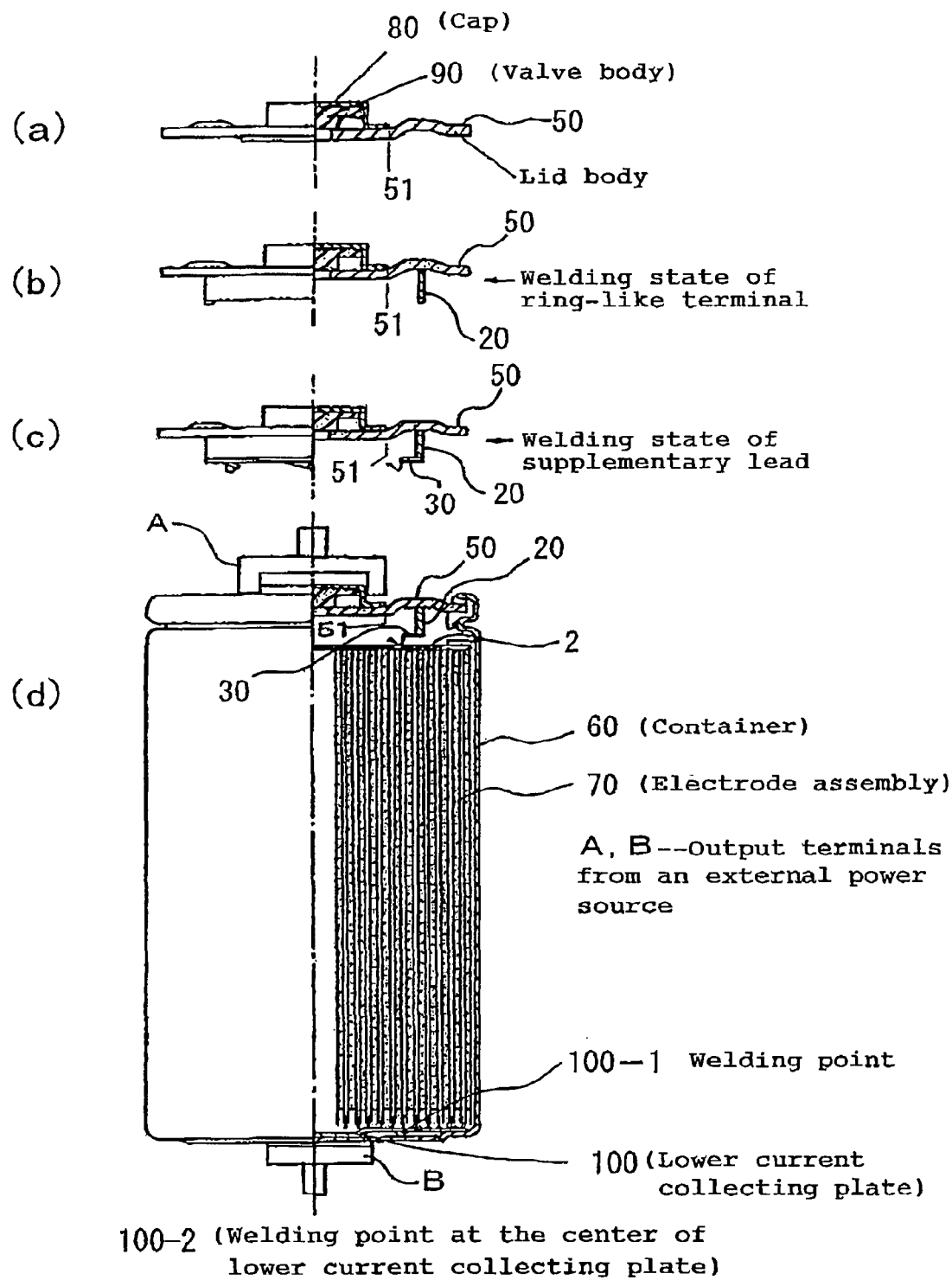
FIG. 37 is a sequence of diagrams for showing how a sealed battery is assembled which incorporates a ring-shaped lead comprising a main lead and supplementary lead.

FIG. 37 is a sequence of diagrams for showing a sealed battery representing an embodiment of the invention which incorporates a ring-shaped lead comprising a main lead and supplementary lead.

In FIG. 37, (a) represents a sectional view of an exemplary lid (50) which consists of a lid body carrying at its center a safety valve rubber (valve body) (90) covered with a cap (80).

Diagram (b) represents how a ring-like terminal (main lead) (20) is welded in advance to lid portion (50).

Diagram (c) represents how a supplementary lead (30) is welded in advance to ring-like terminal (20) welded to lid portion (50).

Diagram (d) represents how ring-like terminal (20) welded in advance to lid portion (50) as shown in diagram (c) is welded via supplementary lead (30) to an upper current collecting plate (2).

Figure 38:
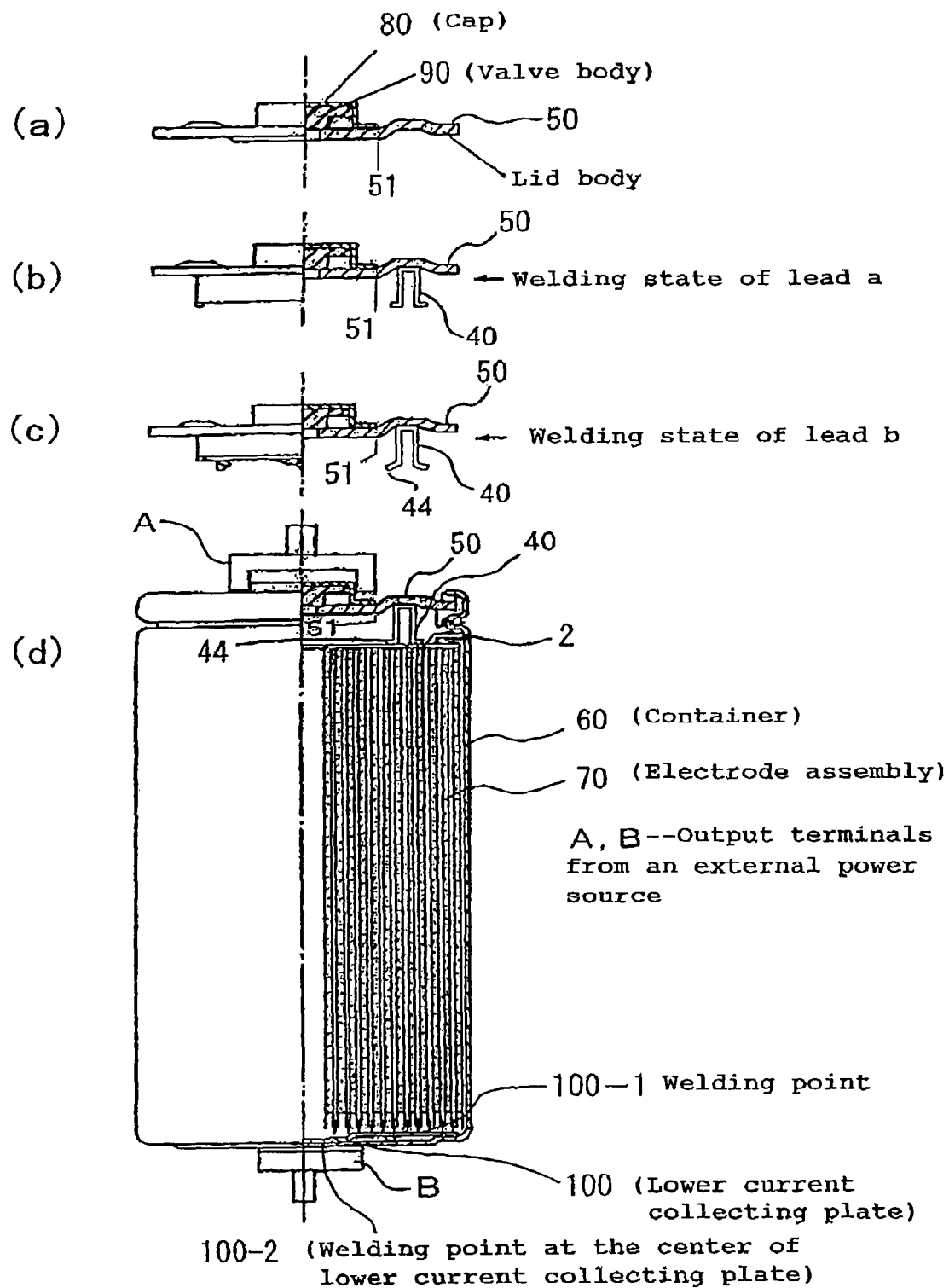
FIG. 38 is a sequence of diagrams for showing how is assembled a sealed battery representing an example (Example 12) of the invention in which a ring-shaped lead comprising a main lead and supplementary lead in the form of a double-walled ring having an inverted U-shaped profile, is welded to a lid.

FIG. 38 is a sequence of diagrams for showing how is assembled a sealed battery representing an example (Example 12) of the invention in which a ring-shaped lead comprising a main lead in the form of a double-walled ring having an inverted U-shaped profile, is welded via a supplementary lead to a lid.

In FIG. 38, (a) represents the same as in FIG. 37(a). Diagram (b) represents how a lead (40) in the form of a double-walled ring having an inverted-U shaped profile is welded in advance to a lid (50).

Diagram (c) represents how a supplementary lead portion (40) shown in diagram (b) has its skirts expanded to emphasize its spring property so as to absorb the variation of lid-plate interval.

Diagram (d) represents how lead (40) in the form of a double-walled ring having an inverted-U shaped profile welded in advance to lid portion (50) as shown in diagram (c) is welded via supplementary lead (44) to an upper current collecting plate (2).

During assembling it is important according to the invention to pay attention to dispose the welding points on lead (40) in the form of a double-walled ring having an inverted-U shaped profile outside from a circumference corresponding, in a flat view, to the peripheral margin of a cap (80) joined to lid (50).

In addition, when supplementary lead (30) is welded onto the upper surface of an upper current collecting plate (2), care is preferably taken to allow the welding points of supplementary lead portion (40) to be located with respect to the center of upper current collecting plate (2) to satisfy the following positional relation: the distance of the welding points from the center is in the range of 41 to 69% relative to the distance from the center to the periphery, and the welding points are preferably disposed outside a circumference corresponding, in a flat view, to the peripheral margin of a cap (80).

With regard to connection between a lower current collecting plate (100) and a base of container (60), it is important to provide welding points not only at the center of plate (100-2) but also at welding positions (100-1), and to dispose the welding points (100-1) outside a circumference corresponding, in a flat view, to the peripheral margin of a cap (80).

Then, because the points through which current is extracted outside from battery are disposed outside, in a flat view, from the periphery of cap, current passage is shortened, and thus the internal resistance is reduced and output power density increased.

According to the invention, when lead is welded to current collecting plate, it is preferred to pass an alternate current having a big intensity through the positive and negative electrodes of a battery, although its duration may be made brief. Current thus passed is charged to electric double layers at the positive and negative electrode plates, and thus electrolysis of electrolyte solution is prevented. When the capacity of electric double layers is sufficiently large, current and electric quantity conductable without giving any harm to battery can be increased. Since the electric double layers present at the positive and negative electrode plates are likely to be intimately involved in the discharge capacity of electrode plates, it may be preferable to determine the intensity of current flowed and quantity of electricity passed during one current application (when the quantity of electricity is specified, it is possible to compensate for the small intensity of current by elongating its duration) based on the capacity of electrode plates. According to the invention, the appropriate range for the intensity of current per unit discharge capacity is specified, and then the duration of current is determined. By so doing it is possible to weld lead to current collecting plate securely via current delivered through the positive and negative electrodes without giving undue damage to the battery.

A conventionally proposed method for welding consists of passing a current pulse in a charging or discharging direction. According to this method, during passage of current, gas evolves in the battery and gas containing the vapor of electrolyte solution exerts its pressure upon the valve to open it. Since the valve may be corroded by the electrolyte vapor, the stable threshold of valve to pressure is impaired, which poses a problem. To avoid this, when this conventional method is employed, welding must be performed on a battery with its lid open, or using a sufficient small current.

When welding is performed on a battery with a lid open, lead must have a redundant length which is problematic. Because, if lead has a short length, its welding point could not reach a current collecting plate of positive electrode, when the lid is opened and separated from the plate. According to this method, it is necessary to reduce the intensity of current and its duration so much as to minimize the evolution of gas during passage of current. This causes welding joints to be insecure and their resistance to be increased.

To meet this problem, the present inventors sought for requirements pulsed current must meet to minimize the evolution of gas in the battery during passage of the current, and found if pulsed current satisfies certain requirements, the development of gas in the battery can be surprisingly effectively inhibited. Specifically, they found that when the electric current in the form of an alternate pulse sequence consisting of a charging pulse and discharging pulse is used, it is possible to securely weld a joint within a sealed battery without evoking the risk of gas evolution no matter how much or how long the intensity or duration of the current may be.

Specifically, when current is passed at 0.4 kA/Ah or more, a welding joint is obtained that exhibits an excellently low resistance. However, when current is passed at 0.8 kA/Ah or more, a welding joint is disrupted to exhibit a high resistance. Therefore, current is preferably passed at 0.4 to 0.8 kA/Ah.

A current pulse sequence consists of a charging pulse and a discharging pulse as described above. When the duration of charging and discharging pulses is made equal to or longer than 3 msec, it is possible to obtain a welding joint exhibiting an excellently low resistance. However, if the duration in question is made longer than 7 msec, the welding joint will exhibit an unduly high resistance probably because the joint may be disrupted, or heated so much that its surface might be covered with oxide films. Therefore, the duration of pulse is preferably kept in the range of 3 to 7 msec.

If a single pulse is applied for a long time, resistance will develop at a contact point. To inhibit the development of such resistance, it is necessary to apply a pulse having an intensity as much as and a duration as long as possible. However, such a current pulse will present problems as noted earlier.

The current applied is an alternate pulse sequence consisting of a charging pulse and discharging pulse, and the sequence was counted as a cycle. An alternate current consisting of several cycles is preferably used, because then it is possible to reduce the duration of each pulse necessary for welding. However, the number of cycles is preferably limited to six or less. Because, if the number of cycles in alternate current exceeds six, gas evolves so much probably because of the excessive accumulation of polarizations on charging and discharging electrodes, that it might disrupt the air-tight sealing of the battery. The number of cycles is preferably kept at two to six.

Welding may be performed in the same manner on a battery stack. If a battery stack comprises a plurality of batteries, and a contact point in the stack must be welded, an alternate current pulse may be passed at least through a battery which contains the contact point directly or via a cell-to-cell connector from an external power source.

Figure 48:
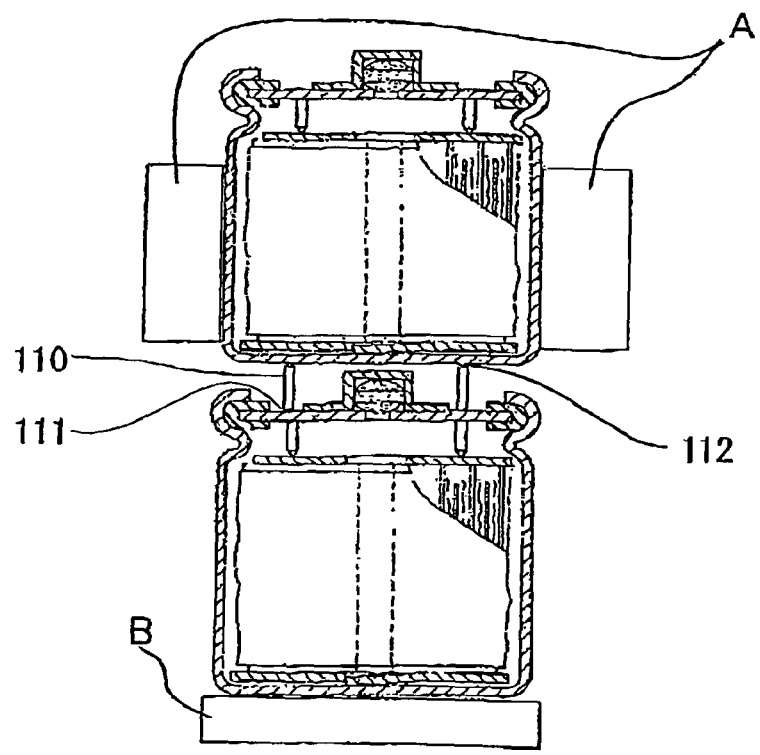
FIG. 48 illustrates a method of the invention for manufacturing a battery stack using a cell-to-cell connector (ring-shaped lead).
Figure 49:
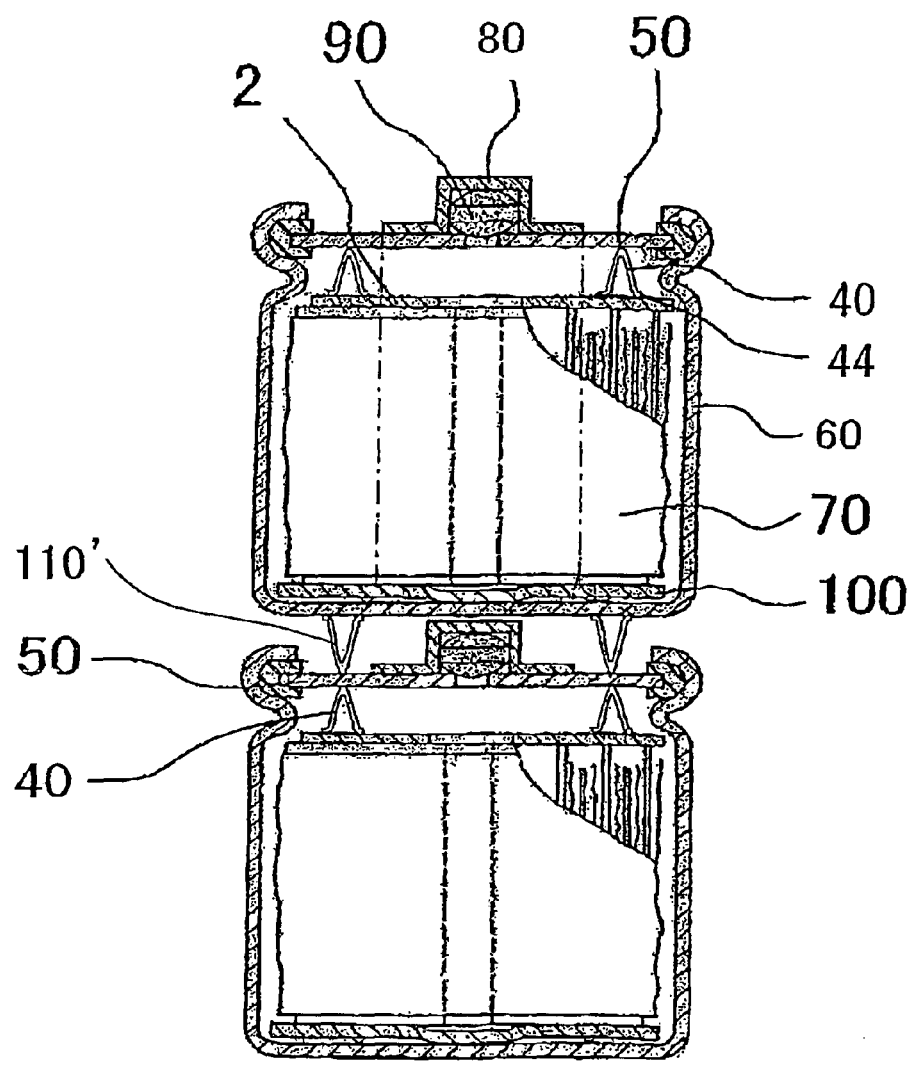
FIG. 49 is a schematic diagram of a battery stack obtained by using a cell-to-cell connector of the invention (lead consisting of a double-walled ring having an inverted V-shaped profile).
Figure 50:
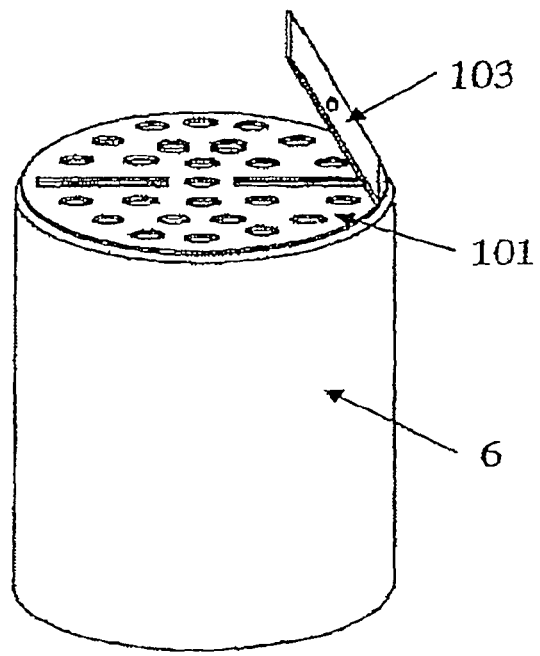
FIG. 50 is a perspective view of a current collecting structure representing a conventional example wherein a current collecting plate and a current collecting lead is integrally fabricated from a plate with an elongation having a uniform thickness.
Figure 51:
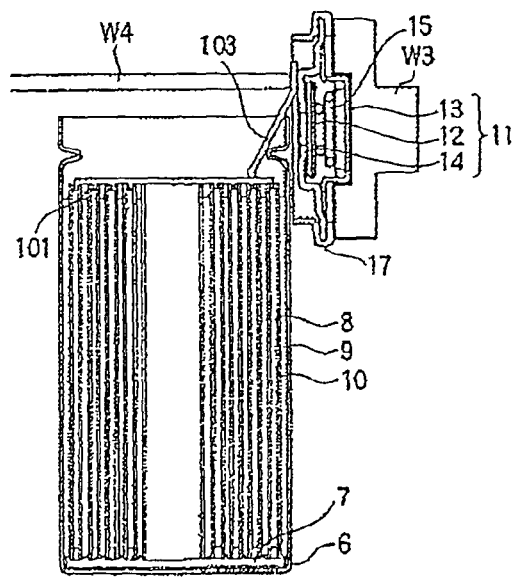
FIG. 51 is a sectional view of a sealed battery obtained by welding a current collecting lead as shown in FIG. 50 to a sealing body.
Figure 52:
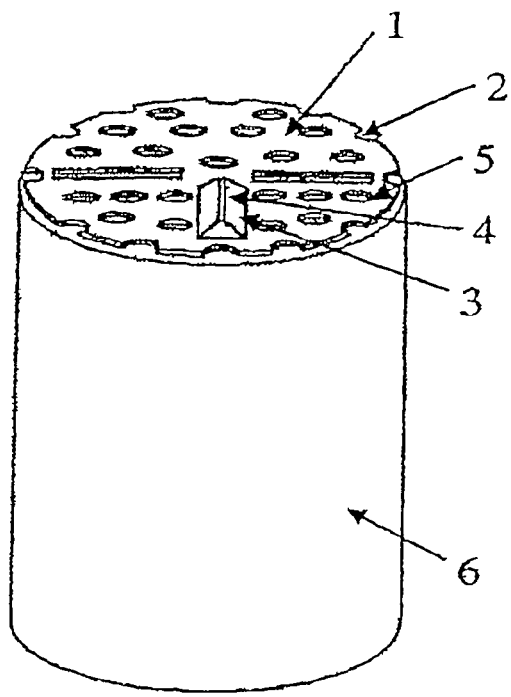
FIG. 52 is a perspective view of a nickel cadmium battery with parts of interest being emphasized, which incorporates a current collecting plate integrally fabricated by conventional punching.

Suitable cell-to-cell connectors (connecting leads) may include a ring-like lead 110 like the one used for connecting lid with upper current collecting plate, and a double-walled ring 110', as shown in FIGS. 48 and 49. However, other connectors having a different shape may be used.

In the fabrication of a battery stack, cell-to-cell connectors must be connected by welding in the same manner as described above. An alternate current pulse is preferably applied at 0.4 to 0.8 kA/Ah. The duration of each pulse is preferably 3 to 7 msec, and the number of cycles is preferably in the range of two to six.

Incidentally, of a given battery, the discharging capacity of positive electrode is not necessarily equal to the discharging capacity of negative electrode. With regard to an alkaline storage battery such as a nickel hydrogen storage battery, nickel cadmium battery, etc., the discharging capacity of positive electrode is smaller than the counterpart of negative electrode. When welding is performed on such a battery, the intensity of welding current per unit discharging capacity should be determined based on the smaller discharging capacity, that is, the discharging capacity of positive electrode in this case. The intensity of current passed during welding is not necessarily constant over time. The intensity of welding current used herein refers to the intensity of current averaged over time.

As noted earlier, according to the invention, when the capacity of electric double layers is sufficiently larger secure welding will be ensured even when big current is passed between positive and negative electrodes. Assume, as an example, welding current is applied to a nickel hydrogen storage battery. In this battery, the negative electrode tends to have a smaller capacity of electric double layer than the positive electrode, because a hydrogen absorbing alloy powder constituting the negative electrode has a smaller specific surface area. Accordingly, it is preferred to immerse a hydrogen absorbing alloy powder before incorporating it in a battery, in an NaOH aqueous solution heated to a high temperature or in a weakly acid solution such as an aqueous solution of acetic acid-sodium acetate, to increase thereby the capacity of electric double layer developed at the negative electrode.

The electric double layer used herein refers to the capacity of electricity a battery can store without evolving gas sufficiently voluminous to exert a pressure beyond the opening pressure of the valve, and includes, precisely speaking, not only the capacity due to so-called electric double layers of positive and negative electrode plates, but also the capacities of electricity accompanying the charge/discharge of the battery and reactions responsible for the generation of gas.

A sealed storage battery of the invention has a small internal resistance, and is highly adaptive even when it is charged rapidly. Accordingly, its positive and negative electrodes are preferably constructed so as to be responsive to rapid charging.

Assume, as an example, a nickel hydrogen storage battery and how its electrodes should be constructed will be discussed below. It includes a nickel electrode as the positive electrode, and the nickel electrode is made of a mixture obtained by adding zinc hydroxide and cobalt hydroxide to nickel hydroxide. The nickel electrode is preferably made of a hydroxide complex containing, as a main ingredient, nickel hydroxide obtained by co-precipitating nickel hydroxide, zinc hydroxide, and cobalt hydroxide. Preferably the nickel electrode further contains a rare earth element such as Y, Er, Yb, etc., neatly or as a compound, because then it is possible to elevate the oxygen over-voltage of nickel electrode, and to thereby inhibit the evolution of oxygen gas on the nickel electrode even when the battery is charged rapidly.

Examples of the invention will be detailed below by taking, as an illustrative example, a cylindrical nickel metal-hydride battery, but it should be understood that the examples of the invention are not limited in any way to them.

Examples 1 to 11 relate to a sealed battery incorporating a ribbon-like lead, and they will be compared with Comparative examples.

Example 1

Preparation of Positive Electrode Plate

Nickel sulfate, zinc sulfate, and cobalt sulfate were dissolved at specified ratios in water to give an aqueous solution, to which were added ammonium sulfate and an aqueous solution of caustic soda to produce an ammine complex. To the reaction system, was further added dropwise under vigorous stirring an aqueous solution of caustic soda until the pH of the reaction system became pH 11 to 12, to thereby produce nickel hydroxide in the form of highly dense spherical particles in which nickel hydroxide, zinc hydroxide, and cobalt hydroxide coexisted at the weight ratio of 88.45:5.12:1.1. This served as a core mother material of the electrode.

The highly dense particles of nickel hydroxide were put into an alkaline aqueous solution whose pH had been adjusted to pH 10 to 13 with caustic soda. To the resulting solution was added dropwise under stirring an aqueous solution containing cobalt sulfate and ammonia at specified concentrations. During the addition, an aqueous solution of caustic soda was added to the mixture as needed to maintain the pH of the mixture at pH 11 to 12. A superficial layer constituted of mixed hydroxides including the hydroxides of Co was allowed to form on the surface of particles of nickel hydroxide by maintaining the pH of the mixture at pH 11 to 12 for 1 hour. The weight ratio of the mixed hydroxides constituting the superficial layer against the core mother material (to be referred to simply as core layer hereinafter) was 4.0 wt %.

A 50 g of nickel hydroxide in the form of particles whose surface carried a superficial layer constituted of mixed hydroxides was put into an aqueous solution of 30 wt % (10N) sodium hydroxide at 110° C., and the mixture was stirred thoroughly. Then, $K_2S_2O_8$ was added to the mixture in an amount in excess of an amount equivalent to the amount of the hydroxides of cobalt contained in the superficial layer, and evolution of oxygen gas from the superficial layer was confirmed. The active material particles were separated by filtration, washed with water, and dried.

To the active material particles was added an aqueous solution of carboxynethylcellulose (CMC) to give a paste in which the active particles and CMC solute were combined at the weight ratio of 99.5:0.5. The paste was applied to a nickel porous body having a surface density of 450 g/m² (Nickel Cellmet #8 manufactured by Sumitomo Electric Industries). Then, the body was dried at 80° C., and pressed into a plate having a specified thickness. The plate had its surface coated with Teflon, and cut to give a rectangular plate of 47.5 mm in width and 1150 mm in length (non-coated portion is 1 mm in width) that has a capacity of 6500 mAh (6.5 Ah). This was used as a nickel positive electrode plate.

(Preparation of Negative Electrode Plate)

A hydrogen absorbing alloy in the form of a powder having an average diameter of 30 μm and belonging to an $AB_5$ type rare earth element system whose composition is represented by $MmNi_{3.6}Co_{0.6}Al_{0.3}Mn_{0.35}$ was immersed in an aqueous solution containing NaOH at 48 wt % when measured at 20° C., and then in the same aqueous solution kept at 100° C. for 4 hours.

Then, the hydrogen absorbing alloy powder was separated by filtration under pressure from the treatment solution, to which was added pure water having the same weight with that of the hydrogen absorbing alloy powder, and the resulting mixture was exposed for 10 minutes to an ultrasonic wave having a frequency of 28 kHz. Then, while the mixture was being stirred gently, pure water was injected below a stirred suspension layer and excess water was allowed to flow out, thereby purging hydroxides of rare earth metal liberated from the alloy powder for disposal. Then, rinsing was continued until the pH of spilled water became pH10 or lower. The remaining mixture was filtered under pressure. Desorption of hydrogen was achieved by exposing the hydrogen absorbing alloy powder to water warned to 80° C. The warm water was filtered under pressure, and washed with water again. The alloy was cooled to 25° C., to which was added 4% hydrogen peroxide solution having the same weight with that of the alloy to desorb hydrogen. Thus, a hydrogen absorbing alloy that will serve as an electrode was obtained.

The alloy obtained as above was mixed with a styrenebutadiene copolymer at a ratio of 99.35:0.65 by mass, which was dispersed in water to form a paste. The paste was applied with a blade coater onto a punched steel plate made of a nickel-coated iron plate. The product was kept at 80° C. to be dried, and pressed to give a plate having a specified thickness and area of 47.5 mm (width)×1175 mm (length). The plate had a capacity of 11000 mAh (11.0 Ah), and this was used as a hydrogen absorbing alloy-based negative electrode plate.

(Preparation of Sealed Nickel Metal-Hydride Battery)

Figure 39:
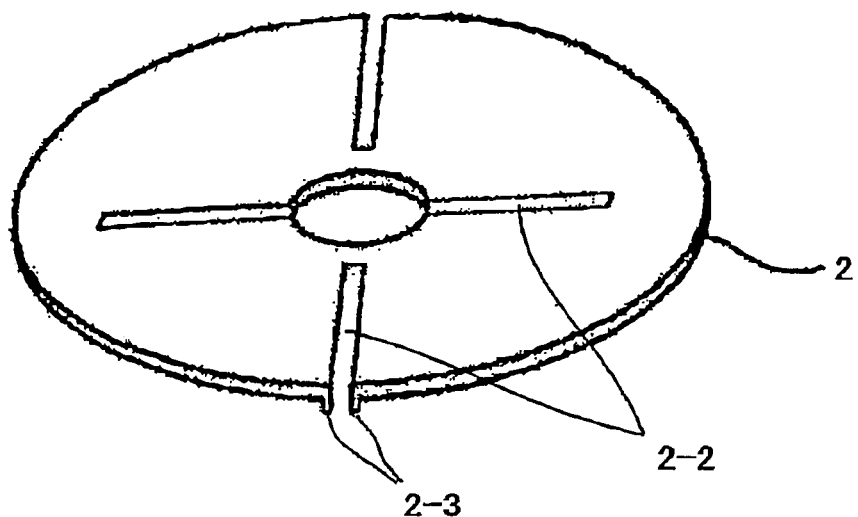
FIG. 39 is a diagram of a current collecting plate representing an example (Example 1 and others) of the invention.
Figure 40:
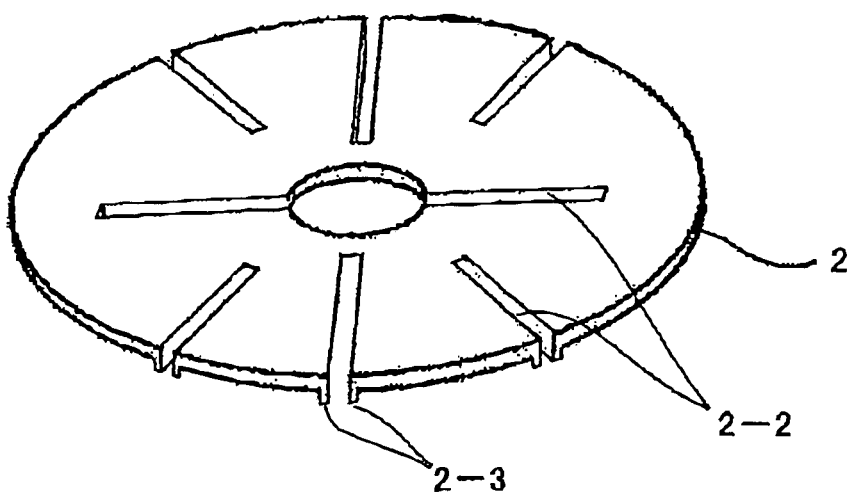
FIG. 40 is a diagram of a current collecting plate representing another example (Example 12 and others) of the invention.

A negative electrode plate prepared as above, a sheet of non-woven textile having a thickness of 120 μm and constituted of sulfonated polypropylene which serves as a separator, and a positive electrode plate prepared as above were combined one over another, and rolled together to form a roll which will serve as a electrode assembly. To the positive electrode ends protruding from the superior end of electrode assembly, an upper current collecting plate (current collecting plate of positive electrode was connected by resistance-welding. The upper current collecting plate was made of a nickel-plated steel plate, and shaped like a disc having a thickness and radius of 0.4 mm and 14.5 mm respectively with four radial slits inscribed around a central aperture as shown in FIG. 39. Each slit has two ridges (2-3) (teeth to interdigitate with positive electrode ends) along its lower margins. The other ends protruding from the electrode assembly is connected by resistance welding to a lower current collecting plate (current collecting plate of negative electrode) shaped as a disc of 0.4 mm in thickness which is made from a nickel-plated steel plate. A cylindrical container with a bottom which is made from a nickel-plated steel plate was prepared, and the electrode assembly having the current collecting plate attached was placed in the container such that the current collecting plate of positive electrode is disposed towards the open end of container while the current collecting plate of negative electrode plate was brought into contact with the bottom of container. Then, the central portion of current collecting plate of negative electrode was connected by resistance welding to the inner surface of the bottom of container. Then, a specified volume of an electrolyte solution containing 6.8N KOR and 0.8N LiOH was poured into the container.

A nickel plate of 0.6 mm in thickness was processed to give a strip of plate having a width of 2.5 mm and length of 66 mm. The strip of nickel plate has, on one long side, 10 spikes having a height of 0.5 mm and, on the other long side, 8 spikes having a height of 2 mm, and the strip of plate was bent into a ring which will serve as a lead. A disc-shaped lid body was prepared by processing a nickel plated steel plate into a disc having, at its center, a central aperture with a diameter of 0.8 mm. The lead was contacted with the lid body such that the ten spikes of 0.5 mm in height on one long side were brought into contact with the inner surface of lid body, and the ring-like lead was connected by resistance welding of the spikes to the lid body. A rubber valve (vent valve) and a cap-like terminal were attached to the outer surface of lid body. A ring-shaped gasket was fitted to the periphery of lid body to wrap it up.

The lid body assembly was placed on top of the electrode assembly so as to bring the long side of lead carrying eight spikes having a height of 2 mm into contact with the current collecting plate of positive electrode, and the open end of container was caulked to be sealed air-tight. Then, the battery body was compressed to give a specified overall height. Incidentally, the outward extension angle of each spike of 2 mm height provided on the long side of lead was adjusted so that, when pressure is applied for the adjustment of overall height of the battery, the positive electrode terminal is compressed towards the lid so much as to cause the spike to receive a pressure of 200 gf after withdrawal of the compressing pressure.

Incidentally, the radii of lid, cap, and the central rim of gasket after caulking was 14.5, 6.5, and 12.5 mm, respectively.

The output terminals of a resistance welder was applied to cap (80) (positive electrode terminal) and the bottom face (negative electrode terminal) of container (60), and the welder was adjusted so that charging and discharging may occur at the same current for the same period. Specifically, the welder was adjusted to give an alternate current through the positive electrode plate (6.5 Ah in capacity) at a rate of 0.6 kA/Ah (3.9 kA) for 4.5 msec both for charging and discharging directions. This alternate pulse sequence consisting of a square charging pulse and discharging pulse was counted as one cycle, and the welder was set to give two cycles. It was confirmed that during passage of the current no gas evolved that was sufficient in volume to give a pressure large enough to open the valve. By passing current as described above, lid (50) and current collecting plate of positive electrode (2) were connected by welding via ring-like lead (20), and a sealed nickel hydrogen storage battery as shown in FIG. 1 was obtained.

Incidentally, the batteries used in Examples and Comparative examples of the invention all had a weight equal to 176 g.

(Chemical Maturation, and Measurement of Internal Resistance and Output Power Density)

A sealed storage battery prepared as described above was left at 25° C. for 12 hours. Then, the battery was charged to 1200 mAh bypassing 130 mA (0.02 ItA), and then 650 mA (0.1 ItA) for 10 hours. The battery was then discharged to 1V or a cut voltage via 1300 mA (0.2 ItA). The battery was charged again for 16 hours via 650 mA (0.1 ItA), and discharged to 1V or cut voltage via 1300 mA (0.2 ItA). The cycle consisting of charge/discharge sequence was repeated four times. On completion of discharge of the fourth cycle, an alternate current of 1 kHz was used to measure the internal resistance of the battery.

To measure the output power density of a test battery, the battery was placed in an atmosphere kept at 25° C. After the end of discharge, the battery was charged by passing 650 mA (0.1 ItA) for 5 hours, and then discharged by passing 60 A for 12 sec. During discharging, the voltage of the battery at the 10th second was measured and the measurement was named the 10th second voltage for 60 A discharge. A charging current of 6 A was passed until the discharge was completely compensated for. Then, the battery was discharged by passing 90 A for 12 sec. During discharging, the voltage of the battery at the 10th second was measured and the measurement was named the 10th second voltage for 90 A discharge. The discharge was compensated for by passing a charging current of 6 A. Then, the battery was discharged by passing 120 A for 12 sec, and meantime the voltage of the battery at the 10th second was measured and the measurement was named the 10th second voltage for 120 A discharge. The discharge was compensated for by passing a charging current of 6 A. Then, the battery was discharged by passing 150 A for 12 sec, and meantime the voltage of the battery at the 10th second was measured and the measurement was named the 10th second voltage for 150 A discharge. The discharge was compensated for by passing a charging current of 6 A. Then, the battery was discharged by passing 180 A for 12 sec, and meantime the voltage of the battery at the 10th second was measured and the measurement was named the 10th second voltage for 180 A discharge.

Relationship of the tenth second voltage measurements with discharging currents was approximated to a line by a least square method: the line, when plotted on a coordinate system, takes a voltage value of E0 when the current value is 0 A, and has a gradient RDC. Then, from the formula below:

$$\text{Output power density (W/kg)} = (E0 - 0.8)/RDC \times 0.8/\text{battery weight (kg)}$$

the output power density of a battery was calculated. The output power density was obtained when the battery was discharged at 25° C. to 0.8V or cut voltage.

Example 2

Figure 41:
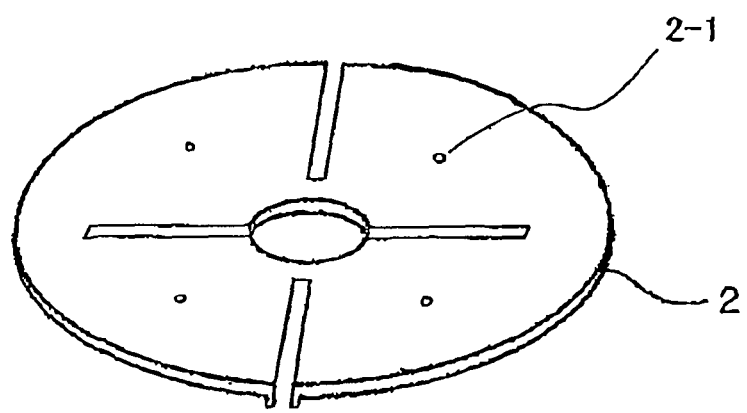
FIG. 41 is a diagram for showing (four) welding points representing an example (Example 2 and others) of the invention, on an upper current collecting plate at which a supplementary lead is to be welded.

A sealed battery as shown in FIG. 2 was prepared in the same manner as in Example 1, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by four welding points had a radius of 9 mm).

Example 3

A sealed battery as shown in FIG. 2 was prepared in the same manner as in Example 1, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 10 mm, and a circle defined by welding joints (pads) formed between supplementary lead and upper current collecting plate is, on a flat view, 2 mm apart from the inner-rim of main lead (namely, the circle defined by four welding points had a radius of 8 mm).

Example 4

A sealed battery as shown in FIG. 2 was prepared in the same manner as in Example 1, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 10 mm, and a circle defined by welding joints (pads) formed between supplementary lead and upper current collecting plate is, on a flat view, 3 mm apart from the inner-rim of main lead (namely, the circle defined by four welding points had a radius of 7 mm).

Comparative Example 1

Figure 6:
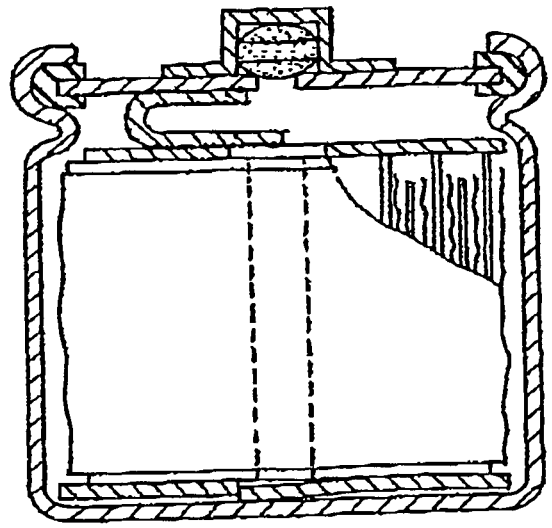
FIG. 6 is a sealed battery representing Comparative example 1 which incorporates a ribbon-like lead.
Figure 7:
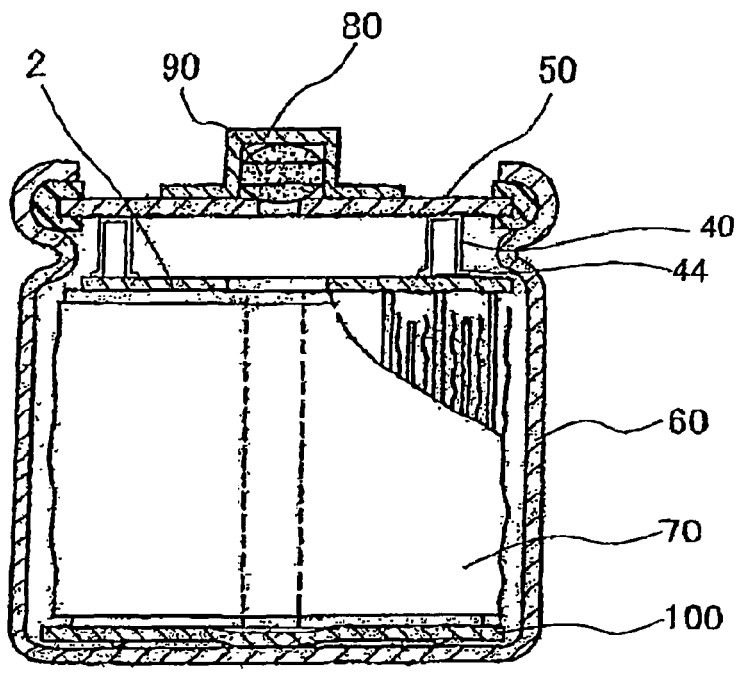
FIG. 7 is a sealed battery representing an example (Example 12) of the invention which incorporates a main lead and supplementary lead in the form of a double-walled ring having an inverted U-shaped profile.
Figure 36:
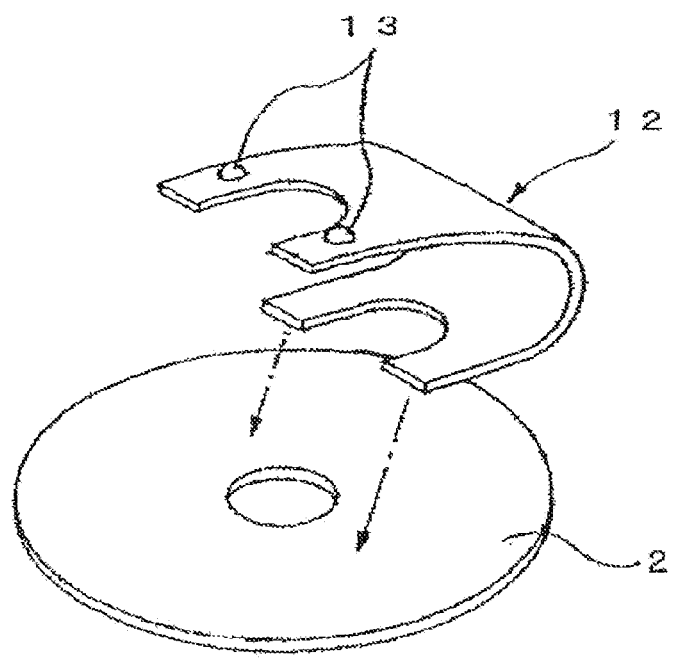
FIG. 36 is a schematic diagram representing a conventional upper current collecting plate and a ribbon-like lead plate.

A sealed battery as shown in FIG. 6 which incorporated a ribbon-like lead was prepared. Specifically, the battery was prepared as follows. A current collecting plate of positive electrode and a lead were integrally produced as shown in FIG. 36. The current collecting plate of positive electrode and lead were made from a nickel plate of 0.4 mm in thickness. The lead consisted of a plate of 7 mm in width and 25 mm in length. The lead was connected by resistance welding via two welding joints to the lid body. The resulting battery had the same configuration as a sealed storage battery prepared in Example 1 except the shape of lead and its connection to other adjoining elements. It was confirmed that no gas evolved that was sufficient in volume to give a pressure large enough to open the valve.

Comparative Example 2

A sealed battery was prepared in the same manner as in Example 1, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 10 mm, and a circle defined by welding joints (pads) formed between supplementary lead and upper current collecting plate is, on a flat view, 4 mm apart from the inner-rim of main lead (namely, the circle defined by four welding points had a radius of 6 mm).

Comparative Example 3

Figure 53:
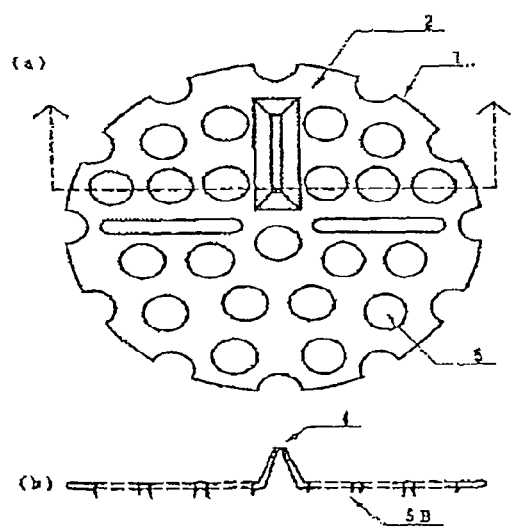
FIG. 53 gives flat and sectional vies of a current collecting plate fabricated integrally by conventional punching.
Figure 54:
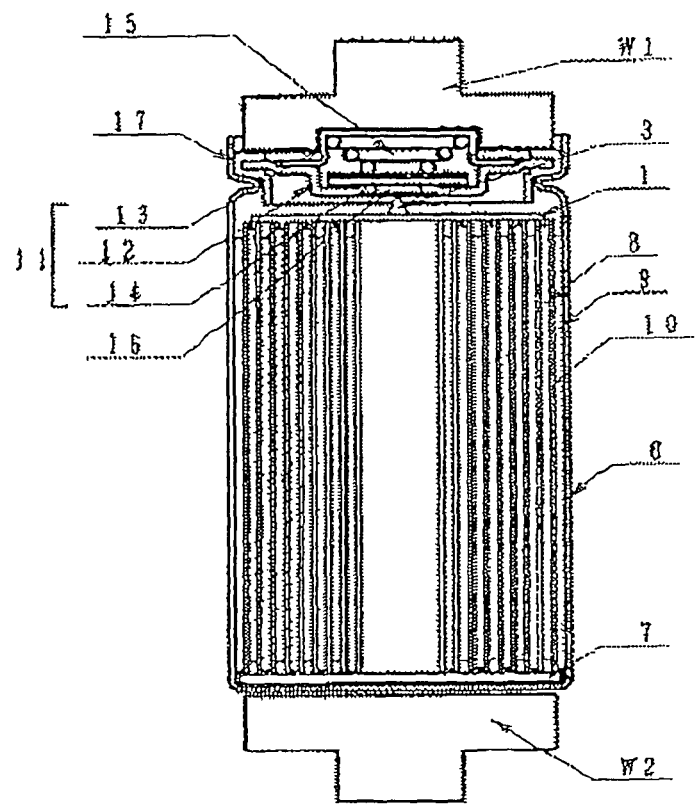
FIG. 54 is a sectional view of a battery for showing how an electrode assembly is inserted into a battery case, to be welded to a sealing body via a current collecting plate as shown in FIG. 53.
Figure 55:
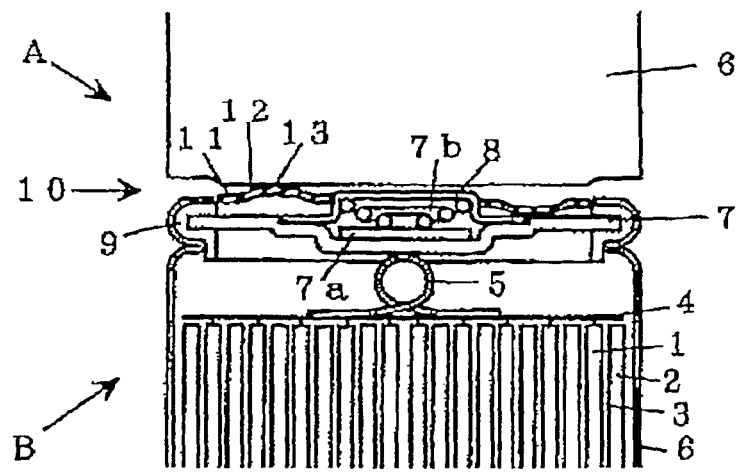
FIG. 55 is a sectional view of a battery for showing how a conventional lead in the form of a cylinder is welded to a current collecting plate of positive electrode.

A sealed battery was prepared in the same manner as in Example 1, except that the battery incorporated a lead in connection with an upper current collecting plate as shown in FIG. 53, instead of a ring-like lead combined with an upper current collecting plate as in Example 1.

(Table 1 Also Lists the Data of L1/X1 Ratios)

Sealed batteries obtained in Examples 2 to 4 and Comparative examples 1 to 3 were activated chemically under the same condition as in Example 1, and their internal resistances and output power densities were measured. Table 1 lists the measurement results of internal resistance and output power density of those batteries as well as those of the battery of Example 1.

TABLE 1

| Classification | Shape of lead | L1 (mm) | X1 (mm) | L1/X1 | Internal resistance (mΩ) | Output power density W/kg | Ring Diameter | Ring Radius | From center | Welding joints on current collecting plate | Welding joints on the inner surface of lid |
|---|---|---|---|---|---|---|---|---|---|---|---|
| Example 1 | Ring-like lead | 2.8 | 2.8 | 1.0 | 0.95 | 1480 | 20 | 10 | 10 | Outside of cap periphery | Outside of cap periphery |
| Example 2 | Ring-like lead + supplementary lead | 3.8 | 2.8 | 1.4 | 0.97 | 1450 | 20 | 10 | 9 | Outside of cap periphery | Outside of cap periphery |
| Example 3 | Ring-like lead + supplementary lead | 4.8 | 2.8 | 1.7 | 0.99 | 1440 | 20 | 10 | 8 | Outside of cap periphery | Outside of cap periphery |
| Example 4 | Ring-like lead + supplementary lead | 5.8 | 2.8 | 2.1 | 1.02 | 1410 | 20 | 10 | 7 | Outside of cap periphery | Outside of cap periphery |
| Comparative example 1 | Ribbon-like lead | 20.0 | 2.8 | 7.1 | 1.50 | 1000 | | | | Outside of cap periphery | Outside of cap periphery |
| Comparative example 2 | Ring-like lead + supplementary lead | 6.8 | 2.8 | 2.4 | 1.10 | 1350 | 20 | 10 | 6 | Inside of cap periphery | Outside of cap periphery |

TABLE 1-continued

| Classification | Shape of lead | L1 (mm) | X1 (mm) | L1/X1 | Internal resistance (mΩ) | Output power density W/kg | Position of welding joints Ring Diameter | Position of welding joints Ring Radius | From center | Welding joints on current collecting plate | Welding joints on the inner surface of lid |
|---|---|---|---|---|---|---|---|---|---|---|---|
| Comparative example 3 | Lead on punched current collecting plate | 3.8 | 2.8 | 1.4 | 1.35 | 1150 | | | | | Inside of cap periphery |

L1: length of lead from the welding point on the inner surface of lid to the nearest welding point on upper current collecting plate
X1: shortest distance between the welding point of lead on the inner surface of lid and the upper surface of upper current collecting plate.

As seen from Table 1, the batteries in which the position of welding points formed by lead on the inner surface of lid and ratio L1/X1 satisfy requirements specified by the invention, have a low internal resistance of 1 mΩ and a high output power density of 1400 W/kg or more.

Particularly, the batteries in which the ratio L1/X1 is in the range of 1 to 2.1, tend to have a high output power density.

In contrast, the battery of Comparative example 2, although it has lead-to-lid welding points within the range specified by the invention, is not satisfactory because of its internal resistance being slightly large and output power density being below 1400 W/kg, owing probably to its having a large ratio L1/X1 exceeding 2.1.

Comparative example 1 relates to a conventional sealed storage battery incorporating a ribbon-like lead. Although the position of lead-to-lid welding points satisfies the requirement of the invention, the internal resistance of the battery is large and its output power density low probably because of its L1/X1 ratio being too large.

Comparative example 3 relates to a conventional sealed storage battery incorporating a lead punched together with a current collecting plate. Although the L1/X1 ratio satisfies the requirement of the invention, the internal resistance of the battery is large and its output power density low probably because lead-to-lid welding points are, on a flat view, inside the periphery of cap.

Comparative Example 4

A sealed battery was obtained in the same manner as in Example 1, except that a ring-like lead having a radius of 5 mm was used.

Comparative Example 5

A sealed battery was prepared in the same manner as in Comparative example 4, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 5 mm, and a circle defined by welding joints (pads) formed between supplementary lead and upper current collecting plate is, on a flat view, 2 mm apart from the inner-rim of main lead (namely, the circle defined by four welding points had a radius of 7 mm).

Sealed batteries obtained in Comparative examples 4 and 5 were activated chemically under the same condition as in Example 1, and their internal resistances and output power densities were measured. Table 2 lists the measurement results of internal resistance and output power density of those batteries as well as those of the battery of Example 2.

TABLE 2

| Classification | Shape of lead | Position of welding joints. welding joints on the inner surface of lid | L1 (mm) | X1 (mm) | L1/X1 | Internal resistance (mΩ) | Output power density W/kg | Ring Diameter | Ring Radius | Position From center |
|---|---|---|---|---|---|---|---|---|---|---|
| Example 2 | Ring-like lead + supplementary lead | Outside of cap periphery | 3.8 | 2.8 | 1.35 | 0.97 | 1450 | 20 | 10 | 9 |
| Comparative example 4 | Ring-like lead | Inside of cap periphery | 3.8 | 2.8 | 1.4 | 1.10 | 1350 | 10 | 5 | 5 |
| Comparative example 5 | Ring-like lead + supplementary lead | Inside of cap periphery | 3.8 | 2.8 | 1.4 | 1.15 | 1380 | 10 | 9 | 7 |
| — | Ring-like lead + supplementary lead | Outside gasket periphery | | | | Wo welding point | | | | |

Incidentally, the position of supplementary lead (30) and welding points (2-1) of upper current collecting plate (2) varies depending on the radius of main lead (20), and the distance between the pads (30-1) of supplementary lead, and the inner surface of main lead (20).

Figure 5:
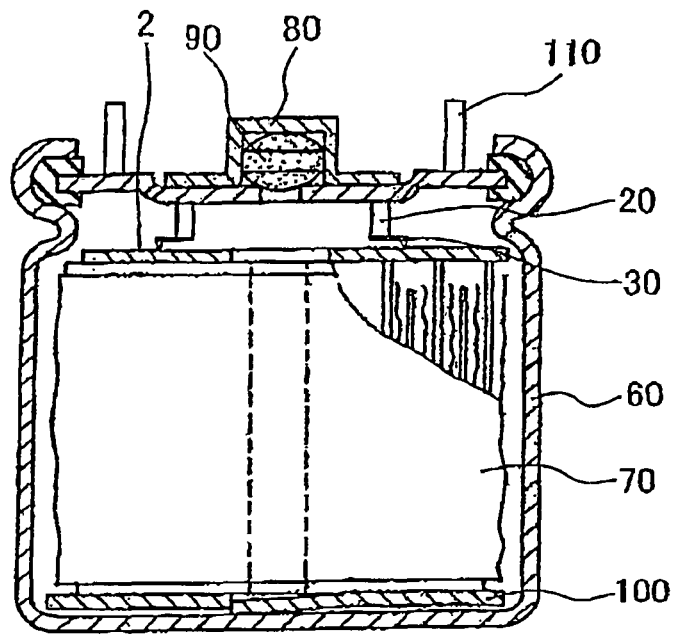
FIG. 5 is a sealed battery (Comparative examples 5 and others) which incorporates a ring-shaped main lead and a ring-shaped supplementary lead (welding points located outward).

As seen from the results shown in Table 2 of Comparative examples 4 and 5, even though their L1/X1 ratio is in the range specified by the invention, they are not preferred because of their internal resistance being somewhat large and output power density is below 1400 W/kg. This is probably because, when as shown in FIG. 5 an electrical connection point through which current is extracted outside from the battery is provided at a position, when projected to the upper surface of lid, inside the periphery of cap, current must pass through the body of lid, which will lead to the elongated current passage and the increase of internal resistance.

If a battery stack can maintain output of 1400 W/kg or higher, it will be able to maintain 1 V/cell at normal temperature even it discharges via 200 A (which corresponds to 30 ItA) in the driving of a hybrid electric vehicle (HEV). In this respect, a nickel metal-hydride battery able to deliver 1400 W/kg or more as output is preferred, because then it is possible to set 1 V/cell as a lower limit of voltage control for preventing over discharge, and thus to prevent the battery from being exposed to over discharge, no matter which pattern the current activating the battery may have when setting 30 ItA as a higher limit of voltage control.

Comparative Example 6

A sealed battery was prepared in the same manner as in Comparative example 4, except that a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 5 mm, and a circle defined by welding joints (pads) formed between supplementary lead and upper current collecting plate is, on a flat view, 1 mm apart from the inner-rim of main lead (namely, the circle defined by four welding points had a radius of 4 mm).

Comparative Example 7

A sealed battery was prepared in the same manner as in Example 2, except that the inner rim of ring-like lead had a radius of 6 mm, and a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 6 mm, and a circle defined by welding joints (pads) formed between supplementary lead and upper current collecting plate is, on a flat view, 1 mm apart from the inner-rim of main lead (namely, the circle defined by four welding points had a radius of 5 mm).

Example 5

A sealed battery was prepared in the same manner as in Example 2, except that the inner rim of ring-like lead had a radius of 7 mm, and a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 7 mm, and a circle defined by welding joints (pads) formed between supplementary lead and upper current collecting plate is, on a flat view, 1 mm apart from the inner-rim of main lead (namely, the circle defined by four welding points had a radius of 6 mm).

Example 6

A sealed battery was prepared in the same manner as in Example 2, except that the inner rim of ring-like lead had a radius of 8 mm, and a ring-like main lead was connected to an upper current collecting plate (2) by welding four pads (30-1) carried by a supplementary lead as shown in FIG. 13 to welding points (2-1) carried by the upper current collecting plate as shown in FIG. 41.

The inner rim of ring-like main lead had a radius of 8 mm, and a circle defined by welding joints (pads) formed between supplementary lead and upper current collecting plate is, on a flat view, 1 mm apart from the inner-rim of main lead (namely, the circle defined by four welding points had a radius of 7 mm).

Example 7

A sealed battery was prepared in the same manner as in Example 2, except that the inner rim of ring-like lead had a radius of 8 mm, and a ring-like main lead was connected to an upper current collecting plate (2) by welding four pads (30-1) as shown in FIG. 13 carried by a supplementary lead as shown in FIG. 3 to welding points (2-1) carried by the upper current collecting plate as shown in FIG. 41.

The inner rim of ring-like main lead had a radius of 8 mm, and a circle defined by welding joints (pads) formed between supplementary lead and upper current collecting plate is, on a flat view, 1 mm apart from the inner-rim of main lead (namely, the circle defined by four welding points had a radius of 9 mm).

Example 8

A sealed battery was prepared in the same manner as in Example 2, except that the inner rim of ring-like lead had a radius of 9 mm, and a ring-like main lead was connected to an upper current collecting plate (2) by welding four pads (30-1) as shown in FIG. 13 carried by a supplementary lead as shown in FIG. 3 to welding points (2-1) carried by the upper current collecting plate as shown in FIG. 41.

The inner rim of ring-like main lead had a radius of 9 mm, and a circle defined by welding joints (pads) formed between supplementary lead and upper current collecting plate is, on a flat view, 1 mm apart from the inner-rim of main lead (namely, the circle defined by four welding points had a radius of 10 mm).

Comparative Example 8

A sealed battery was prepared in the same manner as in Example 2, except that the inner rim of ring-like lead had a radius of 10 mm, and a ring-like main lead was connected to an upper current collecting plate (2) by welding four pads (30-1) as shown in FIG. 13 carried by a supplementary lead as shown in FIG. 3 to welding points (2-1) carried by the upper current collecting plate as shown in FIG. 41.

The inner rim of ring-like main lead had a radius of 10 mm, and a circle defined by welding joints formed between supplementary lead and upper current collecting plate is, on a flat view, 1 mm apart from the inner-rim of main lead (namely, the circle defined by four welding points had a radius of 11 mm).

Sealed batteries obtained in Comparative examples 6 to 8, and Examples 5 to 8 were activated chemically under the same condition as in Example 1, and their internal resistances and output power densities were measured. Table 3 lists the measurement results of internal resistance and output power density of those batteries as well as those of the battery of Example 2.

TABLE 3

| Classification | Shape of lead | Diameter of ring | Position From center | Radius ratio | welding joints on current collecting plate | Position, welding joints on the inner surface of lid | L1 (mm) | X1 (mm) | L1/X1 | Internal resistance (mΩ) | Output power density W/kg |
|---|---|---|---|---|---|---|---|---|---|---|---|
| Example 2 | Ring-like lead + supplementary lead | 20 | 9 | 62% | Outside of cap periphery | Outside of cap periphery | 3.8 | 2.8 | 1.4 | 0.97 | 1450 |
| Comparative example 6 | Ring-like lead + supplementary lead | 10 | 4 | 28% | Inside of cap periphery | Inside of cap periphery | 3.8 | 2.8 | 1.4 | 1.10 | 1350 |
| Comparative example 7 | Ring-like lead + supplementary lead | 12 | 5 | 34% | Inside of cap periphery | Inside of cap periphery | 3.8 | 2.8 | 1.4 | 1.20 | 1150 |
| Example 5 | Ring-like lead + supplementary lead | 14 | 6 | 41% | Inside of cap periphery | Outside of cap periphery | 3.8 | 2.8 | 1.4 | 0.95 | 1400 |
| Example 6 | Ring-like lead + supplementary lead | 16 | 7 | 48% | Outside of cap periphery | Outside of cap periphery | 3.8 | 2.8 | 1.4 | 0.97 | 1450 |
| Example 7 | Ring-like lead + supplementary lead | 16 | 9 | 62% | Outside of cap periphery | Outside of cap periphery | 3.8 | 2.8 | 1.4 | 0.97 | 1450 |
| Example 8 | Ring-like lead + supplementary lead | 18 | 10 | 69% | Outside of cap periphery | Outside of cap periphery | 3.8 | 2.8 | 1.4 | 0.97 | 1450 |
| Comparative example 8 | Ring-like lead + supplementary lead | 20 | 11 | 76% | Outside of cap periphery | Outside of cap periphery | 3.8 | 2.8 | 1.4 | 1.12 | 1250 |

Radius of lid, 14.5 mm; radius of cap, 6.5 mm; radius of current collecting plate, 14.5 mm As seen from the results shown in Table 3, the batteries, in which the position of welding points formed by lead on the inner surface of lid satisfy requirements specified by the invention, and welding joints formed on upper current collecting plate are apart 41 to 69% from the center of upper current collecting plate with respect to the radius of the above plate, that is, the batteries of Examples 2, and 5 to 8 favorably had a low internal resistance below 1 mΩ and output power density of 1400 W/kg or more.

Particularly, the batteries, in which the position of welding points formed by lead on the inner surface of lid satisfy requirements specified by the invention, and a circle defined by welding joints formed on upper current collecting plate is, in a flat view, outside the periphery of cap, that is, the batteries of Examples 2, and 6 to 8 had a high output power density of 1450 W/kg.

However, as seen from the battery of Comparative example 8, to put a circle defined by welding joints formed on upper current collecting plate far outside from the periphery of cap is not preferable, because then the internal resistance becomes high and output power density low.

The batteries of Comparative examples 6 and 7 are not preferred in which welding joints formed on upper current collecting plate are apart only 41% from the center of upper current collecting plate with respect to the radius of the above plate, because then a circle defined by the welding points formed on upper current collecting plate is, in a flat view, inside the periphery of cap, and thus the internal resistance becomes slightly large and output power density is reduced below 1400 W/kg.

Example 9

Figure 42:
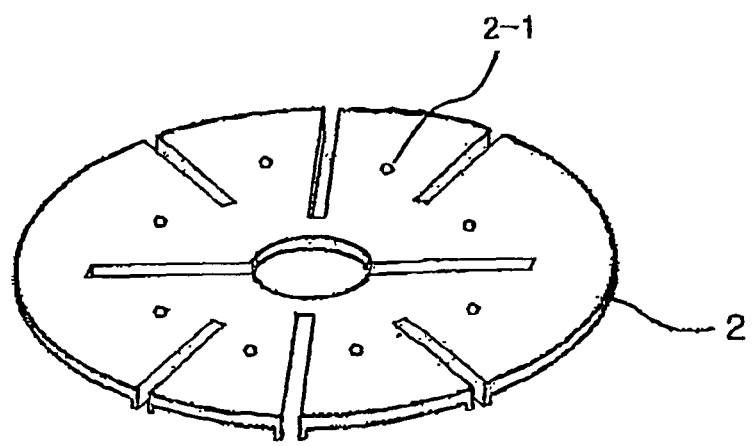
FIG. 42 is a diagram for showing (eight) welding points representing another example (Example 9) of the invention, on an upper current collecting plate (current collecting plate of positive electrode) at which a supplementary lead is to be welded.

A sealed battery was prepared in the same manner as in Example 2, except that the inner rim of ring-like lead had a radius of 10 mm, and a ring-like main lead was connected to an upper current collecting plate (2) by welding eight pads (30-1) as shown in FIG. 13 carried by a supplementary lead as shown in FIG. 4 to welding points (2-1) carried by the upper current collecting plate as shown in FIG. 42.

The inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by eight welding points had a radius of 9 nm).

Example 10

Figure 43:
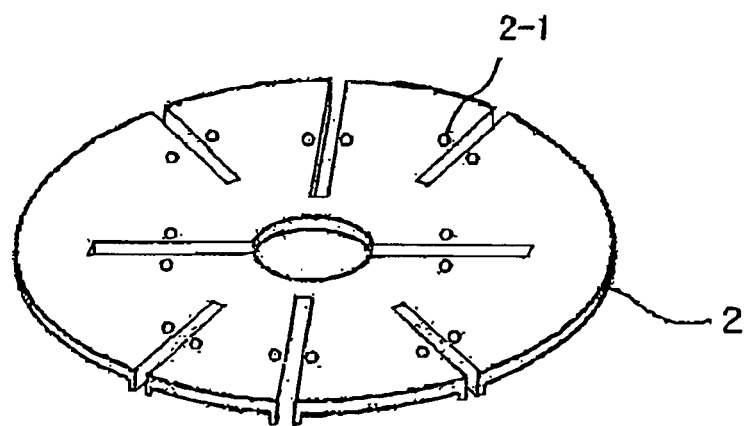
FIG. 43 is a diagram for showing (sixteen) welding points representing yet another example (Example 10) of the invention, on an upper current collecting plate (current collecting plate of positive electrode) at which a supplementary lead is to be welded.

A sealed battery was prepared in the same manner as in Example 2, except that the inner rim of ring-like lead had a radius of 10 mm, and a ring-like main lead was connected to an upper current collecting plate (2) by welding 16 pads (30-1) as shown in FIG. 13 carried by a supplementary lead as shown in FIG. 4 to welding points (2-1) carried by the upper current collecting plate as shown in FIG. 43.

The inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by 16 welding points had a radius of 9 mm).

Comparative Example 9

A sealed battery was prepared in the same manner as in Example 2, except that the inner rim of ring-like lead had a radius of 10 mm, and a ring-like main lead was connected to an upper current collecting plate by welding 20 pads (30-1) as shown in FIG. 13 carried by a supplementary lead as shown in FIG. 4 to the upper current collecting plate.

The inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by 20 welding points had a radius of 9 mm).

Comparative Example 10

Figure 44:
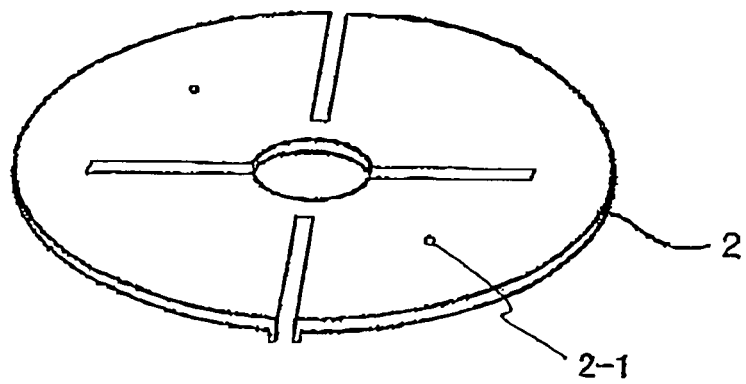
FIG. 44 is a diagram for showing (two) welding points representing an example (Comparative example 10), on an upper current collecting plate (current collecting plate of positive electrode) at which a supplementary lead is to be welded.

A sealed battery was prepared in the same manner as in Example 2, except that the inner rim of ring-like lead had a radius of 10 mm, and a ring-like main lead was connected to an upper current collecting plate (2) by welding two pads (30-1) as shown in FIG. 13 carried by a supplementary lead as shown in FIG. 4 to welding points (2-1) carried by the upper current collecting plate as shown in FIG. 44.

The inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by two welding points had a radius of 9 mm).

Sealed batteries obtained in Examples 9 and 10, and Comparative examples 9 and 10 were activated chemically under the same condition as in Example 1, and their internal resistances and output power densities were measured. Table 4 lists the measurement results of internal resistance and output power density of those batteries as well as those of the battery of Example 2.

TABLE 4

| Classification | Shape of lead | Number of welding points on current collecting plate | L1 (mm) | X1 (mm) | L1/X1 | Internal resistance (mΩ) | Output power density W/kg |
|---|---|---|---|---|---|---|---|
| Example 2 | Ring-like lead + supplementary lead | 4 | 3.8 | 2.8 | 1.4 | 0.97 | 1450 |
| Example 9 | Ring-like lead + supplementary lead | 8 | 3.8 | 2.8 | 1.4 | 0.95 | 1480 |
| Example 10 | Ring-like lead + supplementary lead | 16 | 3.8 | 2.8 | 1.4 | 0.92 | 1520 |
| Comparative example 9 | Ring-like lead + supplementary lead | 20 | 3.8 | 2.8 | 1.4 | 1.35 | 1100 |
| Comparative example 10 | Ring-like lead + supplementary lead | 2 | 3.8 | 2.8 | 1.4 | 1.35 | 1100 |

As seen from the results shown in Table 4, the batteries, in which the position of welding points formed by lead on the inner surface of lid satisfy requirements specified by the invention, had a low internal resistance and high output power density of 1400 W/kg or more, because, when as shown in FIG. 4 a electrical connection point through which current is extracted outside from the battery is provided at a position, when projected to the upper surface of lid, outside the periphery of cap, current passage will be shortened.

Particularly it was found by comparing the sealed batteries of Examples 2, 9 and 10 with each other that as the number of welding joints formed on upper current collecting plate is increased from four to sixteen, the internal resistance of battery becomes smaller and its output power density higher.

Installment of too many or too few welding joints should be avoided, because the sealed battery incorporating such too many or too few welding joints will have a high internal resistance and low output power density, as is evidenced from the sealed batteries of Comparative examples 9 and 10 which incorporate 20 and two welding joints, respectively.

The reason why too many welding joints should be avoided is as follows. Each welding point requires a certain amount of current for welding, and thus when the number of welding points exceeds a certain value, say, eighteen, a great amount of current must be passed through a battery during welding which will exceed the capacitance of electrode assembly and decompose electrolyte solution to evolve gas which may cause the leakage of electrolyte solution during passage of current. If, to avoid this, the amount of current or the duration of current pulse is reduced, a sufficient amount of current necessary for secure establishment of those welding joints can not be obtained, and there will be some defective welding joints that may cause the elevation of internal resistance of the battery. The reason why too few welding joints should be avoided is as follows. Assume, for example, a battery in which two welding joints are installed. Although the welding joints can be securely established in this case, the internal resistance of the battery will be high, because each welding joint forms a comparatively high resistance point, and thus if the number of welding joints is too small, the resistance of each welding joint can not be ignored.

Example 11

A lower current collecting plate (negative electrode current collecting plate) of Example 2 was used. The plate having four welding points thereon was placed in a container such that the welding points were disposed along a circle corresponding, in a flat view, to the periphery of cap. Electrolyte solution was poured into the container, output terminals of a resistance welder were connected one to the lower current collecting plate and the other to the bottom surface (negative electrode terminal) of container, and the welder was adjusted so that charging and discharging may occur at the same current for the same period. Specifically, the welder was adjusted to give an alternate current through the positive electrode plate (6.5 Ah in capacity) at a rate of 0.6 kA/Ah (3.9 kA) for 4.5 msec both for charging and discharging directions. This alternate pulse sequence consisting of a square charging pulse and discharging pulse was counted as one cycle, and the welder was set to give one cycle.

Then, the central portion of lower current collecting plate was resistance-welded to the wall surface of container, a electrode assembly was placed in the container, and a lid having main and supplementary leads attached thereto was placed on top of the electrode assembly so as to bring the lead into intimate contact with an upper current collecting plate (current collecting plate of positive electrode) on the electrode assembly as in Example 2. The open end of container was caulked to be sealed air-tight. Then, the battery body was compressed to give a specified overall height. The same method as in Example 2 was employed to produce a sealed battery, except that current was passed to weld the welding points of supplementary lead to the upper current collecting plate.

Incidentally, the inner rim of ring-like main lead had a radius of 10 mm, and a circle defined by welding joints (pads) formed between supplementary lead and upper current collecting plate is, on a flat view, 1 mm apart from the inner-rim of main lead (namely, the circle defined by four welding points had a radius of 9 mm).

Sealed batteries obtained in Example 11 was activated chemically under the same condition as in Example 1, and their internal resistances and output power densities were measured. Table 5 lists the measurement results of internal resistance and output power density of those batteries as well as those of the battery of Example 2.

TABLE 5

| Classification | Shape of lead | Number of welding points on the bottom of container | L1 (mm) | X1 (mm) | L1/X1 | Internal resistance (mΩ) | Output power density W/kg |
|---|---|---|---|---|---|---|---|
| Example 2 | Ring-like lead + supplementary lead | Single point at center | 3.8 | 2.8 | 1.4 | 0.97 | 1450 |
| Comparative example 11 | Ring-like lead + supplementary lead | Single central point + four points outside the periphery of cap | 3.8 | 2.8 | 1.4 | 0.88 | 1560 |

It was found from the results shown in Table 5, when a sealed battery of Example 11 in which a circle defined by the welding points formed between the outer surface of lower current collecting plate and the inner surface of bottom of container is, in a flat view, outside the periphery of cap, is compared with a sealed battery of Example 2 in which connection between the outer surface of lower current collecting plate and the inner surface of bottom of container is achieved only through a single central welding point, the former is more preferable because the former has a lower internal resistance and higher output power density.

Figure 47:
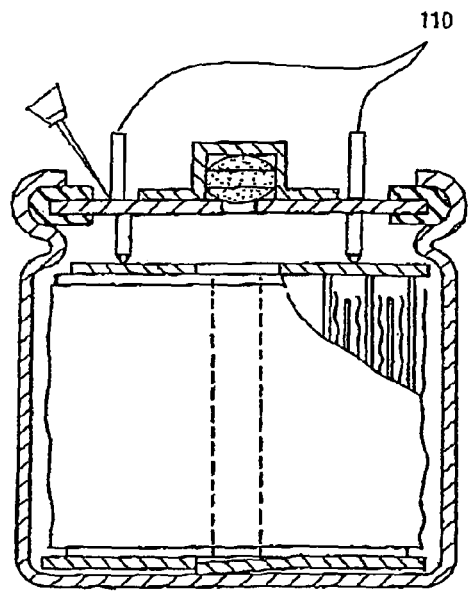
FIG. 47 illustrates a method for attaching a cell-to-cell connector (ring-shaped lead) to the external surface of a lid of a sealed battery.

The reason for this will be explained as below. A battery having a single central welding point on the bottom of container allows welding rods to be connected one to the center of electrode assembly which is in direct contact with the central welding point and the other to the outer surface of bottom of container, and thus welding current can be directly applied to the central welding point without passing the interior of battery, and thus it is possible to establish a secure welding joint there with a very low resistance. However, a problem as described below will arise if, for example, two such batteries are combined to produce a battery stack. As shown in FIGS. 47 and 48, one end of a ring-like cell-to-cell connector (110) is welded to a first cell such that the ring wall is outside the periphery of cap (80) attached to lid (50) of the cell. Then, the outer surface of bottom of container (60) of a second cell is brought into contact with the other end of cell-to-cell connector (110) for welding. In this case, however, a circle defined by the welding points formed on the outer surface of bottom of container (60) of the second cell is, in a flat view, outside the periphery of cap (80) of the same cell, and thus passage of current observed during welding of the connector to the bottom of second cell consists of welding points between the connector and the outer surface of bottom→welding point (single central welding point) between the inner face of bottom and the lower current collecting plate→welding points between the lower current collecting plate and negative electrode plate. Thus, the passage of current becomes long which leads to the increased internal resistance of the battery.

This problem may be avoided by providing plural welding points on the inner surface of lower current collecting plate in contact with the inner surface of bottom of container, and disposing a circle defined by the welding points to be, in a flat view, outside the periphery of cap, because then the passage of current will be shortened, and the internal resistance of the battery be reduced.

Incidentally, the central welding point on the bottom of container is preferably so constructed as to permit the current of welding to be directly applied thereto thereby eliminating the need for passage through the interior of battery, and to be used as such in the operation of battery.

The eccentric welding points on the lower current collecting plate should be disposed such that a circle defined by them is, in a flat view, outside the periphery of cap, and their number is preferably 4 to 16 for the same reason cited above with respect to the upper current collecting plate. Then, the same advantage as is observed for the upper current collecting plate was obtained.

Table 5 shows the relation of the internal resistance of a battery with its output power density, for the batteries obtained in Examples 1 to 11, and Comparative examples 1 to 10.

Figure 46:
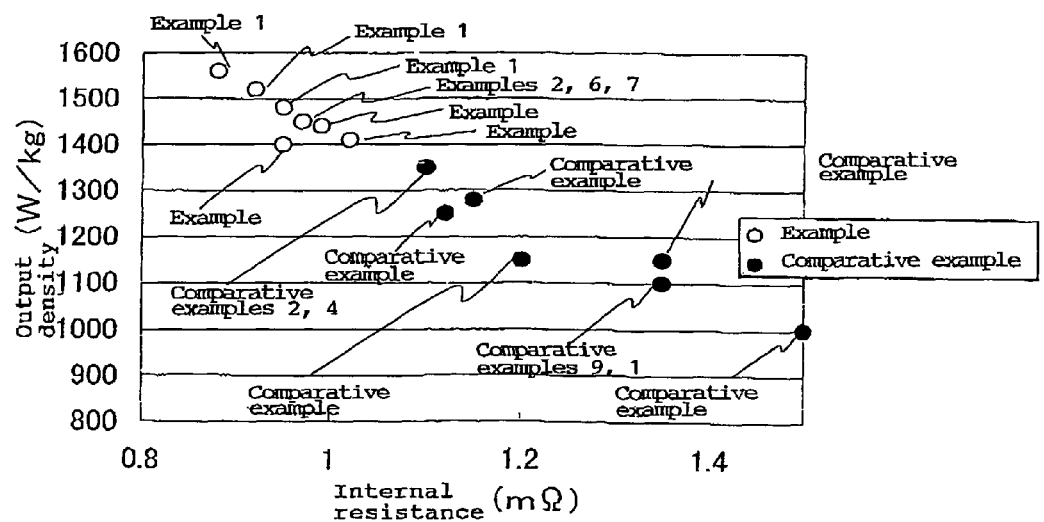
FIG. 46 represents plots indicating the relationship of internal resistance and output power density.

For the batteries, their output power densities were plotted on the ordinate, while the internal resistances on the abscissa, and the resulting plots are shown in FIG. 46.

TABLE 6

| | Internal resistance | Output power density, Examples | Output power density, Comparative examples |
|---|---|---|---|
| Example 1 | 0.95 | 1480 | |
| Example 2 | 0.97 | 1430 | |
| Example 3 | 0.99 | 1440 | |
| Example 4 | 1.02 | 1410 | |
| Comparative example 1 | 1.5 | | 1000 |
| Comparative example 2 | 1.1 | | 1350 |
| Comparative example 3 | 1.35 | | 1150 |
| Comparative example 4 | 1.1 | | 1350 |
| Comparative example 5 | 1.15 | | 1280 |
| Comparative example 6 | 1.1 | | 1350 |
| Comparative example 7 | 1.2 | | 1150 |
| Comparative example 8 | 1.12 | | 1250 |
| Comparative example 9 | 1.35 | | 1100 |
| Comparative example 10 | 1.35 | | 1100 |
| Example 5 | 0.95 | 1400 | |
| Example 6 | 0.97 | 1450 | |
| Example 7 | 0.97 | 1450 | |
| Example 8 | 0.97 | 1450 | |
| Example 9 | 0.95 | 1480 | |
| Example 10 | 0.92 | 1520 | |
| Example 11 | 0.88 | 1560 | |

It is likely from the inspection of Table 6 and FIG. 46 that the reduction of internal resistance is well correlated with the improved output power density. Thus, a sealed battery of the invention, or a battery stack constituted of batteries of the invention will have such a low internal resistance, and be capable of delivering such a high output that they will be suitably used as a power source of HEV.

In the following description, Examples 12 to 20 deal with sealed batteries in which a lead is shaped like a double-walled ring comprising a frame portion and lateral wall portions, and those in which a lead is shaped like a single-wall ring comprising a frame portion and a lateral wall portion. Example 21 deals with a battery in which a double-walled ring the same in structure is used, with, however, main and supplementary leads having a different thickness.

Example 12

Positive and negative electrode plates were fabricated in the same manner as in Example 1, and then a sealed nickel metal-hydride battery incorporating a double-walled ring having an inverted-U shaped profile was prepared.

A plate of a negative electrode prepared as above, a sheet of non-woven textile having a thickness of 120 µm and constituted of sulfonated polypropylene which served as a separator, and a positive electrode plate were combined one over another, and rolled together to form a electrode assembly. To a positive electrode plate protruding from one end of the electrode assembly, was connected an upper current collecting plate (current collecting plate of positive electrode) by electric resistance welding. The upper current collecting plate is a nickel-plated steel plate of 0.4 mm in thickness having a disc-like shape with a radius of 14.5 mm which has a through-hole at its center with eight slits (2-2) extending radially therefrom. Each slit has two parallel ridges (2-3) of 0.5 mm in height (portions to interdigitate with the electrode substrate) along two edges facing to each other. Another nickel-plated steel plate was prepared that is a nickel-plated steel plate of 0.4 mm in thickness having a disc-like shape. This was a lower current collecting plate (current collecting plate of negative electrode). The lower current collecting plate was connected by resistance welding to the other end protruding from the rolled electrode assembly. A cylindrical container with a bottom made of a nickel plated steel was prepared. The electrode assembly having upper and lower current collecting plates attached thereto was placed in the container such that the upper current collecting plate was flush with an open end of container and the lower current collecting plate was brought into contact with the bottom of container. Then, the central portion of lower electrode current collecting plate was resistance-welded to the bottom surface of container. Next, a specified amount of electrolyte solution or aqueous solution comprising 6.8 N KOH and 0.8 N LiOH was injected into the container.

A nickel plate having a thickness of 0.3 mm was pressed to form a double-walled ring having an inverted-U profile as shown in FIG. 15. The lead (40) in the form of a double-walled ring had a frame portion (41) of 1.8 mm in width with eight knobs (41*a*) thereon and two lateral portions each with eight tabs or supplementary leads (44) along their margins each carrying a pad (44*a*), thus totaling 16 pads. The circular inner rim of frame portion (41) had a diameter of 19 mm. The distance between the top of knob and the tip of pad was 4 mm.

The knobs (41*a*) on the frame portion (41) of main lead were brought into contact with the inner surface of lid, and connected by spot welding to the latter as shown in FIG. 38(*b*).

To the outer surface of lid (50) were attached a rubber valve (vent valve) and a cap-like terminal. A ring-shaped gasket was applied to the periphery of lid (50) to wrap it up.

Figure 45:
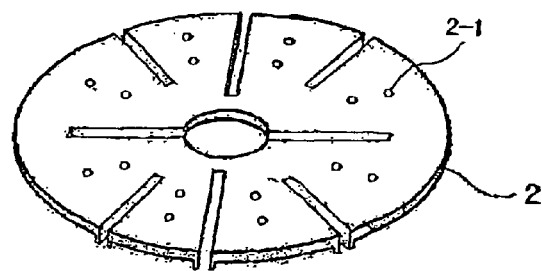
FIG. 45 is a diagram for showing (sixteen) welding points representing yet another example (Example 12) of the invention, on an upper current collecting plate (current collecting plate of positive electrode) at which a supplementary lead is to be welded.

Lid (50) having main and supplementary leads attached thereto was placed on top of electrode assembly so as to bring pads (44*a*) of supplementary lead (44) into intimate contact with a positive electrode upper current collecting plate (2). The open end of container (60) was caulked to be sealed air-tight. Then, the battery body was compressed to give a specified overall height. Incidentally, the outward extension angle of each pad provided on the supplementary lead (44) was adjusted as shown in FIG. 38(*c*) so that, when pressure is applied for the adjustment of overall height of the battery, the welding point (44*a*) in contact with current collecting plate of positive electrode (2) is compressed towards the lid so much as to cause the pad to receive a pressure of 200 gf after withdrawal of the compressing pressure. The pad (44*a*) on supplementary lead portion (44) is brought into contact with a welding point (2-1) formed on current collecting plate of positive electrode (2) as shown in FIG. 45 to form a welding joint together.

The output terminals of a resistance welder were connected one to cap (80) (positive electrode terminal) and the other to the bottom surface (negative electrode terminal) of container (60), and the welder was adjusted so that charging and discharging may occur at the same current for the same period. Specifically, the welder was adjusted to give an alternate current through the positive electrode plate (6.5 Ah in capacity) at a rate of 0.6 kA/Ah (3.9 kA) for 4.5 msec both for charging and discharging directions. This alternate pulse sequence consisting of a square charging pulse and discharging pulse was counted as one cycle, and the welder was set to give two cycles. Thus, supplementary lead portion (44) was welded to the upper surface of current collecting plate of positive electrode (2). It was confirmed that no gas evolved that was sufficient in volume to give a pressure large enough to open the valve. Thus, a sealed nickel hydrogen storage battery as shown in FIG. 38(*d*), 7 in which lid (50) was connected via lead to current collecting plate of positive electrode (2) as described above was obtained.

For the resulting battery, the radii of lid (50), cap (80), and the central rim of gasket after caulking was 14.5, 6.5, and 12.5 mm, respectively. For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 13

Figure 9:
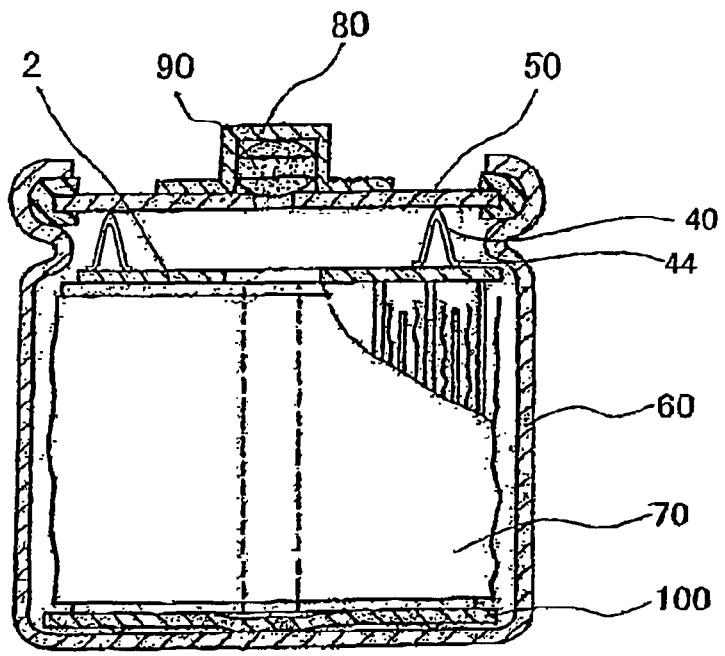
FIG. 9 is a sealed battery representing an example (Example 13) of the invention which incorporates a main lead and supplementary lead in the form of a double-walled ring having an inverted V-shaped profile.
Figure 10:
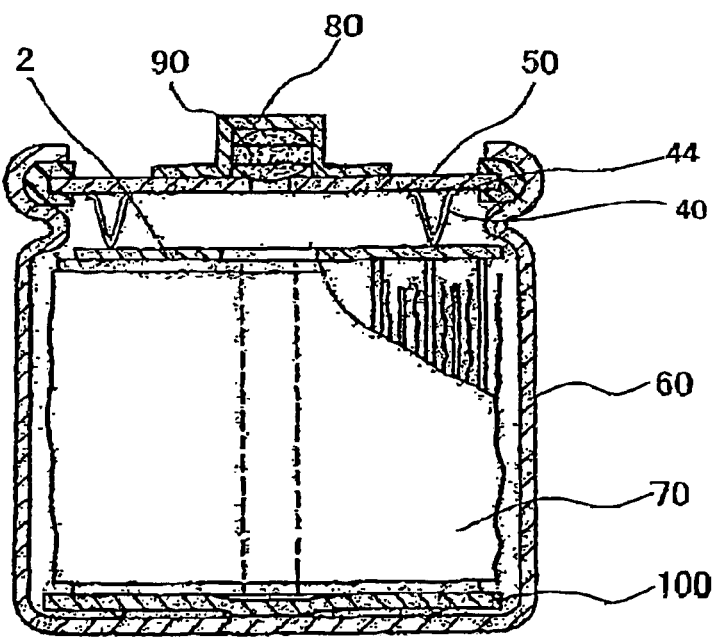
FIG. 10 is a sealed battery representing an example of the invention which incorporates a main lead and supplementary lead in the form of a double-walled ring having a V-shaped profile.

A sealed battery as shown in FIG. 9 was obtained in the same manner as in Example 12, except that lead connecting between the inner surface of lid (50) and the outer surface of current collecting plate of positive electrode (2) is in the form of a double-walled ring having an inverted-V shaped profile as shown in FIG. 17.

For the battery thus assembled, the length of lead from the welding point of main lead portion (40) on the inner surface of lid (50) to the nearest welding point (2-1) of supplementary lead portion (44) on the upper current collecting plate (2) is 1.3 time as large as the shortest distance between the welding point of main lead portion (40) on the inner surface of lid (50) and the upper surface of current collecting plate of positive electrode (2). The circular inner rim of frame portion (41) had a diameter of 19 mm, and a width of 1 mm.

Example 14

A sealed battery was obtained in the same manner as in Example 12, except that lead connecting between the inner surface of lid (50) and the outer surface of current collecting plate of positive electrode (2) is in the form of a single-wall ring comprising a frame portion with a single lateral wall (42) as shown in FIG. 34, instead of a double-walled ring comprising a frame portion (41) from whose inner and outer peripheries (41-1, 41-2) dangle lateral wall portions (42, 43).

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 15

A sealed battery was obtained in the same manner as in Example 12, except that lead connecting between the inner surface of lid (50) and the outer surface of current collecting plate of positive electrode (2) is in the form of a single-wall ring comprising a frame portion with a single lateral wall (43) as shown in FIG. 35, instead of a double-walled ring comprising a frame portion (41) from whose inner and outer peripheries (41-1, 41-2) dangle lateral wall portions (42, 43).

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 16

A sealed battery was obtained in the same manner as in Example 12, the lead connecting between the inner surface of lid (50) and the outer surface of current collecting plate of positive electrode (2) being in the form of a double-walled ring having an inverted U-shaped profile, except, however, that the lateral walls act as a bellow as shown in FIG. 28.

For the battery thus assembled, the length of lead from the welding point of main lead portion (40) on the inner surface of lid (50) to the nearest welding point (2-1) of supplementary lead portion (44) on the upper current collecting plate (2) is 2.1 times as large as the shortest distance between the welding point of main lead portion (40) on the inner surface of lid (50) and the upper surface of current collecting plate of positive electrode (2).

Example 17

Figure 8:
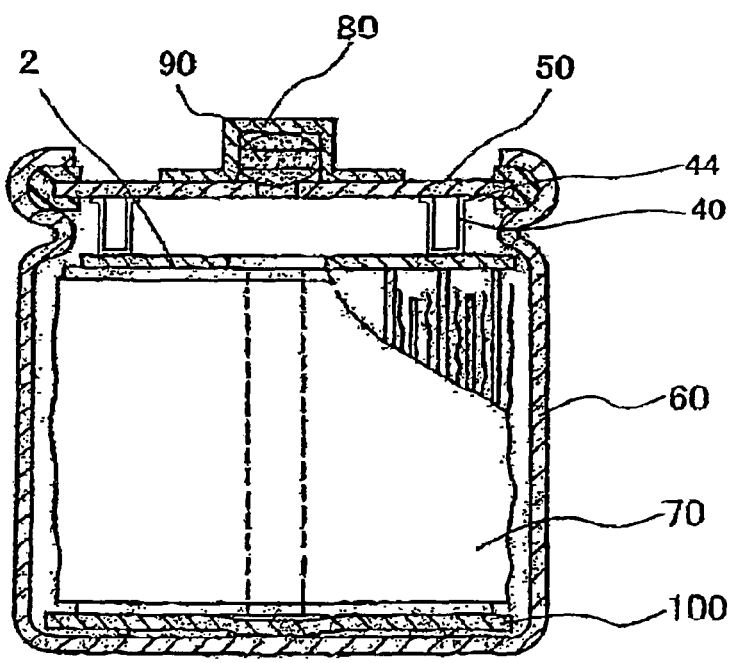
FIG. 8 is a sealed battery representing an example (Example 17) of the invention which incorporates a main lead and supplementary lead in the form of a double-walled ring having a U-shaped profile.

A lead in the form of a double-walled ring having an inverted-U shaped profile as shown in FIG. 16 was applied to lid (50) with pads (44*a*) of supplementary lead portion (44) in contact with the inner surface of lid (50). The first step consisted of contacting the pads (44*a*) of supplementary lead portion (44) with the inner surface of lid (50) and connected the former to the latter by spot welding. The second step consisted of placing the lid (50) attached to the lead on top of a polar sheet group such that the frame portion (41) of U-shaped lead (main lead portion) came into contact with current collecting plate of positive electrode (2), caulking the open end of container (60) to close the end airtight, and welding the frame portion (41) to the upper surface of current collecting plate of positive electrode (2). In other respects, the same procedures as in Example 12 were employed to produce a sealed battery as shown in FIG. 8.

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 18

A sealed battery was obtained in the same manner as in Example 12, except that, to lead connecting between the inner surface of lid (50) and the outer surface of current collecting plate of positive electrode (2) in the form of a double-walled ring having an inverted U-shaped profile, 32 slits of 1 mm in width were made radially through lateral walls at regular intervals, and 16 alternate lateral wall portions were removed to leave 16 alternate lateral portions comprising dangling walls (47, 48) as shown in FIGS. 23 to 25.

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 19

A sealed battery was obtained in the same manner as in Example 12, except that, to lead connecting between the inner surface of lid (50) and the outer surface of current collecting plate of positive electrode (2) in the form of a double-walled ring having an inverted U-shaped profile, 16 slits (42-1, 43-1) of 0.25 mm in width were made radially through lateral walls (42, 43) at regular intervals as shown in FIG. 26.

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 20

Figure 19:
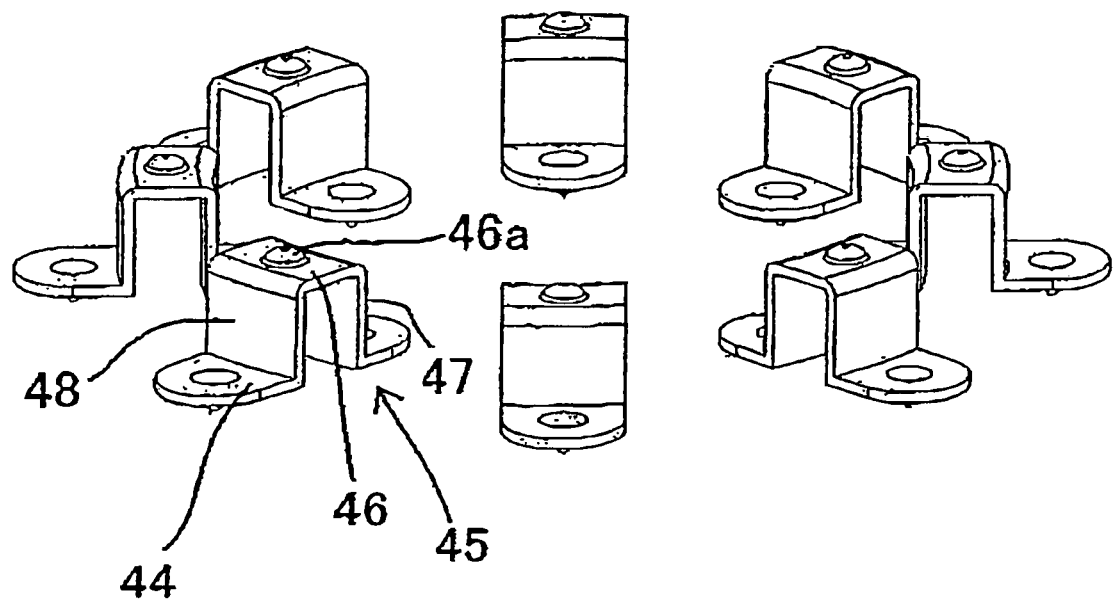
FIG. 19 is a perspective view (frontal view) of a lead representing an example (Example 20) of the invention, or a variation of the lead shown in FIG. 15 obtained by cutting the lead at sixteen positions, and removing eight pieces to leave eight pieces at alternate positions in a ring, each piece having an inverted U-shaped profile.
Figure 20:
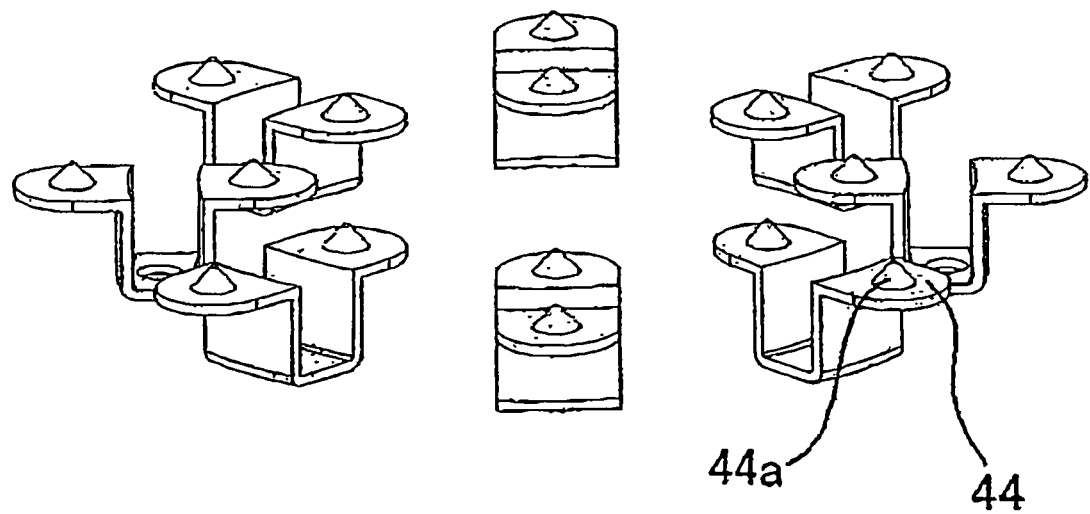
FIG. 20 is a perspective view (rear view) of the lead representing an example (Example 20) of the invention, or a variation of the lead shown in FIG. 15 obtained by cutting the lead at sixteen positions, and removing eight pieces to leave eight pieces at alternate positions in a ring, each piece having an inverted U-shaped profile.
Figure 21:
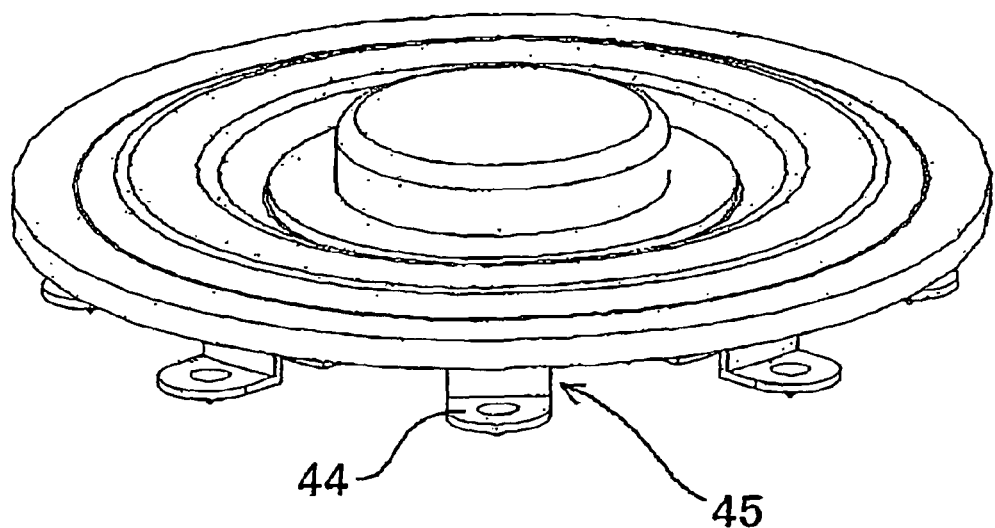
FIG. 21 is a perspective view (frontal view) of a lid welded to the lead comprising eight U-shaped pieces shown in FIGS. 19 and 20.
Figure 22:
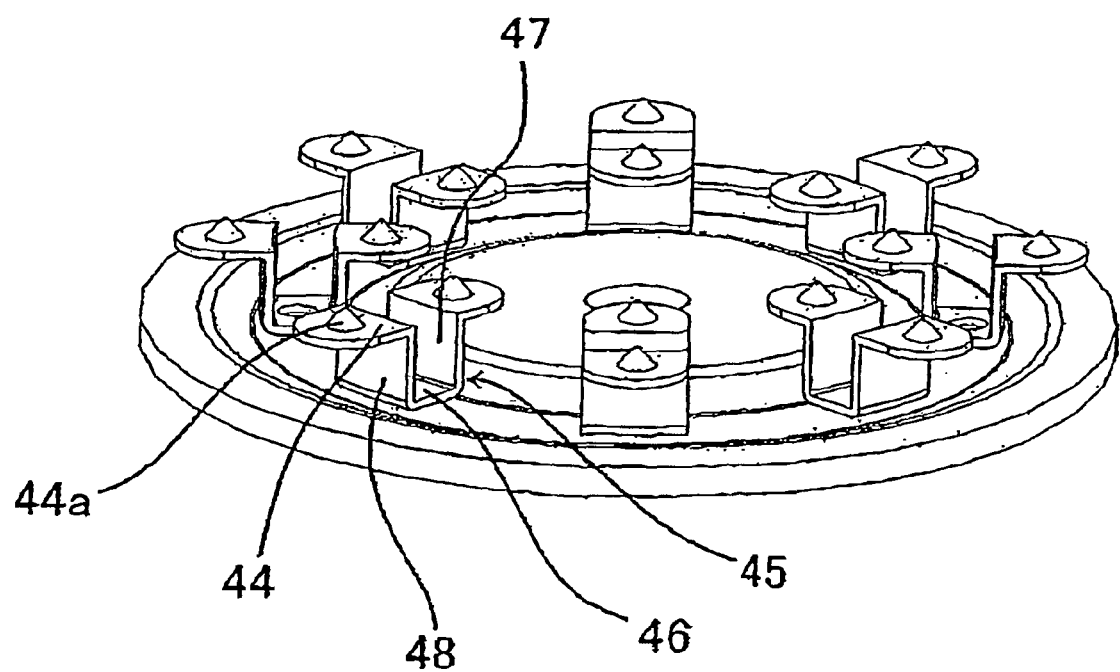
FIG. 22 is a perspective view (rear view) of the lid welded to the lead comprising eight U-shaped pieces shown in FIGS. 19 and 20.

A sealed battery was obtained in the same manner as in Example 12, except that lead connecting between the inner surface of lid (50) and the outer surface of current collecting plate of positive electrode (2) consists of a series of eight pieces (45) having an inverted-U shaped profile arranged in a circle as shown in FIGS. 19 to 20.

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Example 21

A sealed battery as shown in FIG. 37(*d*) was obtained in the same manner as in Example 1, except that lead connecting between the inner surface of lid (50) and the outer surface of current collecting plate of positive electrode (2) consists of a ring-like main lead (20) and a supplementary lead (30) made of a nickel plate of 0.3 nm thick connected together as shown in FIG. 13 (supplementary lead (30) has eight tabs (30-2) each having a pad (30-1)), and the lead was welded to lid and current collecting plate of positive electrode as shown in FIG. 37(*c*).

For the battery thus assembled, the length of lead from the welding point of main lead portion (40) on the inner surface of lid (50) to the nearest welding point (2-1) of supplementary lead portion (44) on the upper current collecting plate (2) is 1.4 time as large as the shortest distance between the welding point of main lead portion (40) on the inner surface of lid (50) and the upper surface of current collecting plate of positive electrode (2).

Sealed batteries obtained in Examples 12 to 21 were activated chemically under the same condition as in Example 1, and their internal resistances and output power densities were measured. Table 7 lists the measurement results of internal resistance and output power density of those batteries.

larger thickness than a supplementary lead portion as shown in Example 21, because the former has a lower resistance.

A lead prepared as in Example 17 in the form of a double-walled ring having a U-shaped profile has a resistance as large as that of an inverted-U shaped counterpart, but the lead is not preferred because dissipation of heat to a thick lead is so remarkable that welding of supplementary lead portion to upper current collecting plate becomes insecure, and 30% of the batteries incorporating such a lead had an output power density below 1400 W/Kg.

Although the incidence of failed welding joints may be improved by passing a highly intense current, a larger welder may be required for this purpose which leads to the increase

TABLE 7

| Classification | Shape of lead | Number of welding points | | L1 (mm) | X1 (mm) | L1/X1 | Internal resistance (mΩ) | Output power density W/kg |
|---|---|---|---|---|---|---|---|---|
| | | Main lead portion | Supplementary lead portion | | | | | |
| Example 12 | Lead having an inverted-U profile | 8 | 16 | 3.8 | 2.8 | 1.4 | 0.88 | 1560 |
| Example 13 | Lead having an inverted-V profile | 8 | 16 | 3.7 | 2.8 | 1.3 | 0.85 | 1600 |
| Example 14 | Lead having an inverted-U profile with external limb removed (single), | 8 | 8 | 3.9 | 2.8 | 1.4 | 0.97 | 1450 |
| Example 15 | Lead having an inverted-U profile with internal limb removed (single), | 8 | 8 | 3.8 | 2.8 | 1.4 | 0.97 | 1450 |
| Example 16 | Lead having an inverted-U profile with lateral walls acting as bellow | 8 | 16 | 5.8 | 2.8 | 2.1 | 1.02 | 1410 |
| Example 17 | Lead having a U-shaped profile (inversely installed) | 8 | 16 | 3.8 | 2.8 | 1.4 | 0.88 | 1550 |
| Example 18 | Lead having an inverted-U profile with big slits (1 cm) through lateral walls | 8 | 16 | 3.8 | 2.8 | 1.4 | 0.89 | 1530 |
| Example 19 | Lead having an inverted-U profile with small slits (0.25 cm) through lateral walls | 8 | 16 | 3.8 | 2.8 | 1.4 | 0.88 | 1540 |
| Example 20 | A series of pieces having an inverted-U profile | 8 | 16 | 3.8 | 2.8 | 1.4 | 0.89 | 1530 |
| Example 21 | Ring-like lead + supplementary lead | 8 | 8 | 3.8 | 2.8 | 1.4 | 0.92 | 1520 |

It was found by comparing Examples 12 and 13 with Examples 1 to 10 shown in Tables 1 to 4 that when main and supplementary lead portions are produced via press processing of a single plate, the main and supplementary lead plates should have the same thickness, in order to facilitate resistance welding of those lead portions later, and that with a lead in the form of a single wall ring (consisting only of a ring-like main lead), it is hardly possible to produce a lead having a low resistance, and thus leads prepared as in Examples 12 and 13 in the form of a double-walled ring having lateral walls dangling from a frame portion are more preferred, because they will ensure a very low resistance and high output power density.

It was further found that even with a ring-like lead (single-wall lead) as in Example 21, the lead will exhibit an excellently low resistance and high output power density, when a main lead is allowed to have a larger thickness than a supplementary lead, and that a lead in the form of a double-walled ring having an inverted-U or inverted-V profile which has plural welding points (welding points on supplementary lead portion) to be in contact with an upper current collecting plate as shown in Examples 12 and 13 is superior to a lead in the form of a single wall ring in which a main lead portion has a of cost. To avoid this, it is preferred to employ a lead in the form of a double-walled ring having an inverted-U profile, and to weld a frame portion of the lead to the inner surface of lid, and tabs provided on the margins of lateral portions of the lead to the upper surface of upper current collecting plate.

With the above lead, the frame portion is preferably ring-like, and knobs thereon are preferably arranged in a circle at regular intervals, because then it is possible for the knobs to extract current uniformly.

Slits may be made through the lateral wall portions of main lead, or through the body of supplementary lead to form a lead with slits in lateral wall portions, or a series of separate lead pieces as in Examples 18 to 20. Such a lead, however, will not give a reduced resistance as expected, because slits, although they eliminate the flow of useless current during the first step of welding, cause the increase of resistance of lead, and the former advantageous effect is canceled out by the latter disadvantageous effect. A lead in the form of a double-walled ring with an inverted-U or inverted-V shaped profile having vertical slits on lateral walls at regular intervals is more preferred, if it is important to obtain a lead that can tolerate the variation in height of electrode assembly and minimize the variation of welding. Or a lead consisting of a series of separate pieces each being shaped like a double-walled ring with an inverted-U or V shaped profile is more preferred if it is important to obtain a lead that is easy for handling and processing.

Each welding surface of lead preferably has a knob or pad, because otherwise the welding joints would not exhibit a uniform contact resistance, and thus current flows through those joints would not be uniform. When each welding surface has a knob or pad, secure welding joints will be formed at all welding points uniformly.

The number of welding points on the frame portion is preferably two or more, because a single welding joint will exhibit a too high contact resistance. If a battery is required to provide an output power density of 1400 W/kg or more, installment of four or more welding points is preferred. If a battery is required to provide an output power density of 1500 W/kg, installment of eight or more welding points (if lead consists of a series of separate pieces, eight or more pieces) is preferred.

The same applies to the number of welding points on upper current collecting plate. If a battery is required to provide an output power density of 1400 W/kg or more, installment of eight or more welding points is preferred. If a battery is required to provide an output power density of 1500 W/kg or more, installment of 16 or more welding points (if lead consists of a series of separate pieces, 16 or more pieces) is preferred.

It is obvious by comparing Examples 12, 13 and 16 with Comparative example 1 that preferred is a battery in which the lid-to-plate length of lead is 1.3 to 2.1 times as large as the lid-to-plate distance, because such a battery will exhibit an excellent resistance.

It was found that the batteries produced by the methods described above have a low internal resistance of 0.9 mΩ or less, and high output power density of 1500 W/kg or more.

It is thought, a battery capable of maintaining an output of 1400 W/kg or more will be able to maintain 1 V/cell at room temperature even when it discharges at 200 A (corresponding to 30 ItA in terms of rate) for assisting the drive of a hybrid type electric vehicle (HEV). In this respect, a nickel metal-hydride battery having an output power density of 1400 W/kg or more is preferable because it allows the setting of 1 V/cell as the lowest limit for voltage control which is necessary for the prevention of excess discharge. Then, such a battery is preferred, because the battery which allows the upper limit of discharge rate to be set at 30 ItA will be protected against excess discharge regardless of the pattern of discharge.

It is obvious by comparing Examples 12 and 13, 14 and 15, and 21 with each other that the main lead portion having a sufficient thickness will exhibit excellent performance, regardless of its structure, i.e., whether it occurs as a single-wall ring or double-walled ring. Thus, when the main lead occurs as a single-wall ring, it preferably has a thickness of 0.4 to 0.8 mm.

When the main lead occurs as a double-walled ring, it preferably has a thickness of 0.2 to 0.4 mm, or half the thickness of main lead in the form of a single-wall ring. This is because, a double-walled ring having a thickness half that of a single-wall ring will give the same resistance. A main lead having a thickness of 0.3 mm or less is more preferred because then it is possible to obtain a double-walled ring structure simply by pressing which will lead to the reduction of cost.

The supplementary lead portion preferably has a thickness of 0.4 mm or less, because it the thickness exceeds 0.4 mm, welding heat may be insufficient which may cause failed welding, and lead portion having a thickness of 0.4 mm or less will allow secure welding. A 0.2 mm or less thickness, however, is not preferred, because then the spring property of supplementary lead portion will be impaired, and secure and uniform welding become impossible. Thus, the supplementary lead portion preferable has a thickness not less than 0.2 mm but not more than 0.4 mm.

Lead having a double-walled ring structure is preferred, because then the main and supplementary portions can have the same thickness, and thus it is possible to prepare main and supplementary lead portions from the same plate simply by pressing, which will lead to the reduction of cost.

Two or more batteries of the invention may be combined to form a battery stack as shown in FIG. 49. This is achieved by welding one end of a ring-like cell-to-cell connector (110) to a first battery such that the ring of lead is placed outside the periphery of cap of the battery, and then welding the outer surface of container (60) of a second battery to the other end of cell-to-cell connector (110).

Examples of the invention given above all relate to cylindrical nickel hydrogen secondary batteries. However, the present invention is not limited to a nickel metal-hydride battery, but may be applied to a nickel cadmium battery, lithium ion battery, lithium polymer battery (including gel), secondary batteries such as a valve-controlled lead battery, alkaline primary batteries, sealed primary or secondary batteries including a lithium coin battery, etc.

The lead constituting an element of the battery is not limited, in structure, to a double-walled ring with an inverted-U, inverted-V, inverted-U in the form of a bellow, etc., as described in relation to Examples, but may include a double-walled ring having other structures.

The shapes of positive electrode plate, current collecting plate of positive electrode, separator, negative electrode, and negative electrode current collecting plate of an inventive battery, and their materials are not limited to those mentioned in Examples above.

INDUSTRIAL APPLICABILITY

A sealed battery of the invention and a battery stack comprising plural inventive sealed batteries are useful as a power source of an electrically-driven vehicle or electrically-driven tool, because they have a low resistance and provides high output.

What is claimed is:
1. A sealed battery comprising:
a lid which closes a container of said sealed battery and covers an upper part of a center of a bare lid with a cap via a valve body to form a safety valve,
an upper current collecting plate with an upper surface, and
a lead connecting the upper surface to an inner surface of said lid,
wherein a welding point of said lead on the inner surface of said lid is outside of a position corresponding to a periphery of said cap,
a length of the lead from said welding point of said lead on the inner surface of said lid to a nearest welding point of said lead on said upper surface of said upper current collecting plate is 1 to 2.1 times as large as a shortest distance from said welding point of said lead on the inner surface of said lid to the upper surface of said upper current collecting plate, and
the lead comprises
a cylindrical lateral wall part that extends vertically, the lateral wall part having a first end part and a second end part located oppositely, an annular frame portion that extends substantially horizontally from the first end part, and
a plurality of supplementary leads that extends substantially horizontally from the second end part, and
the frame portion extends from the first end part in substantially a first direction along a radial direction of the cylindrical lateral wall part, whereas the plurality of supplementary leads extends from the second end part in substantially a second direction along the radial direction, the second direction being opposite to the first direction.

2. A sealed battery as described in claim 1 wherein welding of the lead to the upper surface of the upper current collecting plate is current welding in a form of alternate pulses.

3. A sealed battery as described in claim 1, wherein said lateral wall part has, at a lowermost end, the supplementary lead portion in a form of a plurality of tabs, and
wherein said frame portion is welded to the inner surface of said lid, and the upper surface of said upper current collecting plate is welded to the supplementary lead portion.

4. A sealed battery as described in claim 1, wherein a welding point on the upper surface of said upper current collecting plate is 4 to 16 in number.

5. A sealed battery according to claim 1, wherein a welding point of said lead on the upper surface of said upper current collecting plate falls in an annular area of 41-69% of a length from a center of a concentric circle thereof to the periphery.

6. A sealed battery as described in claim 5, wherein
said lead is the ring-shape lead,
one end surface of said ring-shaped lead is welded to the inner surface of said lid, and
other end surface of said ring-shaped lead is welded to said upper current collecting plate.

7. A sealed battery as described in claim 5, wherein a welding point on the upper surface of said upper current collecting plate is 4 to 16 in number.

8. A sealed battery as described in claim 5, wherein an electrical connection point through which current is extracted outside from the battery is disposed outside the periphery of said cap placed on the upper surface of said lid.

9. A sealed battery according to claim 1, further comprising
a plurality of batteries each of which comprises the lid which closes the container and covers the upper part of the center of the bare lid with the cap via the valve body to form the safety valve, and
wherein a battery stack is obtained by connecting the upper surface of a lid of one sealed battery via a cell-to-cell connector to an outer surface of a bottom of a container of another sealed battery, wherein the welding-point of said lead to the inner surface of said lid is outside of the position on the inner surface of said lid corresponding to the position of the periphery of said cap, and a welding point formed between said cell-to-cell connector and the upper surface of said lid is disposed to the outside of the periphery of said cap,
wherein a lower surface of a lower current collecting plate is welded to an inner surface of a container, and
wherein a welding point between said lower current collecting plate and an inner surface of the bottom of said container is disposed outside a position on said lower current collecting plate corresponding to a position just under the periphery of said cap.

10. A battery stack as described in claim 9, wherein a welding point formed between said cell-to-cell connector and an external surface of said bottom of said container is disposed to the outside of a position of said bottom of said container corresponding to a position just above the periphery of said cap.

11. A sealed battery as described in claim 1, wherein the cylindrical lateral wall part comprises a single-layered lateral wall part.

12. A sealed battery as described in claim 1, wherein the cylindrical lateral wall part comprises an outer lateral wall part extending downwardly from an outer end of the annular frame portion, and an inner lateral wall part extending downwardly from an inner end of the annular frame portion.

13. A sealed battery as described in claim 12, wherein the plurality of supplementary leads extending outwardly from a lower end of the outer lateral wall part.

14. A sealed battery as described in claim 13, further comprising a plurality of knobs formed on an upper surface of the annular frame portion to be spaced apart from each other, said plurality of knobs having a hemispherical shape, protruding upwardly from the upper surface of the annular frame portion, and being connected to the inner surface of the lid.

15. A sealed battery as described in claim 14, wherein said each of the plurality of supplemental leads includes a pad projecting outwardly therefrom.

* * * * *